United States Patent
Rose et al.

(10) Patent No.: US 12,141,629 B2
(45) Date of Patent: Nov. 12, 2024

(54) ACCESSING A PARAMETRIC FIELD WITHIN A SPECIALIZED CONTEXT

(71) Applicant: Oracle International Corporation, Redwood Shores, CA (US)

(72) Inventors: John Robert Rose, San Jose, CA (US); Brian Goetz, Williston, VT (US)

(73) Assignee: Oracle International Corporation, Redwood Shores, CA (US)

( * ) Notice: Subject to any disclaimer, the term of this patent is extended or adjusted under 35 U.S.C. 154(b) by 0 days.

(21) Appl. No.: 18/497,634

(22) Filed: Oct. 30, 2023

(65) Prior Publication Data
US 2024/0061733 A1    Feb. 22, 2024

Related U.S. Application Data

(62) Division of application No. 17/571,353, filed on Jan. 7, 2022, now Pat. No. 11,922,238.

(Continued)

(51) Int. Cl.
*G06F 9/54* (2006.01)
*G06F 8/41* (2018.01)
(Continued)

(52) U.S. Cl.
CPC ............ *G06F 9/547* (2013.01); *G06F 8/41* (2013.01); *G06F 8/437* (2013.01);
(Continued)

(58) Field of Classification Search
None
See application file for complete search history.

(56) References Cited

U.S. PATENT DOCUMENTS

| 8,606,806 B2 | 12/2013 | Baras et al. |
| 10,929,106 B1 | 2/2021 | Sridhar |

(Continued)

FOREIGN PATENT DOCUMENTS

| EP | 1533696 A2 | 5/2005 |
| EP | 1588235 A2 | 10/2005 |

(Continued)

OTHER PUBLICATIONS

"Clojure.spec—Rationale and Overview," Retrieved at https://clojure.org/about/spec, Retrieved on Jan. 17, 2022, pp. 1-15.

(Continued)

*Primary Examiner* — Umut Onat
(74) *Attorney, Agent, or Firm* — Invoke

(57) ABSTRACT

A parametric constant resolves to different values in different contexts, but a single value within a particular context. An anchor constant is a parametric constant that allows for a degree of parametricity for an API point. The context for the anchor constant is provided by a caller to the API point. The anchor constant resolves to an anchor value that records specialization decisions for the API point within the provided context. Specialization decisions may include type restrictions, memory layout, and/or memory size. The anchor value together with an unspecialized type of the API point result in a specialized type of the API point. A class object representing the specialized type is created. The class object may be accessible to the caller, but the full value of the anchor value is not accessible to the caller. The API point is executed based on the specialization decisions embodied in the anchor value.

9 Claims, 22 Drawing Sheets

Related U.S. Application Data

(60) Provisional application No. 63/163,697, filed on Mar. 19, 2021, provisional application No. 63/163,701, filed on Mar. 19, 2021, provisional application No. 63/163,723, filed on Mar. 19, 2021, provisional application No. 63/163,726, filed on Mar. 19, 2021.

(51) Int. Cl.
| | | |
|---|---|---|
| *G06F 9/30* | (2018.01) | |
| *G06F 9/445* | (2018.01) | |
| *G06F 9/448* | (2018.01) | |
| *G06F 9/451* | (2018.01) | |
| *G06F 9/455* | (2018.01) | |
| *G06F 12/02* | (2006.01) | |
| *G06F 16/22* | (2019.01) | |
| *G06F 16/28* | (2019.01) | |

(52) U.S. Cl.
CPC ...... *G06F 9/30076* (2013.01); *G06F 9/44521* (2013.01); *G06F 9/44536* (2013.01); *G06F 9/4488* (2018.02); *G06F 9/4494* (2018.02); *G06F 9/4498* (2018.02); *G06F 9/451* (2018.02); *G06F 9/45516* (2013.01); *G06F 9/541* (2013.01); *G06F 9/542* (2013.01); *G06F 9/548* (2013.01); *G06F 12/023* (2013.01); *G06F 16/2272* (2019.01); *G06F 16/2291* (2019.01); *G06F 16/289* (2019.01)

(56) References Cited

U.S. PATENT DOCUMENTS

| | | | |
|---|---|---|---|
| 10,983,771 | B1 | 4/2021 | Hegarty et al. |
| 11,657,432 | B2 | 5/2023 | Bur et al. |
| 11,972,308 | B2 * | 4/2024 | Rose .............. G06F 8/443 |
| 2001/0013065 | A1 | 8/2001 | Patki et al. |
| 2006/0080644 | A1 | 4/2006 | Fuhrer et al. |
| 2006/0101032 | A1 | 5/2006 | Sutter et al. |
| 2007/0006141 | A1 | 1/2007 | Bracha et al. |
| 2007/0156845 | A1 | 7/2007 | Devanneaux et al. |
| 2007/0245325 | A1 | 10/2007 | Lapounov et al. |
| 2008/0157951 | A1 * | 7/2008 | Katrak ............. G05B 19/0428 340/439 |
| 2009/0182760 | A1 | 7/2009 | Box et al. |
| 2009/0251476 | A1 | 10/2009 | Jiao et al. |
| 2010/0114843 | A1 | 5/2010 | Farrar et al. |
| 2010/0146013 | A1 | 6/2010 | Mather |
| 2010/0180269 | A1 | 7/2010 | Stall et al. |
| 2011/0283263 | A1 | 11/2011 | Gagliardi et al. |
| 2012/0166953 | A1 | 6/2012 | Affronti et al. |
| 2012/0191690 | A1 | 7/2012 | George |
| 2013/0067155 | A1 | 3/2013 | Bates et al. |
| 2013/0080736 | A1 | 3/2013 | Meirowitz et al. |
| 2015/0277899 | A1 | 10/2015 | Hamby et al. |
| 2015/0301809 | A1 | 10/2015 | Goetz et al. |
| 2015/0301840 | A1 | 10/2015 | Goetz et al. |
| 2016/0094625 | A1 | 3/2016 | Sengodan et al. |
| 2016/0162924 | A1 | 6/2016 | Rathod |
| 2016/0357586 | A1 | 12/2016 | Rose |
| 2017/0039043 | A1 | 2/2017 | Haupt et al. |
| 2017/0116007 | A1 | 4/2017 | Cimadamore et al. |
| 2017/0123771 | A1 | 5/2017 | Smith |
| 2018/0018151 | A1 | 1/2018 | Goetz et al. |
| 2018/0150495 | A1 | 5/2018 | Hoff et al. |
| 2018/0189086 | A1 | 7/2018 | Queva et al. |
| 2018/0268158 | A1 | 9/2018 | Bateman et al. |
| 2018/0285361 | A1 | 10/2018 | Buckley et al. |
| 2018/0293058 | A1 | 10/2018 | Bierman et al. |
| 2018/0350180 | A1 | 12/2018 | Onischuk |
| 2019/0073227 | A1 | 3/2019 | Zhong |
| 2019/0146817 | A1 | 5/2019 | Tirumala et al. |
| 2020/0019423 | A1 | 1/2020 | Marks et al. |
| 2020/0026530 | A1 | 1/2020 | Rose et al. |
| 2020/0225933 | A1 * | 7/2020 | Singh .................... G06F 11/302 |
| 2021/0240619 | A1 | 8/2021 | Earnshaw |
| 2022/0067105 | A1 | 3/2022 | Vodovotz et al. |

FOREIGN PATENT DOCUMENTS

| | | | |
|---|---|---|---|
| EP | 1640859 | A2 | 3/2006 |
| WO | 2004/068292 | A2 | 8/2004 |
| WO | 2015/164438 | A1 | 10/2015 |

OTHER PUBLICATIONS

"Common Descriptor Concepts," Retrieved at https://www.eclipse.org/eclipselink/documentation/2.6/concepts/descriptors001.htm, Retrieved on Oct. 31, 2017, pp. 1-6.

"JEP 218: Generics over Primitive Types" Retrieved at https://openjdk.java.net/jeps/218, Retrieved on 2022, pp. 1-4.

"Project Valhalla" Retrieved at https://openjdk.java.net/projects/valhalla/, Retrieved on Dec. 2021, pp. 1-3.

"Statically typed Javascript : Why and How," Retrieved at https://developerhowto.com/2019/01/05/statically-typed-javascript-why-and-how/, Retrieved on Jan. 2019, pp. 1-6.

"Template Classes in the VM" Retrieved at http://cr.openjdk.java.net/~jrose/values/template-classes.html, Retrieved on Nov. 2017, pp. 1-15.

Buckle N., "Restricted data types, specification and enforcement of invariant properties of variables," ACM SIGPLAN Notices, vol. 12, Issue 3, Mar. 1977, pp. 68-76.

Cimadamore I, M., "Constructs and Applications of Generic Programming in Object-Oriented Languages," University of Bologna, 2010, pp. 208.

Kennedy A., et al., "Design and Implementation of Generics for the .NET Common Language Runtime," ACM SIGPLAN Notices, vol. 36, Issue 5, May 2001, pp. 1-12.

Malabarba S, et al., "Runtime Support for Type-Safe Dynamic Java Classes," Lecture Notes in Computer Science, vol. 1850, 2000, pp. 337-361.

Rose J., "Template Class Challenges" Retrieved at http://cr.openjdk.java.net/~jrose/values/Templates-2019-0325.pdf, Retrieved on Mar. 2019, pp. 1-16.

Rose J., "The Saga of the Parametric VM," Retrieved at http://rosehome.org/work/pvm20211216/parametric-vm.pdf, Retrieved on Jan. 2021, pp. 1-33.

Wikipedia., "Entity-relationship model," Retrieved at https://en.wikipedia.org/wiki/Entity%E2%80%93relationship_model, Retrieved on Dec. 2021, pp. 1-12.

* cited by examiner

Anchor Value
1302

Anchor Constant
1304

Selector Value
1306

Dependent Constant
1307

Memory Layout
1308

Memory Size
1310

Class Object Representing a Specialized Class
1312

Type Restriction
1314

Associated Default Anchor Value
1316

Fig. 13

ACCESSING A PARAMETRIC FIELD WITHIN A SPECIALIZED CONTEXT

INCORPORATION BY REFERENCE; DISCLAIMER

Each of the following applications are hereby incorporated by reference: application Ser. No. 17/571,353, filed on Jan. 7, 2022; Application No. 63/163,697, filed on Mar. 19, 2021; Application No. 63/163,701, filed on Mar. 19, 2021; Application No. 63/163,723, filed on Mar. 19, 2021; Application No. 63/163,726, filed on Mar. 19, 2021; application Ser. No. 17/571,323, filed on Jan. 7, 2022; application Ser. No. 17/571,328, filed on Jan. 7, 2022; application Ser. No. 17/571,329, filed on Jan. 7, 2022; Application Ser. No. 17/571,335, filed on Jan. 7, 2022; application Ser. No. 17/571,340, filed on Jan. 7, 2022; application Ser. No. 17/571,343, filed on Jan. 7, 2022; Application Ser. No. 17/571,349, filed on Jan. 7, 2022; application Ser. No. 17/571,356, filed on Jan. 7, 2022; application Ser. No. 17/571,359, filed on Jan. 7, 2022; application Ser. No. 17/571,379, filed on Jan. 7, 2022. The applicant hereby rescinds any disclaimer of claims scope in the parent application(s) or the prosecution history thereof and advises the USPTO that the claims in the application may be broader than any claim in the parent application(s).

TECHNICAL FIELD

The present disclosure relates to parametric constants and application programming interface (API) points. In particular, the present disclosure relates to determining different resolution states for a parametric constant in different contexts.

BACKGROUND

Compilers for different programming languages may perform different types of compilations. In some instances, a compiler converts source code, which is written according to a specification directed to the convenience of the programmer, to machine or object code. Machine or object code is executable directly by the particular machine environment. In other instances, a compiler converts source code to an intermediate representation (also known as "virtual machine code" or "virtual machine instructions"), such as bytecode, which is executable by a virtual machine that is capable of running on top of a variety of particular machine environments. The virtual machine instructions are executable by the virtual machine in a more direct and efficient manner than the source code. Converting source code to virtual machine instructions includes mapping source code functionality from the language to virtual machine functionality that utilizes underlying resources, such as data structures. Often, functionality that is presented in simple terms via source code by the programmer is converted into more complex steps that map more directly to the instruction set supported by the underlying hardware on which the virtual machine resides.

A set of code includes a set of application programming interface (API) points. An API point is a named class, interface, method, constructor, or field. Generics enable types (classes and interfaces) to be parameters when defining API points. A parametric API point is an API point that is parameterized over types.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

The embodiments are illustrated by way of example and not by way of limitation in the figures of the accompanying drawings. It should be noted that references to "an" or "one" embodiment in this disclosure are not necessarily to the same embodiment, and they mean at least one. In the drawings:

FIG. 13 illustrates a resolved value, namely an anchor value, for a resolution state of a specialization anchor constant according to an embodiment.

DETAILED DESCRIPTION

Figure 1:
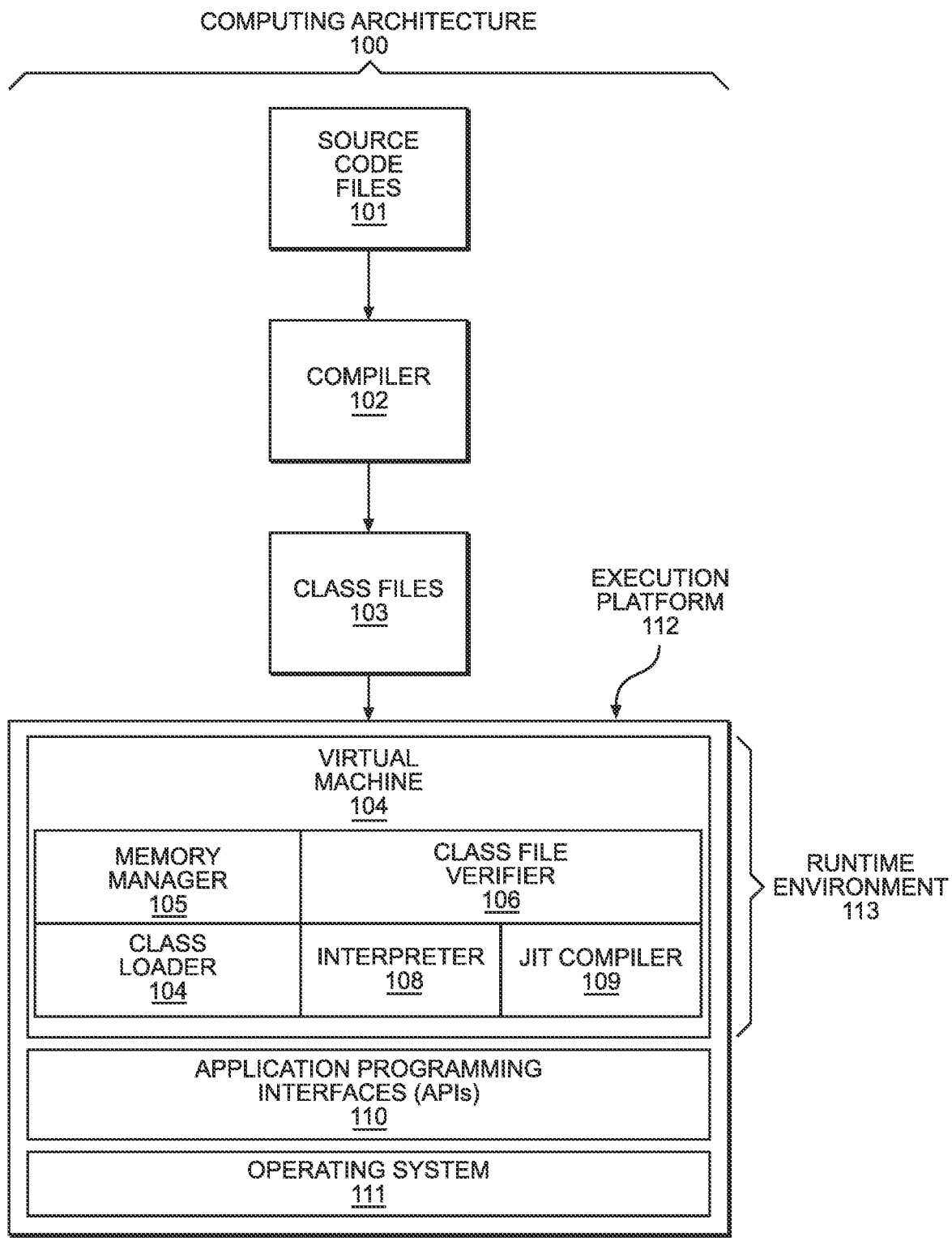
FIG. 1 illustrates an example computing architecture in which techniques described herein may be practiced.

In the following description, for the purposes of explanation, numerous specific details are set forth in order to provide a thorough understanding. One or more embodiments may be practiced without these specific details. Features described in one embodiment may be combined with features described in a different embodiment. In some examples, well-known structures and devices are described with reference to a block diagram form in order to avoid unnecessarily obscuring the present invention.

1. GENERAL OVERVIEW
2. ARCHITECTURAL OVERVIEW
2.1 EXAMPLE CLASS FILE STRUCTURE
2.2 EXAMPLE VIRTUAL MACHINE ARCHITECTURE
2.3 LOADING, LINKING, AND INITIALIZING
3. PARAMETRIC CONSTANTS
4. PARAMETRIC APPLICATION PROGRAMMING INTERFACE (API) POINTS
5. RESOLVING A SPECIALIZATION ANCHOR CONSTANT AND A SPECIALIZATION LINKAGE CONSTANT
6. EXECUTING PARAMETRIC API POINTS WITHIN PARTICULAR CONTEXTS
7. EXAMPLE EMBODIMENTS
7.1 EXECUTING A PARAMETRIC METHOD DEPENDENT ON AN ANCHOR CONSTANT
7.2 CREATING AN INSTANCE OF A PARAMETRIC CLASS DEPENDENT ON AN ANCHOR CONSTANT
7.3 ACCESSING A PARAMETRIC FIELD DEPENDENT ON AN ANCHOR CONSTANT
8. MISCELLANEOUS; EXTENSIONS
9. HARDWARE OVERVIEW

1. GENERAL OVERVIEW

One or more embodiments include determining different resolution states for a parametric constant in different contexts. An invariant constant has at most one value. A state machine for an invariant constant includes an initial unresolved state and then a resolution state, and no other states. When an invariant constant is prepared, the invariant constant assumes the unresolved state. When an invariant constant is resolved, the invariant constant transitions to the resolution state. The value (whether a resolved value or an error) determined for the resolution state is not changeable. An invariant constant can be prepared at most once; hence the invariant constant can assume at most one value. In contrast, a parametric constant can be associated with multiple values, each value being the parametric constant's sole value within a respective context. A state machine for a parametric constant is similar to that for an invariant constant— the state machine includes two states, an unresolved state and a resolution state. The value determined for each resolution state is not changeable. However, a parametric constant be prepared multiple times. Each preparation corresponds to at most a single resolution. Each unresolved state transitions into at most a single resolution state. Different resolution states are associated with different contexts; however the value determined for each resolution state is not changeable and therefore constant for each context. Further, a constant (whether invariant or parametric) is associated with at most one bootstrap method. A bootstrap method determines a resolved value for a resolution state of a constant. For a parametric constant, the same bootstrap method is executed for different resolutions, but each execution receives different contexts as input.

A context for a parametric constant is information relevant to determining a resolved value for the parametric constant that is supplied by a user of the parametric constant. A user of the parametric constant may be, for example, a caller of an application programming interface (API) point that depends on the parametric constant. The context is applicable and unchangeable during the execution of the API point. Hence the context is applicable and unchangeable while within a stack frame, on a call stack, corresponding to the execution of the API point. As described above, each context corresponds to at most one resolution state, and one resolved value, of a parametric constant. Therefore all operations within the stack frame corresponding to the execution of the API point can access at most one resolution state, and one resolved value, of the parametric constant. Within the stack frame corresponding to the execution of the API point, the parametric constant has a single constant value. Indeed, within any stack frame corresponding to execution of any API point depending on the same parametric constant, wherein each respective caller supplies the same context, the parametric constant has a single constant value. However, within different stack frame corresponding to executions of the same API point within different contexts, operations of different stack frames access different resolution states, and different resolved values, of the same parametric constant.

A per-type runtime constant pool stores a set of constants for a type. A per-type runtime constant pool includes a single invariant runtime constant pool, storing invariant constants, and zero or more parametric runtime constant pool, storing parametric constants. For a particular parametric constant, at most a single resolution state is stored in each parametric runtime constant pool. A parametric runtime constant pool storing a resolution state of a parametric constant relevant to one or more contexts is also associated with the same one or more contexts. (While a context is associated with at most one resolution state of a particular parametric constant, a resolution state may be associated with one or more contexts.) Therefore, different parametric runtime constant pools associated with the same parametric constant are associated with different contexts. As used herein, the term "runtime constant pool" may refer to a per-type runtime constant pool, an invariant runtime constant pool, and/or a parametric runtime constant pool.

Each stack frame is associated with a constant pool reference, pointing to a per-type runtime constant pool for a type defining (or inheriting) the API point being executed.

Operations within a stack frame access resolution states of constants from the per-type runtime constant pool that is referenced by the stack frame's constant pool reference. A constant pool reference includes one component pointing to the invariant runtime constant pool for a particular type. Additionally the constant pool reference includes another component pointing to a parametric runtime constant pool associated with the particular type. While potentially multiple parametric runtime constant pools are associated with the particular type, the referenced parametric runtime constant pool corresponds to the same context that is applicable to the stack frame. Since a stack frame is associated with at most one of a set of contexts associated with a particular parametric constant, and a context is associated with at most one parametric runtime constant pool associated with the particular parametric constant, therefore at most one parametric runtime constant pool associated with the particular parametric constant is accessed for the duration of each stack frame; no other parametric runtime constant pool associated with the particular parametric constant is accessed.

One or more embodiments include determining a resolution state of a specialization anchor constant (also referred to as an "anchor constant") on which an API point depends. An anchor constant is a parametric constant. An API point that depends on a parametric constant may be referred to as a "parametric API point." A resolved value for a resolution state of an anchor constant stores a set of specialization decisions for the parametric API point within a particular context. A resolved value for a resolution state of an anchor constant may be referred to herein as a "specialization anchor value," or "anchor value." An anchor value may be stored in the form of an object of a particular type, referred to herein as a "specialization anchor type," or "anchor type."

An "unspecialized type" is a type that defines one or more API points. An unspecialized type may specify that a particular API point (defined by the unspecialized type itself, or defined by a supertype of the unspecialized type and inherited by the unspecialized type) is dependent on an anchor constant, thereby rendering the particular API point parametric. The unspecialized type thereby also depends on the anchor constant and is parametric.

A "specialized type" is a type resulting from specializing a parametric unspecialized type within a particular context. The specialized type is the parametric unspecialized type adorned with specialization decisions (which may be embodied in an anchor value). The parametric unspecialized type may be referred to as an "underlying unspecialized type" for the specialized type. Although the specialized type itself does not define or declare any fields and methods, the specialized type has the same fields and methods as the underlying unspecialized type. The fields and methods of the specialized type are the same as the fields and methods of the underlying unspecialized type, but the fields and methods of the specialized type are further adorned with specialization decisions.

Specialization decisions may include type restrictions on fields, method parameters, and/or method return values. A type restriction on an API point in a specialized type prohibits the API point from assuming one or more values that are originally valid for a type of the same API point as specified by the underlying unspecialized type.

Additionally or alternatively, specialization decisions may include a different memory layout and/or memory size for a specialized type relative to the underlying unspecialized type. As an example, an unspecialized type may specify that a field is of the type Object. Hence a memory space for the field stores a reference value, which may require 8 bytes. A specialized type may include a type restriction on the field, restricting the field to values of int. Values of int may be stored inline and require only 4 bytes. Hence, a memory layout associated with the specialized type may include inlining the int value for the field within an instance of the specialized type. Further, a memory size associated with the specialized type may be 4 bytes less than a memory size associated with the unspecialized type.

Based on specialization decisions, further customizations and/or optimizations may be performed. Memory flattening optimizations refer to storing a value in place of a reference to the value, also referred to as "inlining." The value may be associated with a field, method parameter, and/or method return value. The inlining may occur in local variables in a call frame, an operand stack, and/or the passing of values between a callee method and a caller method. Type sharpening optimizations refer to eliding certain operations of a method. As an example, a method may specify that different operations are performed based on a type of a method parameter. For example,

```
void m(T t) {
    if (t instanceof String) { a(t); }
    else b(t);
}
```

When specializing to T=String, the type test and the else-arm are elided; when specializing to T !=String, the type test and the if-arm are elided.

As described above, an anchor value stores a set of specialization decisions, within a particular context, for an API point that depends on an anchor constant. The particular context is associated with a specialization proposal supplied by the caller of the API point. The proposal is specified by the caller using an operand of an instruction that calls the API point. The operand is a specialization linkage constant (also referred to as a "linkage constant"). The linkage constant is a wrapper around the API point and a specialization selector value (also referred to as a "selector value"). The selector value indicates the caller's specialization proposal for the API point.

A linkage constant is initially in an unresolved state. The linkage constant wraps around a parametric API point (specifically, a symbolic reference to the parametric API point) and a selector value. If the selector value is unvalidated, resolving the linkage constant includes resolving an anchor constant on which the parametric API point depends. Resolving the anchor constant includes verifying whether the proposed selector value is valid for the anchor constant. The callee may accept or reject the selector value. If the selector value is rejected, an error is permanently stored as the resolution state of the anchor constant within the context associated with the selector value. If the selector value is accepted, then the callee determines an anchor value embodying specialization decisions made based on the selector value. The above validation and resolution operations may be embodied in a bootstrap method corresponding to the anchor constant. The anchor value is stored as a resolved value for a resolution state of the anchor constant. Then both the parametric API point (specifically, a direct reference to the parametric API point) and the anchor value are stored as a resolved value for a resolution state of the linkage constant. The parametric API point is then executed based on the anchor value.

Alternatively, a linkage constant in an unresolved state may wrap around a validated selector value. A selector value is validated if the selector value matches an anchor value previously resolved for the anchor constant on which the parametric API point depends. The parametric API point is then executed based on the matching anchor value.

As described above, a resolved linkage constant wraps around a parametric API point and an anchor value. The resolved linkage constant may be used in a subsequent call to any parametric API point dependent on the same anchor constant. The called parametric API point is then executed based on the anchor value indicated by the resolved linkage constant.

One or more embodiments include executing a parametric method within a particular context. An invocation instruction to invoke a parametric method supplies a context. Information indicating the context (such as an anchor value) is passed from a stack frame associated with the caller to a stack frame associated with the callee. Hence, the context applicable to execution of the parametric method is accessible to operations within the stack frame associated with the callee.

In an embodiment, a context is associated with a type restriction on a method parameter and/or method return value. Hence, during execution of the parametric method, the method parameter and/or method return value is processed based on the type restriction. Processing a method parameter and/or method return value based on a type restriction may include type checking the method parameter and/or method return value based on the type restriction, and/or converting or casting the method parameter and/or method return value based on the type restriction. Additionally or alternatively, processing a method parameter and/or method return value based on a type restriction may include performing certain optimizations including memory flattening and/or stack flattening, such as modifying a memory size for the method parameter and/or method return value based on the type restriction, and/or inlining the method parameter and/or method return value based on the type restriction.

In an embodiment, a context is associated with one of a plurality of parametric runtime constant pools associated with an anchor constant on which a parametric method depends. Each of the plurality of parametric runtime constant pools stores a respective resolution state for the anchor constant. Hence, a constant pool reference of a stack frame corresponding to execution of the parametric method within a particular context points to the parametric runtime constant pool associated with the same particular context. Operations within the stack frame access a resolution state for the anchor constant, and resolution states for zero or more other constants dependent on the anchor constant, from the referenced parametric runtime constant pool; no other parametric runtime constant pool associated with the anchor constant is accessed within the stack frame. The parametric method may be executed using the resolution states within the referenced parametric runtime constant pool, without using resolution states within any other parametric runtime constant pool associated with the anchor constant.

One or more embodiments include creating an object of a specialized type. Generating an object involves the steps of allocating memory space to the object and initializing the object. Generating an object of a specialized type involves (a) allocating memory space based on a memory size and/or memory layout associated with the specialized type, and (b) initializing the object based on the underlying unspecialized type.

In an embodiment, different instructions perform memory allocation and initialization—a creation instruction causes memory allocation; an invocation instruction to invoke a constructor causes initialization. Each creation instruction corresponds to an invocation instruction to generate respective objects. To generate an object of a specialized type, a creation instruction supplies (a) an unspecialized type (that depends on an anchor constant and is therefore parametric) and (b) a context for specializing the unspecialized type that results in the specialized type. A memory space is allocated for the object based on a memory size and/or memory layout associated with the specialized type. The anchor value, resolved for the anchor constant, may indicate the memory size and/or memory layout associated with the specialized type. Further, an invocation instruction corresponding to the creation instruction invokes a constructor defined in the unspecialized type, or a supertype of the underlying unspecialized type. If the constructor depends on the anchor constant (and/or other parametric constants), the invocation instruction may further supply a context for invoking the constructor.

In an embodiment, metadata of an object indicates a type of the object. Metadata of an object of a specialized type indicates the specialized type of the object. The specialized type thus indicated may be referred to as a "recorded specialized type" for the object. In particular, metadata of an object of a specialized type may include a reference to an object (such as a class mirror) representing the specialized type. The anchor value, resolved for the anchor constant on which the unspecialized type depends, may indicate a reference to the object representing the specialized type.

One or more embodiments include accessing a parametric field of an object within a particular context. An access instruction to access a parametric field of an object supplies a context. The context is associated with a specialized type expected of the object. The expected specialized type is verified against a recorded specialized type of the object. If a match is found, then the field is accessed based on a memory layout associated with the recorded specialized type. If no match is found, then the field is accessed based on a different memory layout, such as a memory layout associated with a default context, or an error is generated.

In an embodiment, a field is associated with a name and a type. An invariant type defines both the name and type of a field of the invariant type. The invariant type is referred to as a "containing type" for the field. However, different types define the name and type of a specialized field of a specialized type. The underlying unspecialized type defines the name of the specialized field; the specialized type defines the type of the specialized field. The specialized type specializes the type of the specialized field within a particular context based on a type restriction applicable to the field with the particular context. A value for the specialized field is type checked, converted, and/or casted based on the type restriction. Hence, the specialized field may be referred to as having two "containing types," a "specialized containing type" and an "unspecialized containing type."

In an embodiment, access instructions of different instruction types are used to operate on values of different types. Such access instructions may include virtual machine instructions and/or machine code. Access instructions of different instruction types are used to access a same parametric field within different contexts, because the parametric field is associated with different specialized field types within different contexts. An instruction type of an access instruction to a parametric field is determined based on a type restriction applicable within a particular context. As an example, an unspecialized type may specify that a field is of the type Object, such that a memory space for the field stores a reference (to a memory address in heap) rather than a data value. A specialized type may include a type restriction on the field, restricting the field to values of int. An access instruction to access the field in the specialized type may be of the type int (such as, iload). An access instruction to access the field in the unspecialized type may be of the type corresponding to references (such as, aload).

One or more embodiments described in this Specification and/or recited in the claims may not be included in this General Overview section.

2. ARCHITECTURAL OVERVIEW

FIG. 1 illustrates an example architecture in which techniques described herein may be practiced. Software and/or hardware components described with relation to the example architecture may be omitted or associated with a different set of functionality than described herein. Software and/or hardware components, not described herein, may be used within an environment in accordance with one or more embodiments. Accordingly, the example environment should not be construed as limiting the scope of any of the claims.

As illustrated in FIG. 1, a computing architecture 100 includes source code files 101 which are compiled by a compiler 102 into class files 103 representing the program to be executed. The class files 103 are then loaded and executed by an execution platform 112, which includes a runtime environment 113, an operating system 111, and one or more application programming interfaces (APIs) 110 that enable communication between the runtime environment 113 and the operating system 111. The runtime environment 113 includes a virtual machine 104 comprising various components, such as a memory manager 105 (which may include a garbage collector), a class file verifier 106 to check the validity of class files 103, a class loader 107 to locate and build in-memory representations of classes, an interpreter 108 for executing the virtual machine 104 code, and a just-in-time (JIT) compiler 109 for producing optimized machine-level code.

In an embodiment, the computing architecture 100 includes source code files 101 that contain code that has been written in a particular programming language, such as Java, C, C++, C #, Ruby, Perl, and so forth. Thus, the source code files 101 adhere to a particular set of syntactic and/or semantic rules for the associated language. For example, code written in Java adheres to the Java Language Specification. However, since specifications are updated and revised over time, the source code files 101 may be associated with a version number indicating the revision of the specification to which the source code files 101 adhere. The exact programming language used to write the source code files 101 is generally not critical.

In various embodiments, the compiler 102 converts the source code, which is written according to a specification directed to the convenience of the programmer, to either machine or object code, which is executable directly by the particular machine environment, or an intermediate representation ("virtual machine code/instructions"), such as bytecode, which is executable by a virtual machine 104 that is capable of running on top of a variety of particular machine environments. The virtual machine instructions are executable by the virtual machine 104 in a more direct and efficient manner than the source code. Converting source code to virtual machine instructions includes mapping source code functionality from the language to virtual machine functionality that utilizes underlying resources, such as data structures. Often, functionality that is presented in simple terms via source code by the programmer is converted into more complex steps that map more directly to the instruction set supported by the underlying hardware on which the virtual machine 104 resides.

In general, programs are executed either as a compiled or an interpreted program. When a program is compiled, the code is transformed globally from a first language to a second language before execution. Since the work of transforming the code is performed ahead of time; compiled code tends to have excellent run-time performance. In addition, since the transformation occurs globally before execution, the code can be analyzed and optimized using techniques such as constant folding, dead code elimination, inlining, and so forth. However, depending on the program being executed, the startup time can be significant. In addition, inserting new code would require the program to be taken offline, re-compiled, and re-executed. For many dynamic languages (such as Java) which are designed to allow code to be inserted during the program's execution, a purely compiled approach may be inappropriate. When a program is interpreted, the code of the program is read line-by-line and converted to machine-level instructions while the program is executing. As a result, the program has a short startup time (can begin executing almost immediately), but the run-time performance is diminished by performing the transformation on the fly. Furthermore, since each instruction is analyzed individually, many optimizations that rely on a more global analysis of the program cannot be performed.

In some embodiments, the virtual machine 104 includes an interpreter 108 and a JIT compiler 109 (or a component implementing aspects of both), and executes programs using a combination of interpreted and compiled techniques. For example, the virtual machine 104 may initially begin by interpreting the virtual machine instructions representing the program via the interpreter 108 while tracking statistics related to program behavior, such as how often different sections or blocks of code are executed by the virtual machine 104. Once a block of code surpasses a threshold (is "hot"), the virtual machine 104 invokes the JIT compiler 109 to perform an analysis of the block and generate optimized machine-level instructions which replaces the "hot" block of code for future executions. Since programs tend to spend most time executing a small portion of overall code, compiling just the "hot" portions of the program can provide similar performance to fully compiled code, but without the start-up penalty. Furthermore, although the optimization analysis is constrained to the "hot" block being replaced, there still exists far greater optimization potential than converting each instruction individually. There are a number of variations on the above described example, such as tiered compiling.

In order to provide clear examples, the source code files 101 have been illustrated as the "top level" representation of the program to be executed by the execution platform 112. Although the computing architecture 100 depicts the source code files 101 as a "top level" program representation, in other embodiments the source code files 101 may be an intermediate representation received via a "higher level" compiler that processed code files in a different language into the language of the source code files 101. Some examples in the following disclosure assume that the source code files 101 adhere to a class-based object-oriented programming language. However, this is not a requirement to utilizing the features described herein.

In an embodiment, compiler 102 receives as input the source code files 101 and converts the source code files 101 into class files 103 that are in a format expected by the virtual machine 104. For example, in the context of the JVM, the Java Virtual Machine Specification defines a particular class file format to which the class files 103 are expected to adhere. In some embodiments, the class files 103 contain the virtual machine instructions that have been converted from the source code files 101. However, in other embodiments, the class files 103 may contain other structures as well, such as tables identifying constant values and/or metadata related to various structures (classes, fields, methods, and so forth).

The following discussion assumes that each of the class files 103 represents a respective "class" defined in the source code files 101 (or dynamically generated by the compiler 102/virtual machine 104). However, the aforementioned assumption is not a strict requirement and will depend on the implementation of the virtual machine 104. Thus, the techniques described herein may still be performed regardless of the exact format of the class files 103. In some embodiments, the class files 103 are divided into one or more "libraries" or "packages", each of which includes a collection of classes that provide related functionality. For example, a library may contain one or more class files that implement input/output (I/O) operations, mathematics tools, cryptographic techniques, graphics utilities, and so forth. Further, some classes (or fields/methods within those classes) may include access restrictions that limit their use to within a particular class/library/package or to classes with appropriate permissions.

2.1 Example Class File Structure

Figure 2:
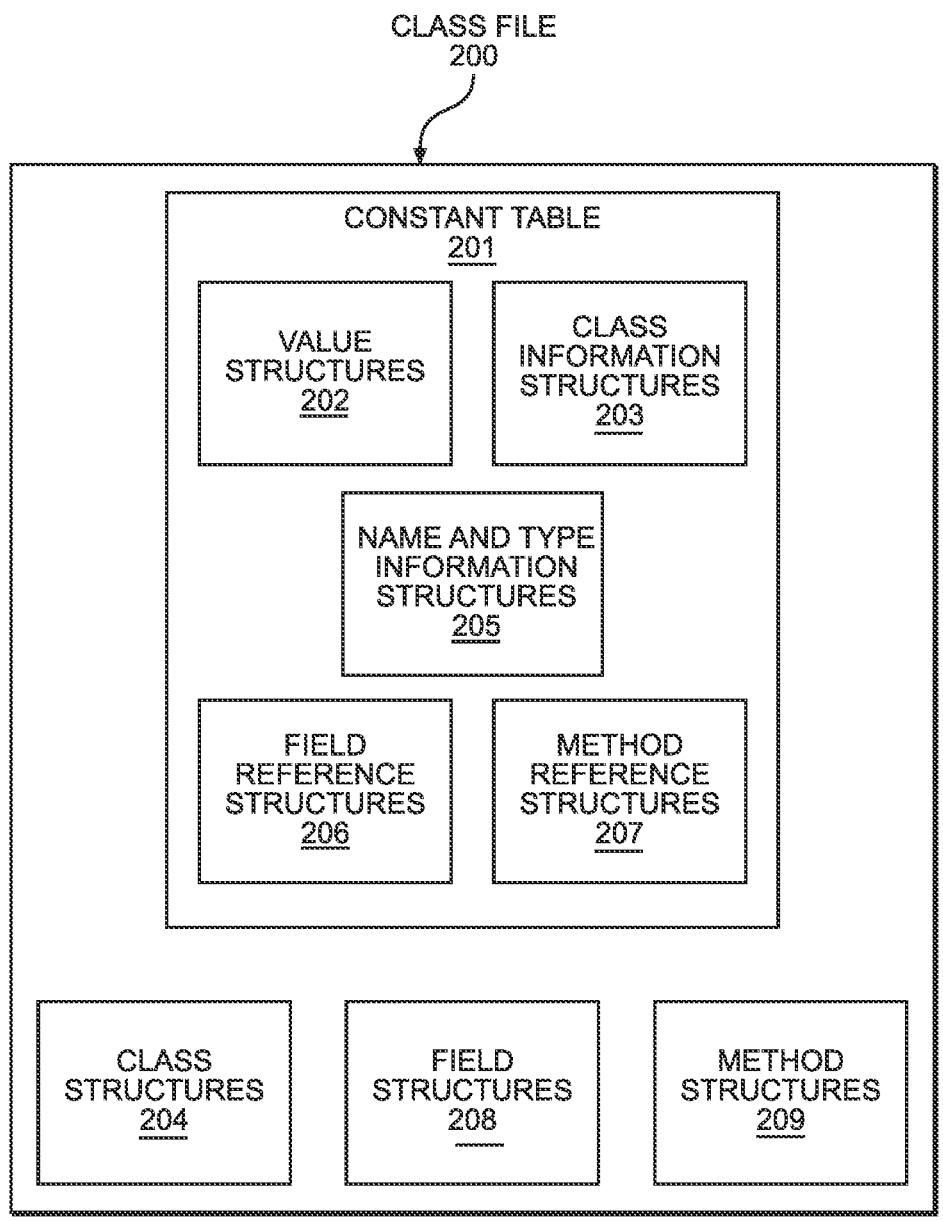
FIG. 2 is a block diagram illustrating one embodiment of a computer system suitable for implementing methods and features described herein.

FIG. 2 illustrates an example structure for a class file 200 in block diagram form according to an embodiment. In order to provide clear examples, the remainder of the disclosure assumes that the class files 103 of the computing architecture 100 adhere to the structure of the example class file 200 described in this section. However, in a practical environment, the structure of the class file 200 will be dependent on the implementation of the virtual machine 104. Further, one or more features discussed herein may modify the structure of the class file 200 to, for example, add additional structure types. Therefore, the exact structure of the class file 200 is not critical to the techniques described herein. For the purposes of Section 2.1, "the class" or "the present class" refers to the class represented by the class file 200.

In FIG. 2, the class file 200 includes a constant table 201, field structures 208, class structures 204, and method structures 209. In an embodiment, the constant table 201 is a data structure which, among other functions, acts as a symbol table for the class. For example, the constant table 201 may store data related to the various identifiers used in the source code files 101 such as type, scope, contents, and/or location. The constant table 201 has entries for value structures 202 (representing constant values of type int, long, double, float, byte, string, and so forth), class information structures 203, name and type information structures 205, field reference structures 206, and method reference structures 207 derived from the source code files 101 by the compiler 102. In an embodiment, the constant table 201 is implemented as an array that maps an index i to structure j. However, the exact implementation of the constant table 201 is not critical.

In some embodiments, the entries of the constant table 201 include structures which index other constant table 201 entries. For example, an entry for one of the value structures 202 representing a string may hold a tag identifying its "type" as string and an index to one or more other value structures 202 of the constant table 201 storing char, byte or int values representing the ASCII characters of the string.

In an embodiment, field reference structures 206 of the constant table 201 hold an index into the constant table 201 to one of the class information structures 203 representing the class defining the field and an index into the constant table 201 to one of the name and type information structures 205 that provides the name and descriptor of the field. Method reference structures 207 of the constant table 201 hold an index into the constant table 201 to one of the class information structures 203 representing the class defining the method and an index into the constant table 201 to one of the name and type information structures 205 that provides the name and descriptor for the method. The class information structures 203 hold an index into the constant table 201 to one of the value structures 202 holding the name of the associated class.

The name and type information structures 205 hold an index into the constant table 201 to one of the value structures 202 storing the name of the field/method and an index into the constant table 201 to one of the value structures 202 storing the descriptor.

In an embodiment, class structures 204 (also referred to as "class metadata") includes metadata for the class, such as version number(s), number of entries in the constant pool, number of fields, number of methods, access flags (whether the class is public, private, final, abstract, etc.), an index to one of the class information structures 203 of the constant table 201 that identifies the present class, an index to one of the class information structures 203 of the constant table 201 that identifies the superclass (if any), and so forth.

In an embodiment, the field structures 208 represent a set of structures that identifies the various fields of the class. The field structures 208 store, for each field of the class, accessor flags for the field (whether the field is static, public, private, final, etc.), an index into the constant table 201 to one of the value structures 202 that holds the name of the field, and an index into the constant table 201 to one of the value structures 202 that holds a descriptor of the field.

In an embodiment, the method structures 209 represent a set of structures that identifies the various methods of the class. The method structures 209 store, for each method of the class, accessor flags for the method (e.g. whether the method is static, public, private, synchronized, etc.), an index into the constant table 201 to one of the value structures 202 that holds the name of the method, an index into the constant table 201 to one of the value structures 202 that holds the descriptor of the method, and the virtual machine instructions that correspond to the body of the method as defined in the source code files 101.

In an embodiment, a descriptor represents a type of a field or method. For example, the descriptor may be implemented as a string adhering to a particular syntax. While the exact syntax is not critical, a few examples are described below.

In an example where the descriptor represents a type of the field, the descriptor identifies the type of data held by the field. In an embodiment, a field can hold a basic type, an object, or an array. When a field holds a basic type, the descriptor is a string that identifies the basic type (e.g., "B"=byte, "C"=char, "D"=double, "F"=float, "I"=int, "J"=long int, etc.). When a field holds an object, the descriptor is a string that identifies the class name of the object (e.g. "L ClassName"). "L" in this case indicates a reference, thus "L ClassName" represents a reference to an object of class ClassName. When the field is an array, the descriptor identifies the type held by the array. For example, "[B" indicates an array of bytes, with "[" indicating an array and "B" indicating that the array holds the basic type of byte. However, since arrays can be nested, the descriptor for an array may also indicate the nesting. For example, "[[L ClassName" indicates an array where each index holds an array that holds objects of class ClassName. In some embodiments, the ClassName is fully qualified and includes the simple name of the class, as well as the pathname of the class. For example, the ClassName may indicate where the file is stored in the package, library, or file system hosting the class file 200.

In the case of a method, the descriptor identifies the parameters of the method and the return type of the method. For example, a method descriptor may follow the general form "({ParameterDescriptor}) ReturnDescriptor", where the {ParameterDescriptor} is a list of field descriptors representing the parameters and the ReturnDescriptor is a field descriptor identifying the return type. For instance, the string "V" may be used to represent the void return type. Thus, a method defined in the source code files 101 as "Object m(int I, double d, Thread t) { . . . }" matches the descriptor "(I D L Thread) L Object".

In an embodiment, the virtual machine instructions held in the method structures 209 include operations which reference entries of the constant table 201. Using Java as an example, consider the following class:

```
class A
{
  int add12and13( ) {
    return B.addTwo(12, 13);
  }
}
```

In the above example, the Java method add12and13 is defined in class A, takes no parameters, and returns an integer. The body of method add12and13 calls static method addTwo of class B which takes the constant integer values 12 and 13 as parameters, and returns the result. Thus, in the constant table 201, the compiler 102 includes, among other entries, a method reference structure that corresponds to the call to the method B.addTwo. In Java, a call to a method compiles down to an invoke command in the bytecode of the JVM (in this case invokestatic as addTwo is a static method of class B). The invoke command is provided an index into the constant table 201 corresponding to the method reference structure that identifies the class defining addTwo "B", the name of addTwo "addTwo", and the descriptor of addTwo "(I I)1". For example, assuming the aforementioned method reference is stored at index 4, the bytecode instruction may appear as "invokestatic #4".

Since the constant table 201 refers to classes, methods, and fields symbolically with structures carrying identifying information, rather than direct references to a memory location, the entries of the constant table 201 are referred to as "symbolic references". One reason that symbolic references are utilized for the class files 103 is because, in some embodiments, the compiler 102 is unaware of how and where the classes will be stored once loaded into the runtime environment 113. As will be described in Section 2.3, eventually the run-time representations of the symbolic references are resolved into actual memory addresses by the virtual machine 104 after the referenced classes (and associated structures) have been loaded into the runtime environment and allocated concrete memory locations.

2.2 Example Virtual Machine Architecture

Figure 3:
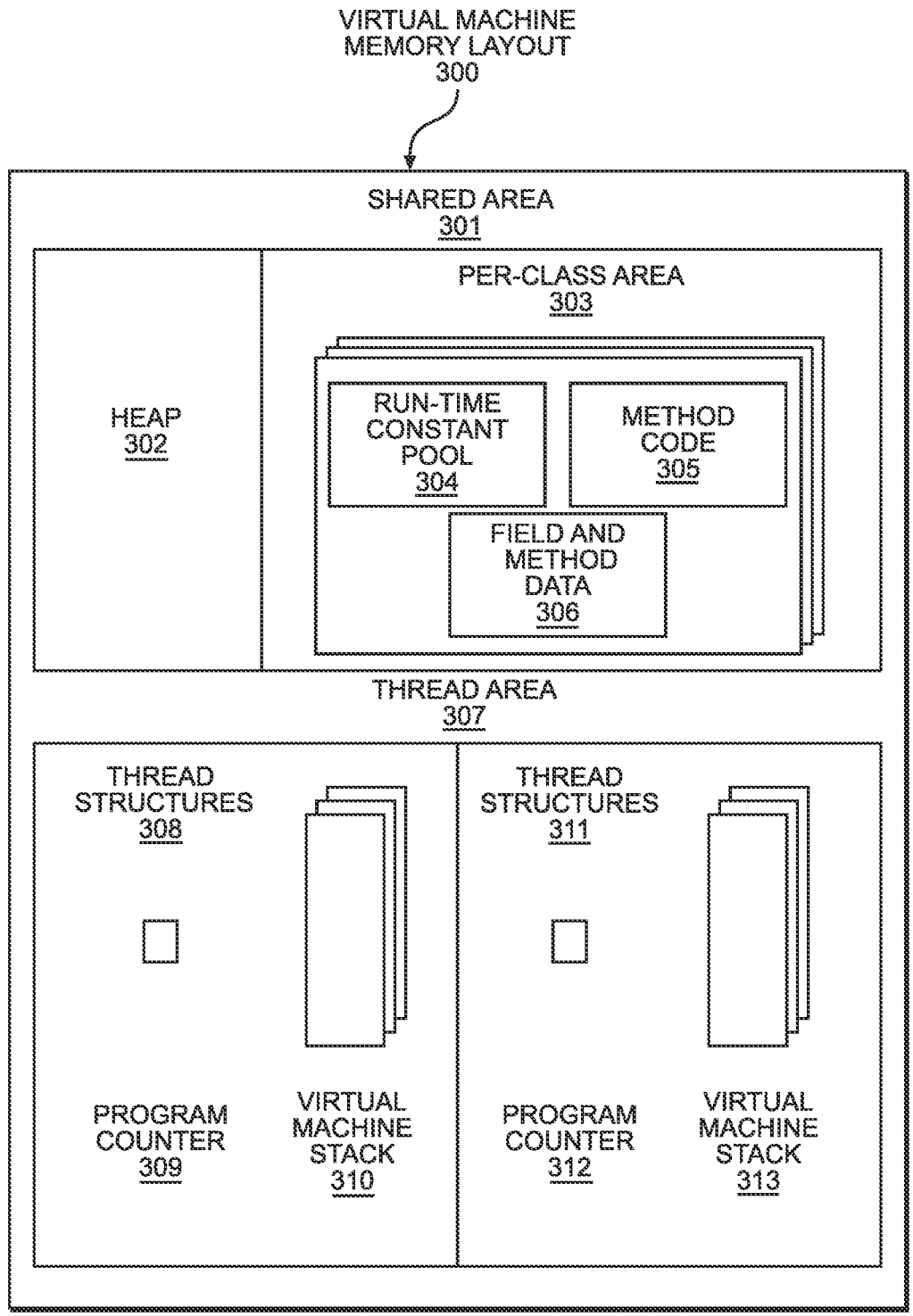
FIG. 3 illustrates an example virtual machine memory layout in block diagram form according to an embodiment.

FIG. 3 illustrates an example virtual machine memory layout 300 in block diagram form according to an embodiment. In order to provide clear examples, the remaining discussion will assume that the virtual machine 104 adheres to the virtual machine memory layout 300 depicted in FIG. 3. In addition, although components of the virtual machine memory layout 300 may be referred to as memory "areas", there is no requirement that the memory areas are contiguous.

In the example illustrated by FIG. 3, the virtual machine memory layout 300 is divided into a shared area 301 and a thread area 307. The shared area 301 represents an area in memory where structures shared among the various threads executing on the virtual machine 104 are stored. The shared area 301 includes a heap 302 and a per-class area 303. In an embodiment, the heap 302 represents the run-time data area from which memory for class instances and arrays is allocated. In an embodiment, the per-class area 303 represents the memory area where the data pertaining to the individual classes are stored. In an embodiment, the per-class area 303 includes, for each loaded class, a run-time constant pool 304 representing data from the constant table 201 of the class, field and method data 306 (for example, to hold the static fields of the class), and the method code 305 representing the virtual machine instructions for methods of the class.

The thread area 307 represents a memory area where structures specific to individual threads are stored. In FIG. 3, the thread area 307 includes thread structures 308 and thread structures 311, representing the per-thread structures utilized by different threads. In order to provide clear examples, the thread area 307 depicted in FIG. 3 assumes two threads are executing on the virtual machine 104. However, in a practical environment, the virtual machine 104 may execute any arbitrary number of threads, with the number of thread structures scaled accordingly.

In an embodiment, thread structures 308 includes program counter 309 and virtual machine stack 310. Similarly, thread structures 311 includes program counter 312 and virtual machine stack 313. In an embodiment, program counter 309 and program counter 312 store the current address of the virtual machine instruction being executed by their respective threads.

Thus, as a thread steps through the instructions, the program counters are updated to maintain an index to the current instruction. In an embodiment, virtual machine stack 310 and virtual machine stack 313 each store frames for their respective threads that hold local variables and partial results, and is also used for method invocation and return.

In an embodiment, a frame is a data structure used to store data and partial results, return values for methods, and perform dynamic linking. A new frame is created each time a method is invoked. A frame is destroyed when the method that caused the frame to be generated completes. Thus, when a thread performs a method invocation, the virtual machine 104 generates a new frame and pushes that frame onto the virtual machine stack associated with the thread.

When the method invocation completes, the virtual machine 104 passes back the result of the method invocation to the previous frame and pops the current frame off of the stack. In an embodiment, for a given thread, one frame is active at any point. This active frame is referred to as the current frame, the method that caused generation of the current frame is referred to as the current method, and the class to which the current method belongs is referred to as the current class.

Figure 4:
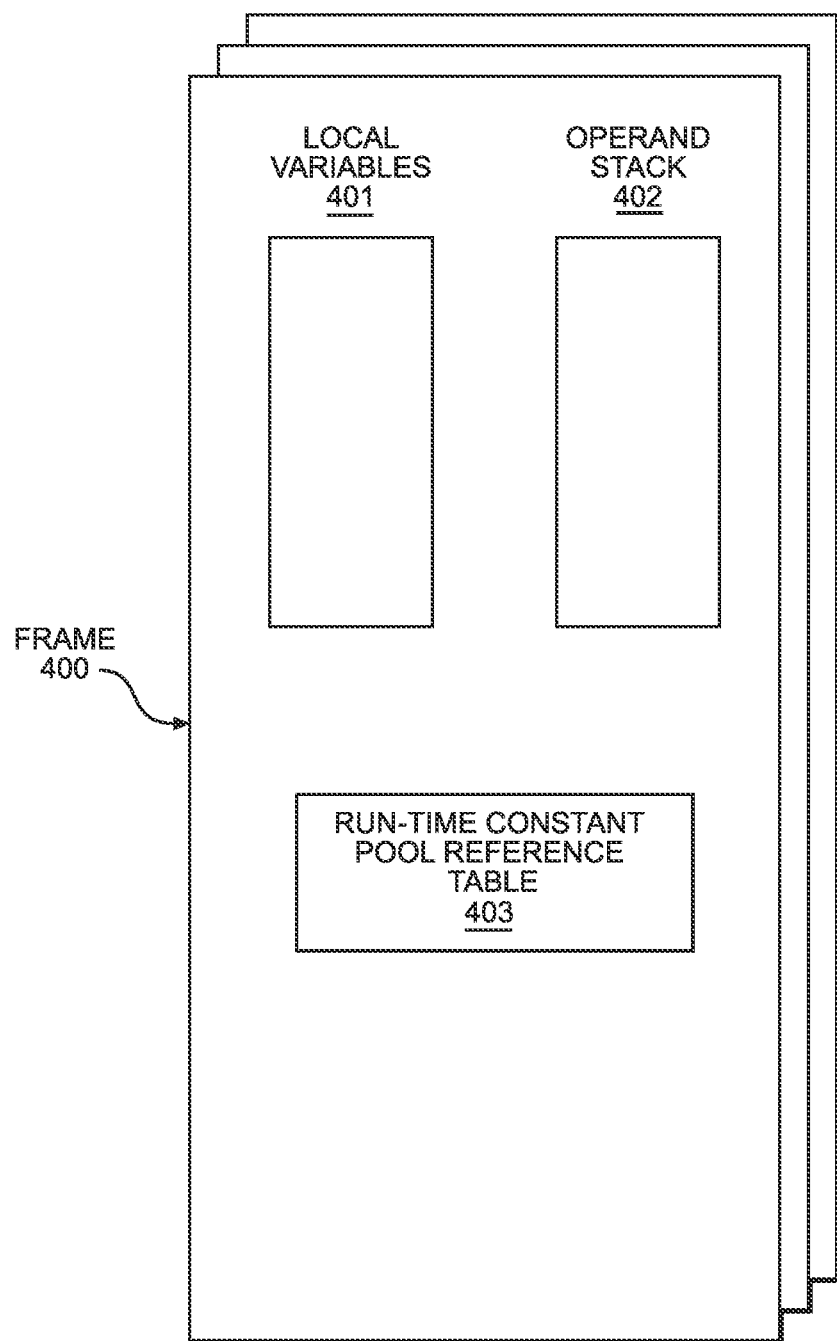
FIG. 4 illustrates an example frame in block diagram form according to an embodiment.

FIG. 4 illustrates an example frame 400 in block diagram form according to an embodiment. In order to provide clear examples, the remaining discussion will assume that frames of virtual machine stack 310 and virtual machine stack 313 adhere to the structure of frame 400.

In an embodiment, frame 400 includes local variables 401, operand stack 402, and run-time constant pool reference table 403. In an embodiment, the local variables 401 are represented as an array of variables that each hold a value, for example, Boolean, byte, char, short, int, float, or reference. Further, some value types, such as longs or doubles, may be represented by more than one entry in the array. The local variables 401 are used to pass parameters on method invocations and store partial results. For example, when generating the frame 400 in response to invoking a method, the parameters may be stored in predefined positions within the local variables 401, such as indexes 1-N corresponding to the first to Nth parameters in the invocation.

In an embodiment, the operand stack 402 is empty by default when the frame 400 is created by the virtual machine 104. The virtual machine 104 then supplies instructions from the method code 305 of the current method to load constants or values from the local variables 401 onto the operand stack 402. Other instructions take operands from the operand stack 402, operate on them, and push the result back onto the operand stack 402. Furthermore, the operand stack 402 is used to prepare parameters to be passed to methods and to receive method results. For example, the parameters of the method being invoked could be pushed onto the operand stack 402 prior to issuing the invocation to the method. The virtual machine 104 then generates a new frame for the method invocation where the operands on the operand stack 402 of the previous frame are popped and loaded into the local variables 401 of the new frame. When the invoked method terminates, the new frame is popped from the virtual machine stack and the return value is pushed onto the operand stack 402 of the previous frame.

In an embodiment, the run-time constant pool reference table 403 contains a reference to the run-time constant pool 304 of the current class. The run-time constant pool reference table 403 is used to support resolution. Resolution is the process whereby symbolic references in the constant pool 304 are translated into concrete memory addresses, loading classes as necessary to resolve as-yet-undefined symbols and translating variable accesses into appropriate offsets into storage structures associated with the run-time location of these variables.

2.3 Loading, Linking, and Initializing

In an embodiment, the virtual machine 104 dynamically loads, links, and initializes classes. Loading is the process of finding a class with a particular name and creating a representation from the associated class file 200 of that class within the memory of the runtime environment 113. For example, creating the run-time constant pool 304, method code 305, and field and method data 306 for the class within the per-class area 303 of the virtual machine memory layout 300. Linking is the process of taking the in-memory representation of the class and combining it with the run-time state of the virtual machine 104 so that the methods of the class can be executed. Initialization is the process of executing the class constructors to set the starting state of the field and method data 306 of the class and/or create class instances on the heap 302 for the initialized class.

The following are examples of loading, linking, and initializing techniques that may be implemented by the virtual machine 104. However, in many embodiments the steps may be interleaved, such that an initial class is loaded, then during linking a second class is loaded to resolve a symbolic reference found in the first class, which in turn causes a third class to be loaded, and so forth. Thus, progress through the stages of loading, linking, and initializing can differ from class to class. Further, some embodiments may delay (perform "lazily") one or more functions of the loading, linking, and initializing process until the class is actually required. For example, resolution of a method reference may be delayed until a virtual machine instruction invoking the method is executed. Thus, the exact timing of when the steps are performed for each class can vary greatly between implementations.

To begin the loading process, the virtual machine 104 starts up by invoking the class loader 107 which loads an initial class. The technique by which the initial class is specified will vary from embodiment to embodiment. For example, one technique may have the virtual machine 104 accept a command line argument on startup that specifies the initial class.

To load a class, the class loader 107 parses the class file 200 corresponding to the class and determines whether the class file 200 is well-formed (meets the syntactic expectations of the virtual machine 104). If not, the class loader 107 generates an error. For example, in Java the error might be generated in the form of an exception which is thrown to an exception handler for processing. Otherwise, the class loader 107 generates the in-memory representation of the class by allocating the run-time constant pool 304, method code 305, and field and method data 306 for the class within the per-class area 303.

In some embodiments, when the class loader 107 loads a class, the class loader 107 also recursively loads the super-classes of the loaded class. For example, the virtual machine 104 may ensure that the super-classes of a particular class are loaded, linked, and/or initialized before proceeding with the loading, linking and initializing process for the particular class.

During linking, the virtual machine 104 verifies the class, prepares the class, and performs resolution of the symbolic references defined in the run-time constant pool 304 of the class.

To verify the class, the virtual machine 104 checks whether the in-memory representation of the class is structurally correct. For example, the virtual machine 104 may check that each class except the generic class Object has a superclass, check that final classes have no sub-classes and final methods are not overridden, check whether constant pool entries are consistent with one another, check whether the current class has correct access permissions for classes/fields/structures referenced in the constant pool 304, check that the virtual machine 104 code of methods will not cause unexpected behavior (e.g. making sure a jump instruction does not send the virtual machine 104 beyond the end of the method), and so forth. The exact checks performed during verification are dependent on the implementation of the virtual machine 104. In some cases, verification may cause additional classes to be loaded, but does not necessarily require those classes to also be linked before proceeding. For example, assume Class A contains a reference to a static field of Class B. During verification, the virtual machine 104 may check Class B to ensure that the referenced static field actually exists, which might cause loading of Class B, but not necessarily the linking or initializing of Class B. However, in some embodiments, certain verification checks can be delayed until a later phase, such as being checked during resolution of the symbolic references. For example, some embodiments may delay checking the access permissions for symbolic references until those references are being resolved.

To prepare a class, the virtual machine 104 initializes static fields located within the field and method data 306 for the class to default values. In some cases, setting the static fields to default values may not be the same as running a constructor for the class. For example, the verification process may zero out or set the static fields to values that the constructor would expect those fields to have during initialization.

During resolution, the virtual machine 104 dynamically determines concrete memory address from the symbolic references included in the run-time constant pool 304 of the class. To resolve the symbolic references, the virtual machine 104 utilizes the class loader 107 to load the class identified in the symbolic reference (if not already loaded). Once loaded, the virtual machine 104 has knowledge of the memory location within the per-class area 303 of the referenced class and its fields/methods. The virtual machine 104 then replaces the symbolic references with a reference to the concrete memory location of the referenced class, field, or method. In an embodiment, the virtual machine 104 caches resolutions to be reused in case the same class/name/descriptor is encountered when the virtual machine 104 processes another class. For example, in some cases, class A and class B may invoke the same method of class C. Thus, when resolution is performed for class A, that result can be cached and reused during resolution of the same symbolic reference in class B to reduce overhead.

In some embodiments, the step of resolving the symbolic references during linking is optional. For example, an embodiment may perform the symbolic resolution in a "lazy" fashion, delaying the step of resolution until a virtual machine instruction that requires the referenced class/method/field is executed.

During initialization, the virtual machine 104 executes the constructor of the class to set the starting state of that class. For example, initialization may initialize the field and method data 306 for the class and generate/initialize any class instances on the heap 302 created by the constructor. For example, the class file 200 for a class may specify that a particular method is a constructor that is used for setting up the starting state. Thus, during initialization, the virtual machine 104 executes the instructions of that constructor.

In some embodiments, the virtual machine 104 performs resolution on field and method references by initially checking whether the field/method is defined in the referenced class. Otherwise, the virtual machine 104 recursively searches through the super-classes of the referenced class for the referenced field/method until the field/method is located, or the top-level superclass is reached, in which case an error is generated.

3. PARAMETRIC CONSTANTS

Figure 5A:
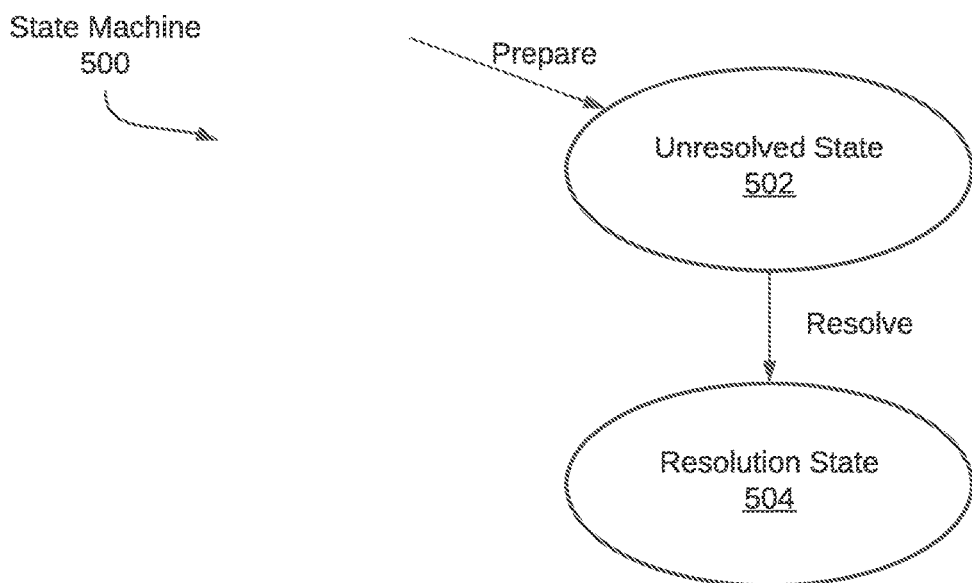
FIGS. 5A-5B illustrate state machines for constants, and in particular, parametric constants, according to an embodiment.
Figure 5B:
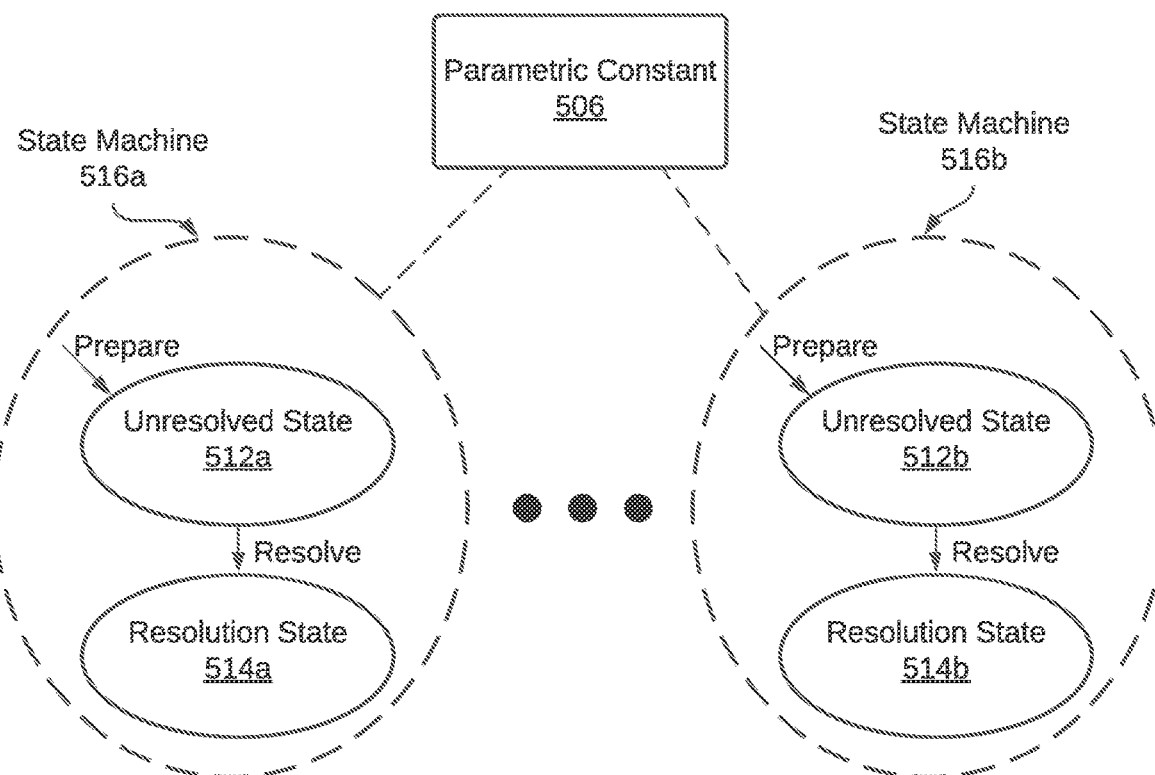

FIGS. 5A-5B illustrate state machines for constants, and in particular, parametric constants, according to an embodiment.

In one or more embodiments, a state machine 500 for a constant includes two states, an unresolved state 502 and a resolution state 504.

Initially, a constant is prepared. Preparation may be performed during preparation of a type defining the constant. Alternatively, preparation may be triggered by other events. Once the constant is prepared, the constant assumes an unresolved state 502.

Next, the constant is resolved. Resolution may be performed based on a bootstrap method corresponding to the constant. Alternatively, resolution may be performed based on another method, which may be defined by the runtime environment. Once the constant is resolved, the constant assumes a resolution state 504. The process of resolution determines a resolved value, or an error, for the resolution state 504. A resolved value is stored in a heap.

Within a state machine 500, at most one resolution state 504 corresponds to each unresolved state 502. At most one resolution step corresponds to each preparation step. Further, no other states follow after the object reaches a resolution state 504. Once the resolution state 504 is reached, the resolution state 504 is permanent for the constant.

Any value (whether a resolved value or an error) determined for a resolution state 504 is unchangeable for the resolution state 504. Hence, the resolved value or error is permanent for the resolution state 504 of the constant.

In one or more embodiments, at most one state machine 500 is associated with an invariant constant. Therefore, an invariant constant represents at most one value. In contrast, multiple state machines 516a-b may be associated with a parametric constant 506. As illustrated, for example, state machine 516a includes unresolved state 512a transitioning to resolution state 514a; state machine 516b includes unresolved state 512b transitioning to resolution state 514b. State machine 516a-b associated with a same parametric constant 506 correspond to different contexts. State machines 516a-b and contexts have a one-to-many relationship: each state machine relates to one or more contexts; each context relates to a single state machine. Based on the multiple state machines 516a-b, a parametric constant 506 may represent different values across different contexts, but at most one value within each context. The term "constant" as used herein may refer to an invariant constant and/or parametric constant.

Figure 6:
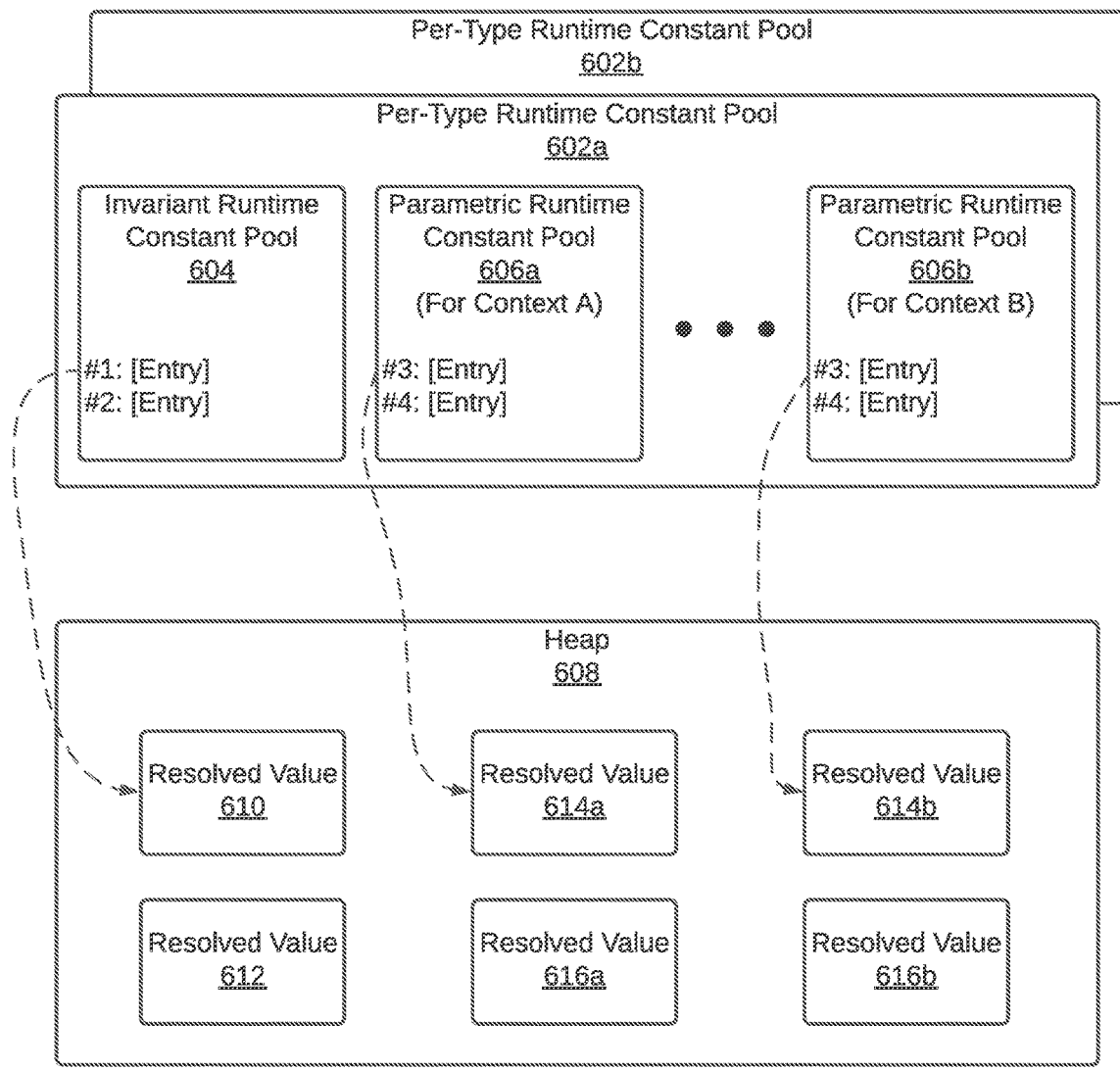
FIG. 6 illustrates runtime data areas storing information for constants, including parametric constants, according to an embodiment.

FIG. 6 illustrates runtime data areas storing information for constants, including parametric constants, according to an embodiment.

In one or more embodiments, runtime data areas 600 of a virtual machine include one or more per-type runtime constant pools 602a-b, and a heap 608. A per-type runtime constant pool 602a-b is similar to a runtime constant pool 304 of FIG. 3. A heap 608 is similar to a heap 302 of FIG. 3.

In one or more embodiments, a single per-type runtime constant pool (such as any of per-type runtime constant pools 602a-b) corresponds to each type loaded in a virtual machine. A per-type runtime constant pool corresponding to a type stores entries for both invariant constants and parametric constants defined by the type. Each resolved entry within a per-type runtime constant pool refers to a respective resolved value (such as any of resolved values 610-616b).

In an embodiment, a per-type runtime constant pool includes a single invariant runtime constant pool 604, storing entries for invariant constants defined by the type.

In an embodiment, a per-type runtime constant pool includes zero or more parametric runtime constant pools 606a-b, storing entries for parametric constants defined by the type.

In an embodiment, a reference to a per-type runtime constant pool within a particular context may include multiple components: a reference to the invariant runtime constant pool and a reference to a parametric runtime constant pool that is relevant to the particular context.

In one or more embodiments, a set of parametric runtime constant pools 606a-b stores respective resolution states of a particular parametric constant. A parametric runtime constant pool storing a resolution state that is relevant to one or more contexts is also associated with the same one or more contexts. Parametric runtime constant pools 606a-b and contexts have a one-to-many relationship: each parametric runtime constant pool relates to one or more contexts; each context relates to a single parametric runtime constant pool.

In one or more embodiments, a parametric runtime constant pool stores resolution states for multiple co-dependent constants. A constant that depends on a parametric constant is also itself parametric. (Further descriptions regarding dependency are included below with reference to FIG. 13.)

In one or more embodiments, a particular parametric constant corresponds to the same index in each of a set of parametric runtime constant pools 606a-b. However, the respective entries at the same index in different parametric runtime constant pools 606a-b point to different resolved values 614a-b within a heap 608.

As illustrated, for example, a type defines four constants:
Index #1: [a first invariant constant]
Index #2: [a second invariant constant]
Index #3: [a first parametric constant]
Index #4: [a second parametric constant that depends on the first parametric constant]

A per-type runtime constant pool 602a includes an invariant runtime constant pool 604. The invariant runtime constant pool 604 stores entries for Index #1 and Index #2. Index #1 points to resolved value 610 within a heap 608. The resolved value 610 referenced by Index #1 is the resolved value for the first invariant constant corresponding to Index #1.

The per-type runtime constant pool 602a includes a parametric runtime constant pool 606a, associated with one context, and another parametric runtime constant pool 606b, associated with another context.

The parametric runtime constant pool 606a stores entries for Index #3 and Index #4. Index #3 points to resolved value 614a within the heap 608. The resolved value 614a referenced by Index #3 is the resolved value for the first parametric constant corresponding to Index #3. Further, the resolved value 614a is the resolved value for the first parametric constant within the context associated with the parametric runtime constant pool 606a.

The parametric runtime constant pool 606b also stores entries for Index #3 and Index #4. The resolved value 614b referenced by Index #3 is the resolved value for the first parametric constant corresponding to Index #3. Further, the resolved value 614b is the resolved value for the first parametric constant within the context associated with the parametric runtime constant pool 606b. Resolved values 614a-b may be same or different.

Figure 7:
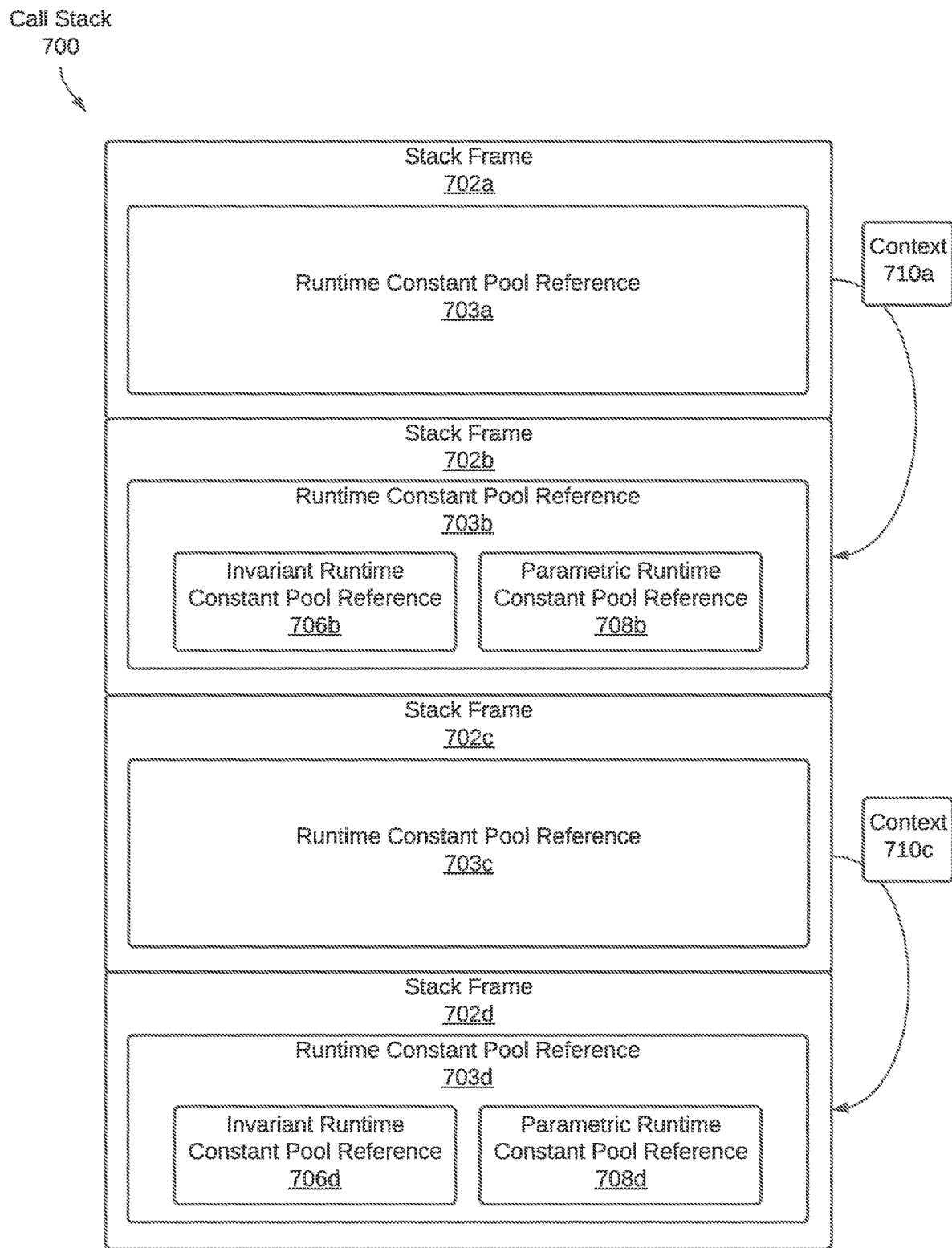
FIG. 7 illustrates a call stack storing information for constants, including parametric constants, according to an embodiment.

FIG. 7 illustrates a call stack storing information for constants, including parametric constants, according to an embodiment.

In one or more embodiments, a call stack 700 includes stack frames 702a-d. A stack frame (such as stack frame 702b, 702d) may correspond to execution of an application programming interface (API) point that depends on a parametric constant. A caller to the API point supplies a context for the execution of the API point. The contextual information is passed from a caller stack frame to a callee stack frame. The callee stack frame therefore is associated with the context supplied by the caller stack frame.

In an example, a type Bicycle defines a first parametric constant and a first API point dependent on the first parametric constant. Another type Boat defines a second parametric constant and a second API point dependent on the second parametric constant.

Stack frame 702a corresponds to execution of a first caller method. The first caller method calls the first API point in Bicycle. The first caller method supplies a context 710a for the execution of the first API point.

Based on the call to the first API point, a new stack frame 702b is pushed onto the call stack 700. Stack frame 702a corresponds to execution of the first API point. Information passed from stack frame 702a to stack frame 702b includes arguments to the first API point as well as the context 710a. Context 710a may be referred to as a "context" for stack frame 702b. Execution of the first API point invokes a second caller method.

Based on the call to the second caller method, a new stack frame 702c is pushed onto the call stack 700. Stack frame 702c corresponds to execution of the second caller method. The second caller method calls the second API point in Boat. The second caller method supplies a context 710c for the execution of the second API point.

Based on the call to the second API point, a new stack frame 702d is pushed onto the call stack 700. Stack frame 702d corresponds to execution of the second API point. Information passed from stack frame 702c to stack frame 702d includes arguments to the second API point as well as the context 710c. Context 710c may be referred to as a "context" for stack frame 702d.

In one or more embodiments, a per-type runtime constant pool is relevant to each stack frame. Potentially multiple per-type runtime constant pools may exist in a runtime environment, each corresponding to a respective type loaded in the runtime environment. A per-type runtime constant pool relevant to a particular stack frame corresponding to execution of a particular API point in a particular type is the per-type runtime constant pool corresponding to the particular type.

In one or more embodiments, each stack frame 702a-d is associated with a runtime constant pool reference pointing to the relevant per-type runtime constant pool. Where a stack frame 702b corresponds to execution of an API point that depends on a parametric constant, the runtime constant pool reference includes an invariant runtime constant pool reference 706b and a parametric runtime constant pool reference 708b. The invariant runtime constant pool reference 706b points to the invariant runtime constant pool of the type including the API point. The parametric runtime constant pool reference 708b points to the parametric runtime constant pool that is (a) of the type including the API point and (b) associated with the same context as the stack frame 702b.

Referring to the above example, stack frame 702a is associated with runtime constant pool reference 703a; stack frame 702b is associated with runtime constant pool reference 703b; stack frame 702c is associated with runtime constant pool reference 703c; and stack frame 702d is associated with runtime constant pool reference 703d.

Stack frame 702b corresponds to execution of the first API point in Bicycle. Runtime constant pool reference 702b includes invariant runtime constant pool reference 706b and parametric runtime constant pool reference 708b. Invariant runtime constant pool reference 706b points to the invariant runtime constant pool associated with the type Bicycle. Parametric runtime constant pool reference 708b points to one of a set of parametric runtime constant pools associated with the type Bi cycle. The referenced parametric runtime constant pool is associated with the same context 710a as stack frame 702b.

Stack frame 702d corresponds to execution of the second API point in Boat. Runtime constant pool reference 702d includes invariant runtime constant pool reference 706d and parametric runtime constant pool reference 708d. Invariant runtime constant pool reference 706d points to the invariant runtime constant pool associated with the type Boat. Parametric runtime constant pool reference 708d points to one of a set of parametric runtime constant pools associated with the type Boat. The referenced parametric runtime constant pool is associated with the same context 710c as stack frame 702d.

In one or more embodiments, operations executed within each stack frame 702a-d rely on the stack frame's runtime constant pool reference to access relevant resolution states of relevant constants. Operations within a stack frame cannot access resolution states outside of the per-type runtime constant pool referenced by the stack frame's runtime constant pool reference.

Referring to the above example, stack frame 702b corresponds to execution of the first API point in Bicycle. The type Bicycle is associated with multiple parametric runtime constant pools, each storing entries for a same set of parametric constants. Stack frame 702b includes a runtime constant pool reference 703b, which includes invariant runtime constant pool reference 706b and parametric runtime constant pool reference 708b. Operations executed within stack frame 702b may access resolution states within the parametric runtime constant pool referenced by parametric runtime constant pool reference 708b; however, operations executed within stack frame 702b cannot access resolution states within other parametric runtime constant pools associated with the same set of parametric constants.

Stack frame 702d corresponds to execution of the second API point in Boat. The type Boat is associated with multiple parametric runtime constant pools, each storing entries for a same set of parametric constants. Stack frame 702d includes a runtime constant pool reference 703d, which includes invariant runtime constant pool reference 706d and parametric runtime constant pool reference 708d. Operations executed within stack frame 702d may access resolution states within the parametric runtime constant pool referenced by parametric runtime constant pool reference 708d; however, operations executed within stack frame 702d cannot access resolution states within other parametric runtime constant pools associated with the same set of parametric constants.

In one or more embodiments, stack frames corresponding to different executions of one or more API points that are dependent on a same parametric constant within a same context reference a same parametric runtime constant pool. Accordingly, every execution of API points dependent on a same parametric constant within a same context references the same resolution state for the parametric constant. Further, the resolved value is unchangeable for the resolution state as described above. Therefore, the resolved value is constant and permanent for the parametric constant across different executions of the API points within the same context. Conversely, different executions of API points dependent on a same parametric constant in different contexts reference different resolution states for the parametric constant. Therefore, different executions in different contexts may access different resolved values for the different resolution states of the same parametric constant.

4. PARAMETRIC APPLICATION PROGRAMMING INTERFACE (API) POINTS

Figure 8:
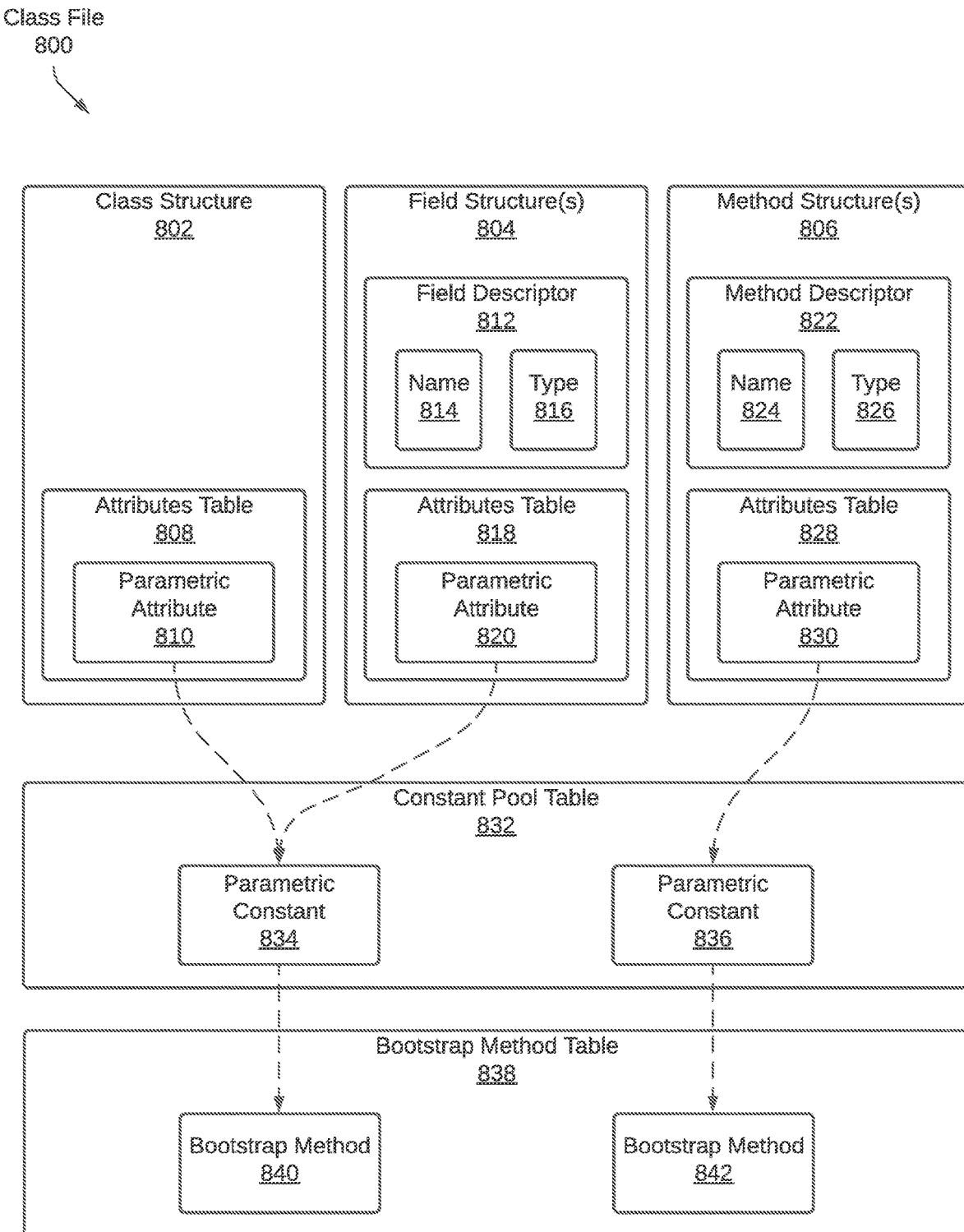
FIG. 8 illustrates a class file including one or more parametric API points according to an embodiment.

FIG. 8 illustrates a class file including one or more parametric API points according to an embodiment.

In one or more embodiments, a class file 800 for a type includes various information structures for different components of the type, including a class structure 802, one or more field structures 804, and one or more method structures 806. Further, a class file 800 includes a constant pool table 832 and a bootstrap method table 838. A class file 800 is similar to a class file 200 of FIG. 2. A class structure 802 is similar to a class structure 204 of FIG. 2. A field structure 804 is similar to a field structure 208 of FIG. 2. A method structure 806 is similar to a method structure 209 of FIG. 2. A constant pool table 832 is similar to a constant table 201 of FIG. 2.

In one or more embodiments, an information structure for an application programming interface (API) point is associated with a descriptor. The term "API point" as used herein refers to an interface, a class, a field, a method, and/or a constructor. As illustrated, a field structure 804 for a field in the type is associated with a descriptor 812; a method structure 806 for a method in the type is associated with a descriptor 822.

A descriptor for an API point indicates a name and type of the API point. As illustrated, descriptor 812 indicates name 814 and type 816 for field structure 804; descriptor 822 indicates name 824 and type 826 for method structure 806. A descriptor for a field indicates a name of the field and a type of the field. A type of a field may also be referred to specifically as a "field type." A descriptor for a method indicates a name of the method, and one or more types of a method return value, and zero or more method parameters.

In one or more embodiments, an information structure for an API point is associated with an attributes table. As illustrated, a class structure 802 for a type is associated with an attributes table 808; a field structure 804 for a field in the type is associated with an attributes table 818; a method structure 806 for a method in the type is associated with an attributes table 828. An attributes table (such as any of attributes tables 808, 818, 828) includes zero or more attributes associated with the corresponding API point.

In one or more embodiments, a parametric attribute (such as any of parametric attributes 810, 820, 830) is a kind of attribute that marks an API point as parametric and therefore specializable with respect to a particular context. If a parametric attribute is present in an information structure for an API point, then the API point is parametric. If no parametric attribute is present in an information structure for an API point, then the API point is invariant.

A parametric attribute includes an attribute name index, an attribute length, and a parametric constant reference. The attribute name index indicates an identifier for the parametric attribute (such as the string, "Parametric"). The attribute length indicates a length of the subsequent information in the parametric attribute. The parametric constant reference points to a constant (for example, the parametric constant reference is an index into the constant pool table 832) that is parametric. (The referenced parametric constant may be a specialization anchor constant, which is further discussed below with reference to specialization anchor constant 906 of FIG. 9.) Based on the reference from a parametric attribute, a dependency from the API point on the parametric constant is established. As illustrated, a parametric attribute 810 associated with a class structure 802 for a type references a parametric constant 834 within a constant pool table 832, thereby indicating that the type depends on the parametric constant 834. A parametric attribute 820 associated with a field structure 804 for a field in the type references the parametric constant 834 within the constant pool table 832, thereby indicating that the field depends on the parametric constant 834. A parametric attribute 830 associated with a method structure 806 for a method in the type references a parametric constant 836 within the constant pool table 832, thereby indicating that the method depends on the parametric constant 836.

In one or more embodiments, a constant pool table 832 of a type includes a set of entries corresponding to respective constants (such as parametric constants 834-836) defined by the type. Each entry is an information structure for a corresponding constant. An information structure for a constant includes a tag and an information array. The tag indicates a kind of the corresponding constant. The information array includes information about the corresponding constant. The information array may include, for example, a reference to a bootstrap method for the corresponding constant.

In one or more embodiments, a bootstrap method (such as any of bootstrap methods 840-842) for a constant is a method configured to bring a constant from an unresolved state to a resolution state. A bootstrap method is configured to determine a resolved value (or an error) for a resolution state of a constant. As illustrated, for example, bootstrap method 840 corresponds to parametric constant 834; bootstrap method 842 corresponds to parametric constant 836.

Figure 9:
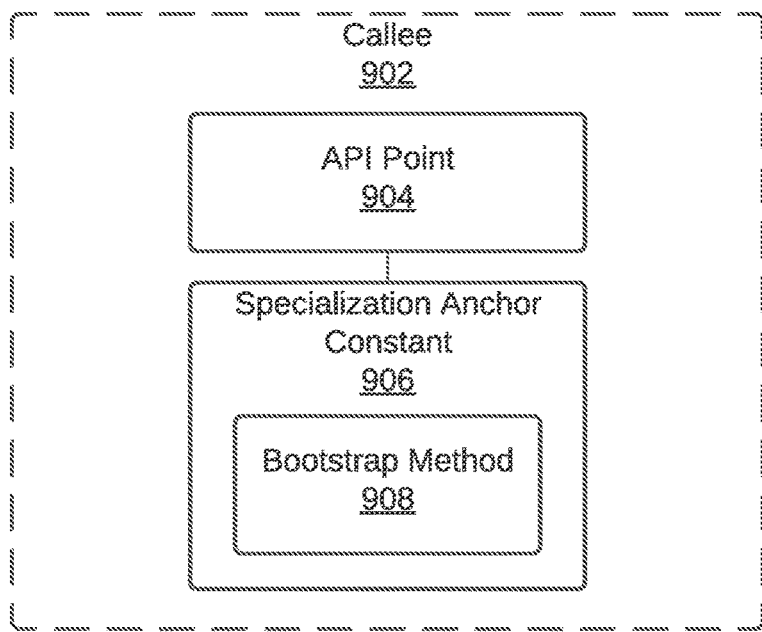
FIG. 9 illustrates information structures for a specialization anchor constant and a specialization linkage constant according to an embodiment.
Figure 9:
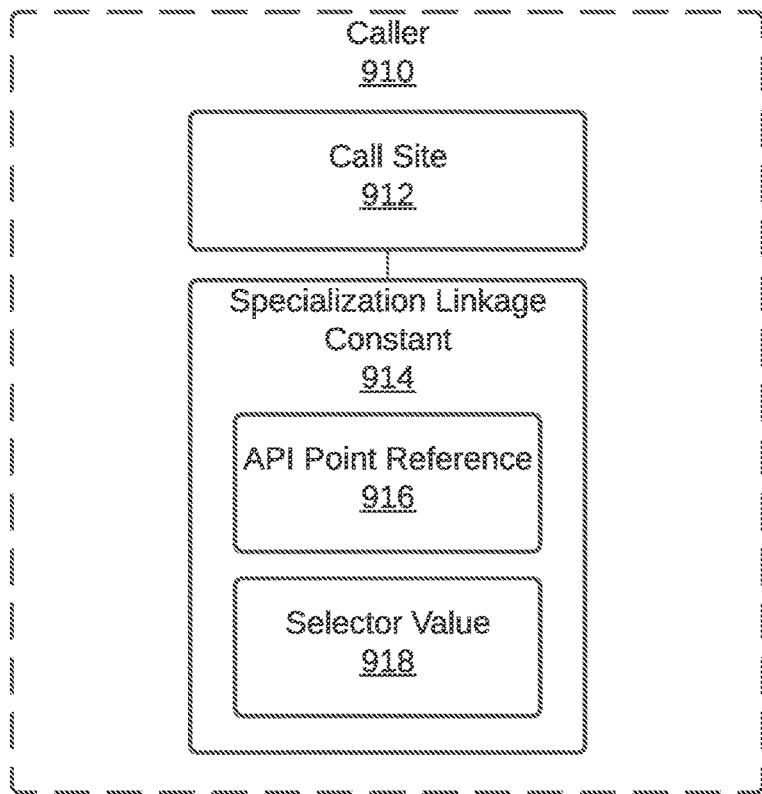

FIG. 9 illustrates information structures for a specialization anchor constant and a specialization linkage constant according to an embodiment.

In one or more embodiments, a callee 902 defines (or inherits from a supertype) an API point 904. Further the callee 902 defines a specialization anchor constant 906. A class file for the callee 902 may, for example, include an information structure for the API point 904, and an entry in a constant pool table for the specialization anchor constant 906. The term "caller" as used herein may refer to a type or method including a call to an API point, or may refer to the API point itself. A "caller" and a "callee" may reside in a same type or different types.

In one or more embodiments, a callee 902 specifies a dependency from an API point 904 on a specialization anchor constant 906. The API point 904 may, for example, be associated with a parametric attribute that includes a parametric constant reference to the specialization anchor constant 906. Though not illustrated, multiple API points defined by the callee 902 may depend on the same specialization anchor constant 906. Additionally or alternatively, another API point defined by the callee 902 may depend on another specialization anchor constant defined by the callee 902.

In one or more embodiments, a specialization anchor constant 906 (also referred to herein as an "anchor constant") is a parametric constant used to declare a distinct degree of freedom of parametricity for parametric API points defined by the type. An information structure for a specialization anchor constant 906 includes a tag, an anchor kind, and a bootstrap method reference. The tag indicates an identifier for the anchor constant. The anchor kind indicates a kind of parametricity associated with the anchor constant. The bootstrap method reference points to a bootstrap method 908 (for example, the bootstrap method reference is an index into a bootstrap method table in the callee 902).

In an embodiment, an anchor constant 906 may be associated with one of various kinds of parametricity. A "class parametricity" involves a degree of freedom that applies to a class as a whole. Additionally or alternatively, a "method parametricity" involves a degree of freedom that applies to a method. Each anchor constant of the "method parametricity" kind varies independently from other anchor constants in the same type. Additionally or alternatively, a "method and class parametricity" involves a degree of freedom that applies to a method. An anchor constant of the "method and class parametricity" kind, by definition, depends on another anchor constant of the "class parametricity" kind in the same type.

In an embodiment, a bootstrap method 908 is configured to bring an anchor constant 906 from an unresolved state to a resolution state. A bootstrap method 908 returns different resolved values for different resolution states of an anchor constant 906 within different contexts.

A bootstrap method 908 accepts as an argument a selector value 918 indicating a callee's 902 proposed specialization for the API point 904. A bootstrap method 908 may include operations configured to verify whether the selector value 918 is valid for the anchor constant 906. If the selector value 918 is valid, the bootstrap method 908 determines a set of specialization decisions for the API point 904 based on the selector value 918. The bootstrap method returns a resolved value for a resolution state of the anchor constant 906; the resolved value indicates the set of specialization decisions and may be referred to as an "anchor value," which is further discussed below with reference to anchor value 1302 of FIG. 13. However if the selector value 918 s not valid, the bootstrap method 908 returns an error for the resolution state of the anchor constant 906.

In one or more embodiments, a caller 910 defines a call site 912 and a specialization linkage constant 914. A class file for the caller 910 may include, for example, an instruction that calls an API point 904 of a callee 902. The class file for the caller 910 may further include an entry in a constant pool table for the specialization linkage constant 914. The term "callee" as used herein may refer to a type or method including an API point being called, or may refer to the API point itself. A "caller" and A "callee" may reside in a same type or different types.

In one or more embodiments, a caller 910 specifies an operand of an instruction at a call site 912. The operand may be either a reference to an API point 904 being called, or a specialization linkage constant 914. Where the operand is a specialization linkage constant 914, an association between the call site 912 and the specialization linkage constant 914 is established. Though not illustrated, multiple call sites defined by the caller 910 may be associated with the same specialization linkage constant 914. Additionally or alternatively, another call site defined by the caller 910 may be associated with a different specialization linkage constant defined by the caller 910.

In one or more embodiments, a specialization linkage constant 914 (also referred to as a "linkage constant") is a constant used to add parametric information to a call to an API point 904. An information structure for a specialization linkage constant 914 includes a tag, an API point reference 916, and a selector value 916 applicable to a call to the referenced API point 904. The tag indicates an identifier for the linkage constant. The API point reference 916 points to the API point 904 being called (for example, the API point reference is an index into the constant pool table in the caller 910 that corresponds to the API point 904, which may be referred to as a "symbolic reference" to the API point 904). The selector value 916 indicates a context for the call to the API point 904, as further described below.

In one or more embodiments, a selector value 916 is another constant defined by the caller 910. The selector value 916 may be previously validated by the callee 902, or may be unvalidated. If the selector value 916 is previously validated, then the selector value 916 is an anchor value, determined as a resolved value for a resolution state of the anchor constant 906. If the selector value 916 is unvalidated, then the selector value 916 includes information intended to request some specialization of the API point 904. For example, a callee requesting creation of List<Point> may reference a selector value that references the class List and the class Point. An unvalidated selector value 916 is input as an argument into the bootstrap method 908 for resolving the anchor constant 906.

Figure 10A:
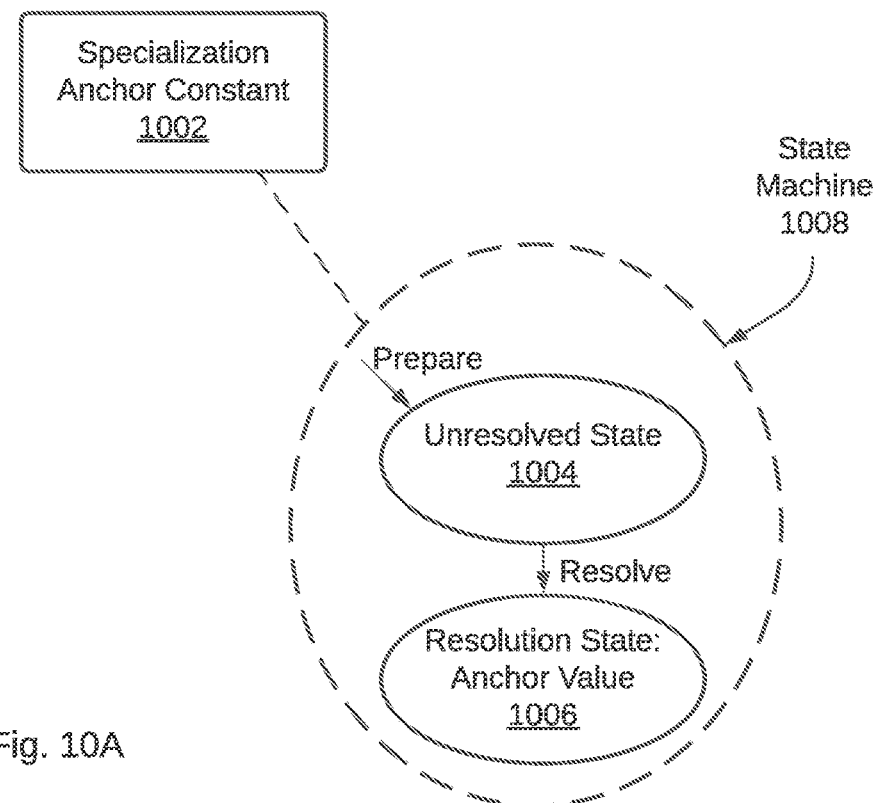
FIGS. 10A-10B illustrate state machines for a specialization anchor constant and a specialization linkage constant according to an embodiment.
Figure 10B:
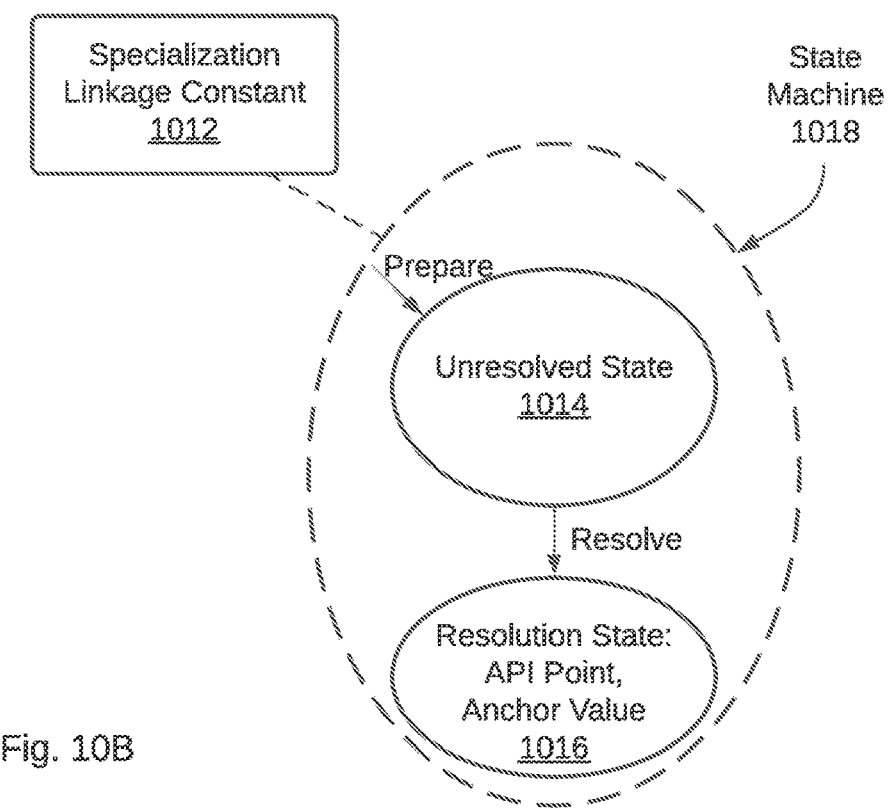

FIGS. 10A-10B illustrate state machines for a specialization anchor constant and a specialization linkage constant according to an embodiment.

In one or more embodiments, a specialization anchor constant 1002 may be associated with one or more state machines 1008. A state machine 1008 for an anchor constant 1002 includes two states: an unresolved state 1004 and a resolution state 1006. The anchor constant 1002 is first prepared and enters the unresolved state 1004. The anchor constant 1002 is then resolved (for example, via execution of a bootstrap method) and enters the resolution state 1006. Once in the resolution state 1006, the anchor constant 1002 cannot assume any other states within the state machine 1008. A resolved value determined for the resolution state 1006 is not changeable.

In one or more embodiments, unless the resolution state 1006 indicates an error, the resolution state 1006 indicates a set of specialization decisions for the anchor constant 1002 within a particular context—the context associated with a selector value provided by a callee. The set of specialization decisions may be embodied in an "anchor value," which is further discussed below with reference to anchor value 1302 of FIG. 13. In an embodiment, an anchor constant 906 is a loadable constant. The loadable value of an anchor constant 906 includes at least a subset of information indicated by the anchor value.

In one or more embodiments, an anchor constant 1002 is associated with (a) a state machine within a default context and (b) zero or more additional state machines within contexts supplied by callers to API points dependent on the anchor constant 1002. Each additional state machine is associated with a call to a dependent API point within a new context. However, the state machine within the default context is associated with an initial preparation and resolution of a type defining the anchor constant 1002. Within the state machine within the default context, the resolution state for the anchor constant 1002 is referred to as a "default resolution state," and the anchor value resolved for the anchor constant 1002 is referred to as a "default anchor value."

In one or more embodiments, a state machine 1018 for a specialization linkage constant 1012 includes two states: an unresolved state 1014 and a resolution state 1016. The linkage constant 1012 is first prepared and enters the unresolved state 1014. The linkage constant 1012 is then resolved and enters the resolution state 1016. Once in the resolution state 1016, the linkage constant 1012 cannot assume any other states within the state machine 1018. A resolved value determined for the resolution state 1016 is not changeable.

In one or more embodiments, unless the resolution state 1016 indicates an error, the resolution state 1016 indicates an API point and an anchor value determined for the anchor constant 1002 on which the API point depends. A resolved value for the resolution state 1016 includes a direct reference (rather than a symbolic reference) to the API point 904 and a direct reference to the anchor value. As described above, the anchor value embodies a set of specialization decisions by the callee based on a selector value provided by the caller.

Figure 11:
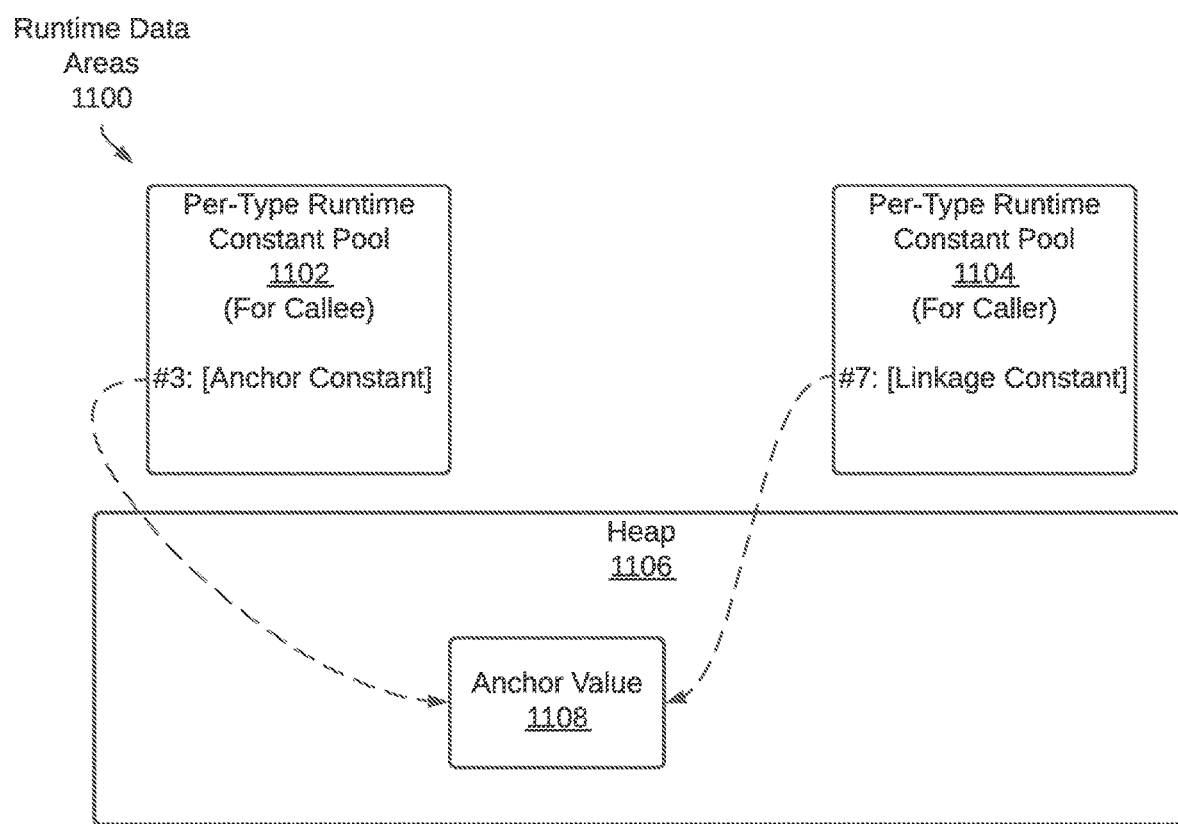
FIG. 11 illustrates storage of an anchor value included in resolved values for resolution states of a specialization anchor constant and a specialization linkage constant according to an embodiment.

FIG. 11 illustrates storage of an anchor value included in resolved values for resolution states of a specialization anchor constant and a specialization linkage constant according to an embodiment.

In one or more embodiments, runtime data areas 1100 of a virtual machine includes a per-type runtime constant pool 1102 associated with a callee, a per-type runtime constant pool 1104 associated with a caller, and a heap 1106. In an alternative embodiment, the callee and the caller may reside in a common type, and therefore be associated with the same per-type runtime constant pool.

In one or more embodiments, a callee defines an anchor constant. The anchor constant is within a constant pool table of the callee. The anchor constant occupies an entry in the callee's per-type constant pool 1102. As illustrated, for example, an anchor constant occupies Index #3.

In one or more embodiments, a resolved value for a resolution state of an anchor constant indicates an anchor value 1108. Therefore, a resolution state of the anchor constant includes a reference to the anchor value 1108 stored within the heap 1106.

In one or more embodiments, a caller defines a linkage constant. The linkage constant is within a constant pool table of the caller. The linkage constant occupies an entry in the caller's per-type constant pool 1102. As illustrated, for example, an linkage constant occupies Index #7.

In one or more embodiments, a resolved value for a resolution state of an linkage constant indicates an anchor value 1108 (and an API point specialized based on the anchor value 1108). Therefore, a resolution state of the linkage constant includes a reference to the anchor value 1108 stored within the heap 1106. Hence, each of the anchor constant and the linkage constant is resolved to point to a same anchor value 1108.

Figure 12A:
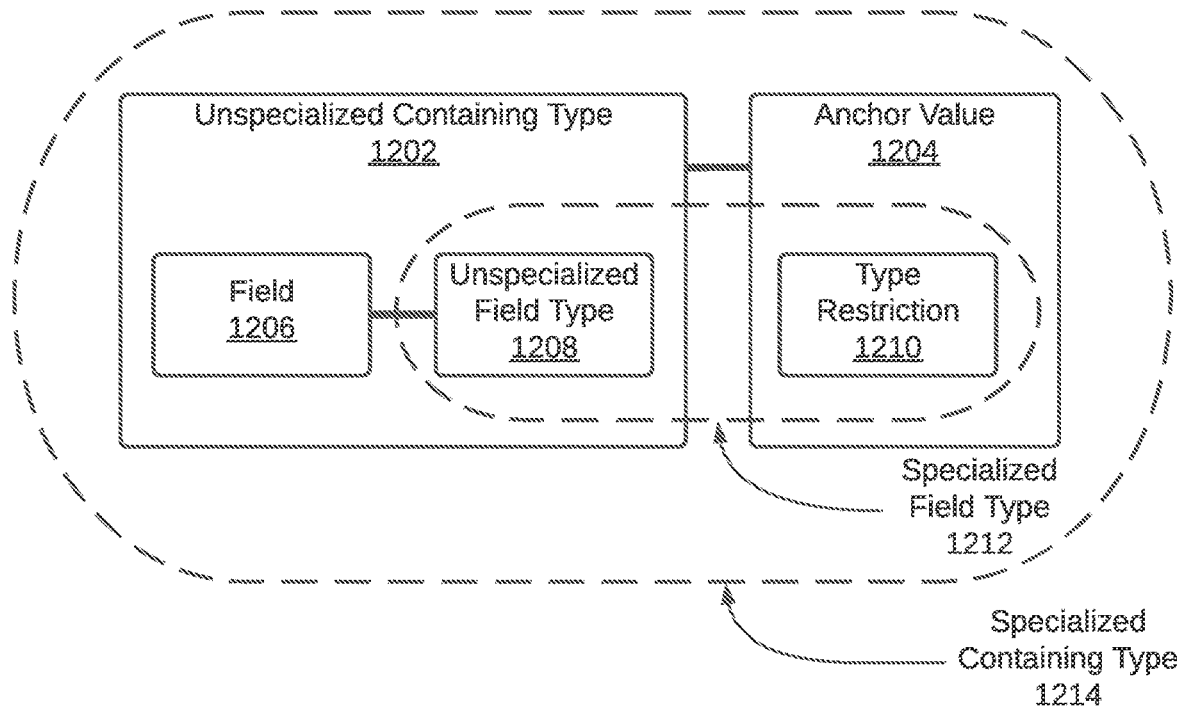
FIG. 12A illustrates an unspecialized type and a specialized type that is the unspecialized type specialized within a particular context according to an embodiment.

FIG. 12A illustrates an unspecialized type and a specialized type that is the unspecialized type specialized within a particular context according to an embodiment.

In one or more embodiments, an unspecialized type (such as an unspecialized containing type 1202, an unspecialized field type 1208, an unspecialized method parameter type (not illustrated), and/or an unspecialized method return value type (not illustrated)) is associated with a class structure (such as class structure 204 of FIG. 2). A class structure for an unspecialized type includes one or more of:

a definition of a constant pool table corresponding to the unspecialized type;
    an identification of a superclass (a default value, such as zero, may indicate a default class, such as Object);
    identification(s) of one or more superinterfaces;
    a fields table;
    a methods table; and/or
    an attributes table.

In an embodiment, each entry in a fields table is a field structure (such as field structure 208 of FIG. 2). A field structure provides a complete description of a field (such as field 1206) in the unspecialized type. A fields table includes fields declared by the unspecialized type; a fields table does not necessarily include fields that are inherited from superclasses or superinterfaces.

In an embodiment, a field structure for a field 1206 indicates a descriptor for the field 1206. The descriptor indicates a name and unspecialized field type 1208 of the field.

In an embodiment, a field 1206 is declared, in source code, as being parametrized over a type parameter T. During compilation into virtual machine instructions, the type parameter T is erased to become an upper bound type associated with the type parameter T. The upper bound type of the type parameter T is either specified in the source code, or assumed to be Object. The upper bound type of the type parameter T is used as the unspecialized field type 1208 of the field 1206. Therefore, the descriptor of the field 1206 indicates the upper bound type of the type parameter T as the unspecialized field type 1208 of the field 1206.

In an embodiment, each entry in a methods table is a method structure (such as method structure 209 of FIG. 2). A method structure provides a complete description of a method in the unspecialized type. A methods table includes methods declared by the unspecialized type; a methods table does not necessarily include methods that are inherited from superclasses or superinterfaces.

In an embodiment, a method structure for a method indicates a descriptor for the method. The descriptor indicates a name of the method, unspecialized types of method parameters (if any), and an unspecialized type of a method return value (if any).

In an embodiment, a method parameter and/or method return value of a method is declared, in source code, as being parametrized over a type parameter T. During compilation into virtual machine instructions, the type parameter T is erased to become an upper bound type associated with the type parameter T. The upper bound type of the type parameter T is either specified in the source code, or assumed to be Object. The upper bound type of the type parameter T is used as an unspecialized method parameter type and/or unspecialized method return value type associated with the method. Therefore, the descriptor of the method indicates the upper bound type of the type parameter T as the unspecialized method parameter type and/or unspecialized method return value type.

In one or more embodiments, a specialized type (such as a specialized containing type 1214, a specialized field type 1212, a specialized method parameter type (not illustrated), and/or a specialized method return value type (not illustrated)) is an unspecialized type specialized within a particular context 1204.

As illustrated, for example, an unspecialized containing type 1202 defines a field 1206 and specifies that the field 1206 is of an unspecialized field type 1208. In particular, the unspecialized containing type 1202 provides a descriptor corresponding to the field 1206 that indicates the unspecialized field type 1208 for the field 1206. The unspecialized containing type 1202 may further define a method (not illustrated) associated with an unspecialized method parameter type and an unspecialized method return value type. In particular, the unspecialized containing type 1202 provides a descriptor corresponding to the method that indicates the unspecialized method parameter type and the unspecialized method return value type for the method.

A caller may call the unspecialized containing type 1202, the field 1208 in the unspecialized containing type 1202, and/or the method in the unspecialized containing type 1202. The caller may make the call within a particular context 1204. The caller may specify the context 1204 by, for example, specifying an anchor value.

The unspecialized containing type 1202 specialized within the particular context 1204 is a specialized containing type 1214. The specialized containing type 1214 may be the unspecialized containing type 1202 called in conjunction with the anchor value. An object (or class minor) represents the unspecialized containing type 1202; a different object (or class mirror) represents the specialized containing type 1214.

Additionally or alternatively, the unspecialized field type 1208 specialized within the particular context 1204 is a specialized field type 1212. The specialized field type 1212 is the unspecialized field type 1208 adorned with one or more type restrictions 1210 indicated by the particular context 1204. The type restrictions 1210 may be indicated by the anchor value. A type restriction 1210 prohibits the field 1206 from assuming one or more values that are valid for the unspecialized field type 1208.

Additionally or alternatively, the unspecialized method parameter type specialized within the particular context 1204 is a specialized method parameter type. The unspecialized method return value type specialized within the particular context 1204 is a specialized method return value type. The specialized method parameter type and/or method return value type is the unspecialized method parameter type and/or method return value type adorned with one or more type restrictions indicated by the particular context 1204. The type restrictions may be indicated by the anchor value. A type restriction prohibits the method parameter and/or method return value from assuming one or more values that are valid for the unspecialized method parameter type and/or method return value type. A particular context 1204 may provide same or different type restrictions to fields, method parameters, and/or method return values in a same specialized containing type 1214.

Therefore, an unspecialized containing type 1202 "indicates" an unspecialized field type 1208 of a field 1206; a specialized containing type 1214 "indicates" a specialized field type 1212 of the same field 1206. Additionally or alternatively, a descriptor corresponding to a field 1206 "indicates" an unspecialized field type 1208 of the field 1206; a context 1204 (which may be provided by an anchor value), together with the descriptor, "indicates" a specialized field type 1212 of the field 1206.

Figure 12B:
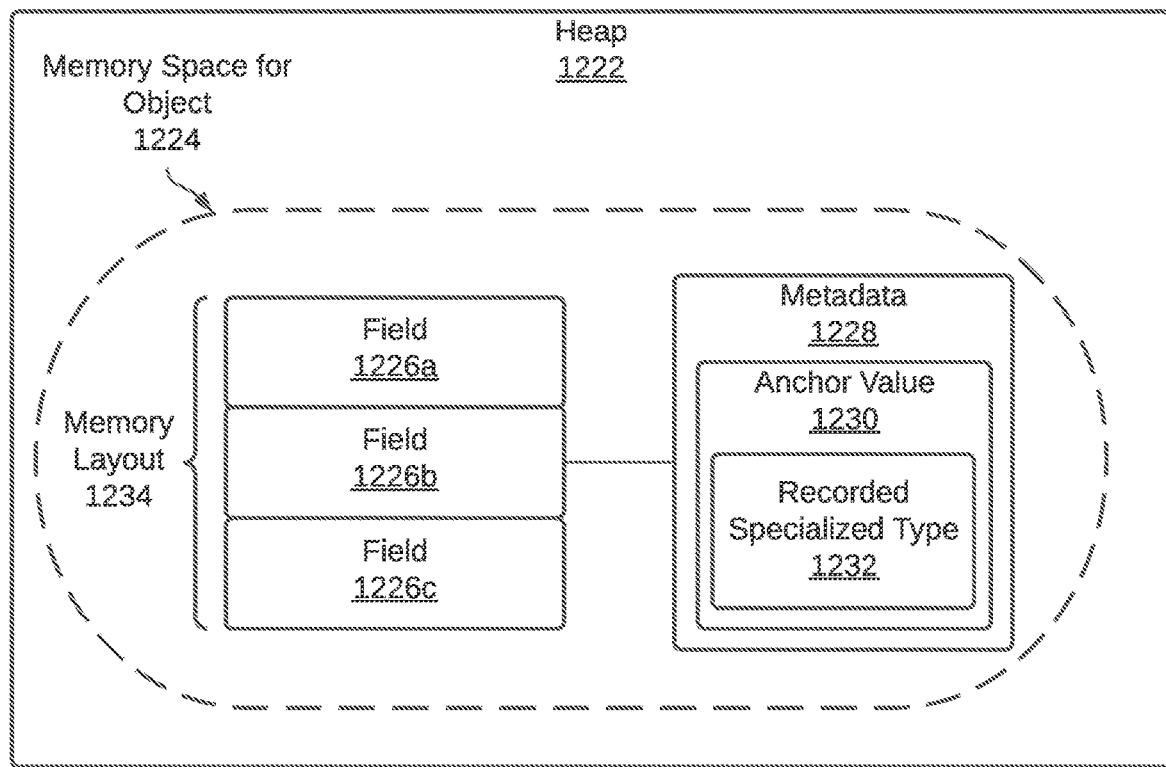
FIG. 12B illustrates an object of a specialized type according to an embodiment.

FIG. 12B illustrates an object of a specialized type according to an embodiment.

In one or more embodiments, a type (unspecialized or specialized) is associated with a memory layout. A memory layout defines a sequence of fields of the type, and a respective size of each field. Further, the type is associated with a memory size. The memory size includes a total size of all fields of the type.

In one or more embodiments, an underlying unspecialized type defines (or inherits) fields 1226*a-c*. A specialized type results from the underlying unspecialized type specialized based on an anchor value 1230. In an embodiment, a memory layout 1234 for the specialized type may be same as or different from an underlying unspecialized type. In particular, sizes of fields 1226*a-c* may be modified based on one or more type restrictions, or other information, indicated by the anchor value 1230. Additionally or alternatively, a sequence of fields 1226*a-c* may be modified based on one or more type restrictions, or other information, indicated by the anchor value 1230. Given a modified memory layout 1234, the specialized type may be associated with a different memory size than the underlying unspecialized type.

In one or more embodiments, an object of a specialized type is stored in accordance with a memory layout and/or memory size associated with the specialized type. As illustrated, for example, an object of a specialized type occupies a memory space 1224 within a heap 1222. The object is associated with a memory layout 1234 of the specialized type. The memory layout 1234 provides how fields 1226*a-c* are stored within the memory space 1224. The object is associated with a a memory size of the specialized type.

In one or more embodiments, an object of a specialized type is stored in association with the specialized type. As illustrated, for example, an object of a specialized type is associated with metadata 1228. The metadata 1228 may be stored, for example, in a header of the object. The metadata 1228 indicates an anchor value 1230 providing specialization for the specialized type. The metadata 1228 indicates a recorded specialized type 1232 for the object. The recorded specialized type 1232 is the specialized type of the object, as recorded in association with the object. The recorded specialized type 1232 may be indicated, for example, using a reference to an object (such as a class mirror) representing the specialized type.

FIG. 13 illustrates a resolved value, namely an anchor value, for a resolution state of a specialization anchor constant according to an embodiment.

In one or more embodiments, an anchor value 1302 stores a set of specialization decisions for an API point defined by a caller based on a selector value provided by a callee. An anchor value 1302 is an object stored on a heap. An anchor value 1302 is an object of a particular type, which may be referred to as "specialization anchor." The "specialization anchor" type may define one or more fields indicating the following information: anchor constant 1304, selector value 1306, dependent constant 1307, memory layout 1308, memory size 1310, object (such as a class minor) 1312 representing a specialized class, type restriction 1314, and/or associated default anchor value 1316.

In one or more embodiments, an anchor value 1302 stores a reference to an anchor constant 1304 bound to the anchor value 1302. The reference points to the anchor constant 1304 within the runtime constant pool of the type that defines the anchor constant 1304.

In one or more embodiments, an anchor value 1302 stores reference(s) to one or more relevant selector values 1306. A particular selector value 1306 is relevant to an anchor value 1302 if an anchor constant 1304 is resolved to the anchor value 1302 based on the particular selector value 1306.

In one or more embodiments, an anchor value 1302 stores reference(s) to one or more dependent constants 1307. In an embodiment, a constant A is referred to as being "dependent" on another constant B if and only if at least one of the following circumstances is true:

A contains an index referring to B;

A contains an index referring to a bootstrap method in the type that defines A, and one of the static arguments of the bootstrap method refers to B;

A is an anchor constant of the "method and class parametricity" kind and B is the corresponding anchor constant of the "class parametricity" kind.

When an anchor value 1302 is determined, the dependent constants 1307 are prepared but not necessarily resolved. Each dependent constant 1307 may be independently resolved upon initial use.

In one or more embodiments, an anchor value 1302 stores a memory layout 1308 for a specialized type resulting from specializing an underlying unspecialized type based on the anchor value 1302. As an example, a memory layout 1308 for a specialized type may indicate that a field is of a particular size, whereas a memory layout for the underlying unspecialized type may indicate that the field is of a different size. As another example, a memory layout 1308 for a specialized type may indicate that a field is inlined, whereas a memory layout for the underlying unspecialized type may indicate that the field is referenced.

In an embodiment, a memory layout 1308 for a specialized type may be determined based on one or more type restrictions 1314 applicable to one or more API points in the specialized type. The memory layout 1308 and the associated type restrictions 1314 may be indicated in the same anchor value 1302.

In one or more embodiments, an anchor value 1302 stores a memory size 1310 for a specialized type resulting from specializing an underlying unspecialized type based on the anchor value 1302. The memory size 1310 may be determined based on adding the respective memory sizes of the fields in the specialized type, as provided by the memory layout 1308.

In one or more embodiments, an anchor value 1302 stores a reference to an object (such as a class mirror) representing a specialized type resulting from specializing an underlying unspecialized type based on the anchor value 1302.

In one or more embodiments, an anchor value 1302 stores one or more type restrictions applicable to one or more API points that are co-dependent on the anchor constant 1304. A type restriction prohibits an API point from assuming a value that is valid for an unspecialized type of the API point. The unspecialized type of the API point adorned with the type restriction is a specialized type of the API point.

In one or more embodiments, an anchor value 1302 stores a reference to an associated default anchor value 1316. As described above, a default anchor value is resolved for an anchor constant during an initial preparation and resolution of a type defining the anchor constant. A default anchor value for a particular anchor constant is referred to as being "associated" with an anchor value 1302 (determined in a different context) for the same particular anchor constant.

Figure 14:
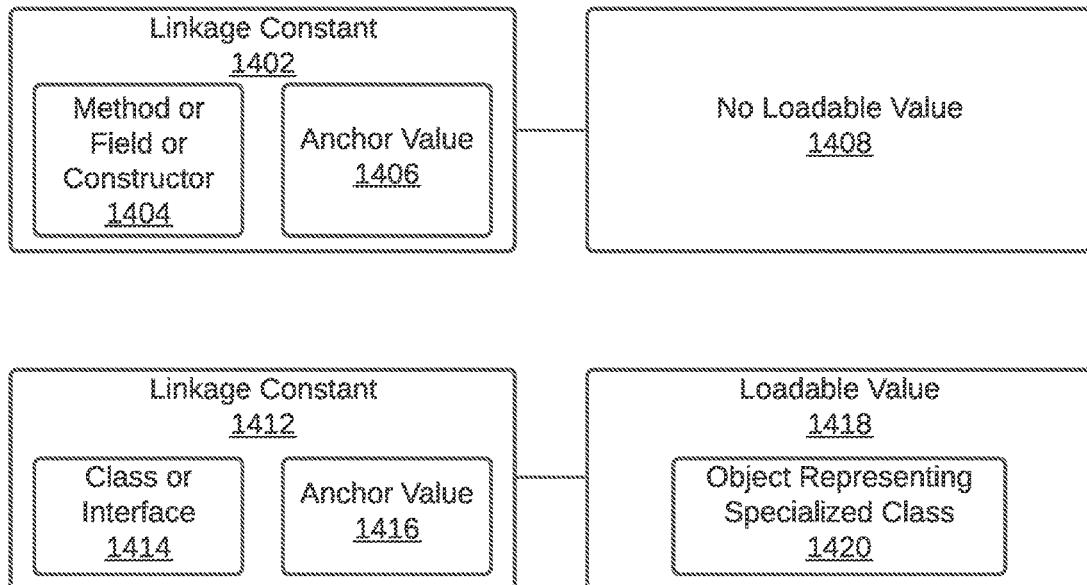
FIG. 14 illustrates encapsulation of specialization decisions via restrictions on loadable values of specialization linkage constants according to an embodiment.

FIG. 14 illustrates encapsulation of specialization decisions via restrictions on loadable values of specialization linkage constants according to an embodiment.

In one or more embodiments, a linkage constant 1402 wraps around an API point that is a method, field, or constructor 1404. A resolved value 1402 for the linkage constant 1402 indicates (a) the method, field, or constructor 1404 and (b) an anchor value 1406 specializing the method, field, or constructor 1404. While the linkage constant 1402 is defined by the caller to the API point, the linkage constant 1402 has no loadable value 1408. Therefore, the anchor value 1406 is not accessible to the caller.

In one or more embodiments, a linkage constant 1412 wraps around an API point that is a class or interface 1414. A resolved value 1412 for the linkage constant 1412 indicates (a) the class or interface 1414 and (b) an anchor value 1416 specializing the class or interface 1414. While the linkage constant 1412 is defined by the caller to the API point, a loadable value 1418 of the linkage constant 1402 includes an object representing the specialized class 1420, as indicated by the anchor value 1416; the loadable value 1418 does not include other information provided by the anchor value 1416. Therefore, the full value of the anchor value 1406 is not accessible to the caller.

Figure 15:
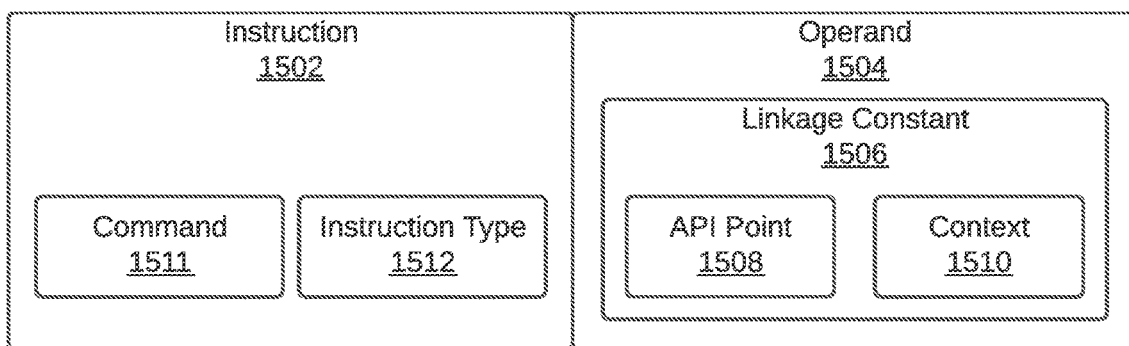
FIG. 15 illustrates a call to a parametric API point according to an embodiment.

FIG. 15 illustrates a call to a parametric API point according to an embodiment.

In one or more embodiments, a bytecode 1500 includes an instruction 1502 and an operand 1504.

In one or more embodiments, an instruction 1502 is associated with a command 1511 and an instruction type 1512. A command 1511 provides an action to be executed (such as invoking a method, creating an object, accessing a field, and/or accessing a local variable). An instruction type 1512 provides a type of an operand 1504 (such as int, double, reference) to be operated upon using the command 1511.

In an embodiment, an instruction type 1512 of an instruction 1502 is determined based on a context 1510 associated with the instruction 1502. In particular an instruction type 1512 may be narrowed based on a type restriction applicable within the context 1510. A compiler may translate a source code instruction to a virtual machine instruction of a narrower instruction type based on a type restriction; additionally or alternatively, an interpreter may translate a virtual machine instruction to a machine code instruction of a narrower instruction type based on a type restriction. As an example, an unspecialized field type of a particular field may be Object. An instruction operating on the particular field without specialization may be of an instruction type associated with reference, such as aload. A specialized containing type may adorn the unspecialized field type with a type restriction, restricting the particular field to values of int. The specialized containing type may be associated with a memory layout that inlines the int value for the particular field within an instance of the specialized type. Hence, an instruction operating on the particular field may treat the particular field as having a specialized field type of int. The instruction may be of an instruction type associated with int, such as iload.

In one or more embodiments, an operand 1504 may be an API point 708, a linkage constant 1506, and/or another data structure. Where the operand 1504 is a linkage constant 1506, the operand 1504 adds parametric information to the API point 1508 that is wrapped by the linkage constant 1506 and being called. The linkage constant 1506 further supplies a context 1510 for the call to the API point 1508. The context 1510 may indicate one or more type restrictions to be applied to a type, field, method parameter, and/or method return value.

In an embodiment, a context 1510 within which a same resolution state of an anchor constant is accessed may be defined by a selector value and/or an anchor value. Where the linkage constant 1506 is not resolved, a context 1510 is provided as a selector value. Every access to an anchor constant using a same selector value accesses the same resolution state for the anchor constant. (An access to the anchor constant using a different selector value may access a different resolution state for the anchor constant.) Where the linkage constant 1506 is resolved, a context 1510 is provided as a selector value and/or an anchor value. Every access to an anchor constant using a same anchor value accesses the same resolution state for the anchor constant. (An access to the anchor constant using a different anchor value may access a different resolution state for the anchor constant.)

5. RESOLVING A SPECIALIZATION ANCHOR CONSTANT AND A SPECIALIZATION LINKAGE CONSTANT

One or more operations illustrated in FIGS. 16-19 may be modified, rearranged, or omitted all together. Accordingly, the particular sequence of operations illustrated in FIGS. 16-19 should not be construed as limiting the scope of one or more embodiments.

Figure 16:
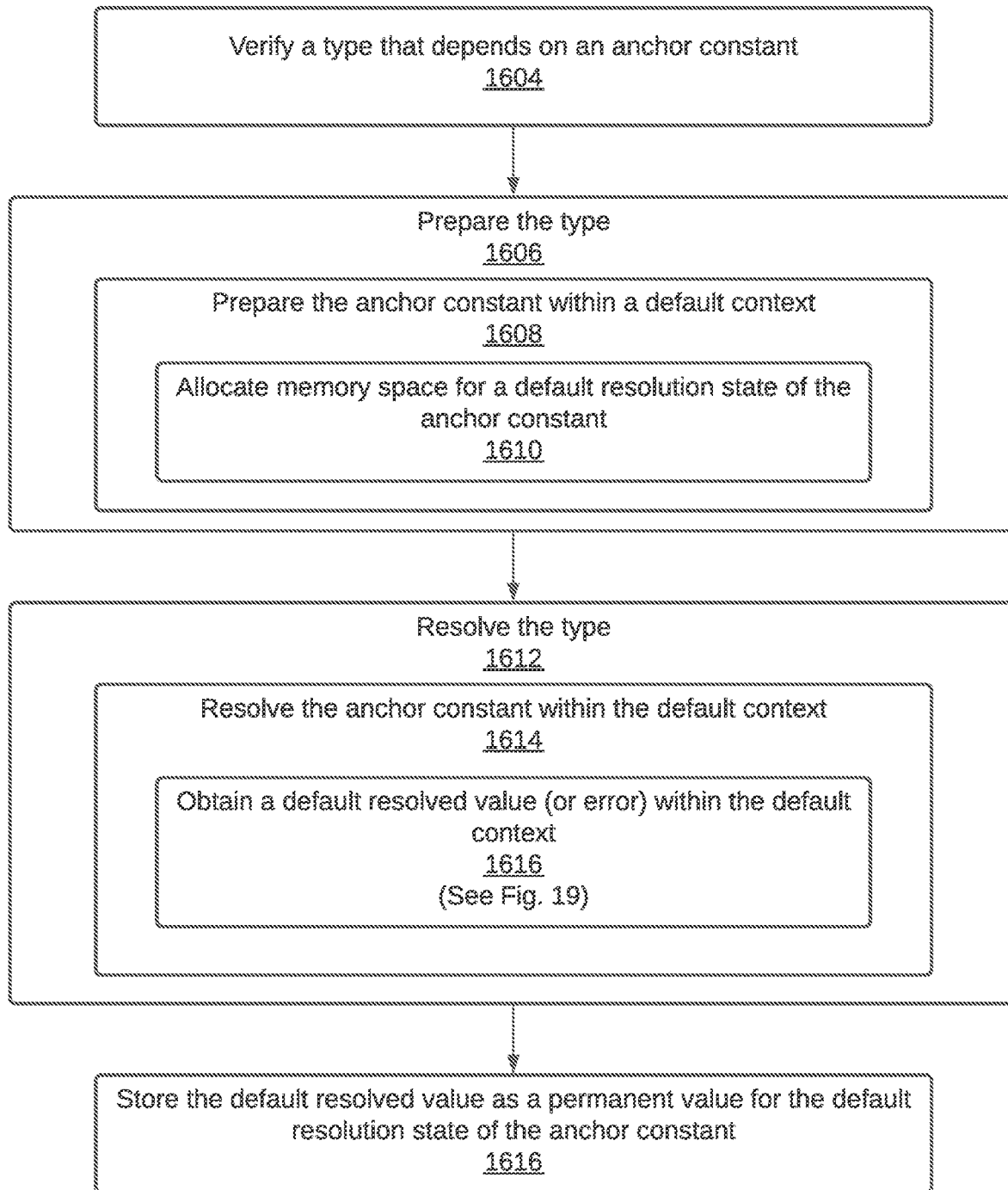
FIG. 16 illustrates an example set of operations for preparing and resolving a type in a runtime environment, including preparing and resolving a parametric constant within a default context, according to an embodiment.

FIG. 16 illustrates an example set of operations for preparing and resolving a type in a runtime environment, including preparing and resolving a parametric constant within a default context, according to an embodiment. The operations of FIG. 16 may be performed within a linking stage. Linking a type in a runtime environment involves verifying and preparing the type, the type's direct superclass, the type's direct superinterfaces, and the type's element type (if the type is an array type), if necessary. Linking also involves resolution of symbolic references in the type, though not necessarily at the same time as the type is verified and prepared. Further examples relating to linking be found in the Java® Virtual Machine Specification, Java SE 16 Edition, published Feb. 12, 2021, available at https://docs.oracle.com/javase/specs/jvms/se16/html/index.html, which is hereby incorporated by reference in full.

One or more embodiments include verifying a type that depends on an anchor constant (Operation 1604). Verification ensures that the binary representation of a type is structurally correct. Verification may cause additional types to be loaded but need not cause the additional types to be verified or prepared.

One or more embodiments include preparing the type (Operation 1606). Preparation involves creating the static fields for the type. Preparing further involves initializing the static fields to the static field's default values. Preparation does not necessarily require the execution of any virtual machine code; explicit initializers for static fields may be executed as part of initialization, not preparation. During preparation of the type, loading constraints may be imposed. Preparation of the type may occur at any time following creation of the type but is completed prior to initialization of the type.

In one or more embodiments, preparing the type includes preparing the anchor constant (Operation 1608). Preparing the anchor constant includes allocating memory space for a default resolution state of the anchor constant (Operation 1610). The virtual machine allocates a memory space in heap for storing a (default) resolved value for the default resolution state of the anchor constant. The size of the memory space allocated is determined based on a size associated with a type of the resolved value for the anchor constant. In an embodiment, the resolved value is an anchor value, which an object of a "specialization anchor" type. Therefore, a memory space of a memory size associated with the "specialization anchor" type is allocated.

One or more embodiments include resolving the type (Operation 1612). Many virtual machine instructions rely on symbolic references in a runtime constant pool. The symbolic reference may be to, for example, (i) a class or interface, (ii) a field, (iii) a method, (iv) a method type, (v) a method handle, or (vi) a dynamically-computed constant. Initially, all symbolic references in the runtime constant pool are unresolved. Execution of instructions relying on a symbolic reference requires resolution of the symbolic reference. Resolution is the process of dynamically determining one or more concrete values from a symbolic reference in the runtime constant pool. If a resolution succeeds, subsequent attempts to resolve the symbolic reference succeed trivially and result in the same entity produced by the initial resolution. If the symbolic reference is to a dynamically-computed constant, the bootstrap method is not necessarily re-executed for the subsequent attempts. If the resolution does not succeed, subsequent attempts to resolve the symbolic reference fail with the same error that was thrown as a result of the initial resolution attempt. If the symbolic reference is to a dynamically-computed constant, the bootstrap method is not necessarily re-executed for the subsequent attempts.

In one or more embodiments, resolving the type includes resolving the anchor constant within a default context (Operation 1614). Resolving the anchor constant within the default context includes obtaining a default resolved value (or error) within the default context (Operation 1616). The default context applies where a caller attempts to use the anchor constant (for example, in association with an API point or constant that depends on the anchor constant) without supplying an explicit context. If the anchor constant is successfully resolved within the default context, then a default resolved value is determined. The default resolved value is a default anchor value for the anchor constant. The default anchor value may apply no modifications to an unspecialized type of the API point. For example, the default anchor value may indicate a memory layout and/or memory size that is same as the unspecialized type of the API point; the default anchor value may impose no type restrictions on the API point. If the anchor constant is not successfully resolved within the default context, then an error within the default context is determined. Further examples relating to obtaining a resolved value (or error) within a particular context are described below with reference to FIG. 19.

In an embodiment, the resolution of the anchor constant within the default context is performed during a resolution of the type defining the anchor constant. Therefore, the resolution process may be performed via executing a method defined by the runtime environment, rather than a bootstrap method corresponding to the anchor constant.

One or more embodiments include storing the default resolved value as a permanent value for the default resolution state of the anchor constant (Operation 1616). If the anchor constant is successfully resolved within the default context, then the default resolved value is stored as a permanent value for the default resolution state of the anchor constant. If the anchor constant is not successfully resolved within the default context, then the error within the default context is stored as a permanent value for the default resolution state of the anchor constant.

Figure 17:
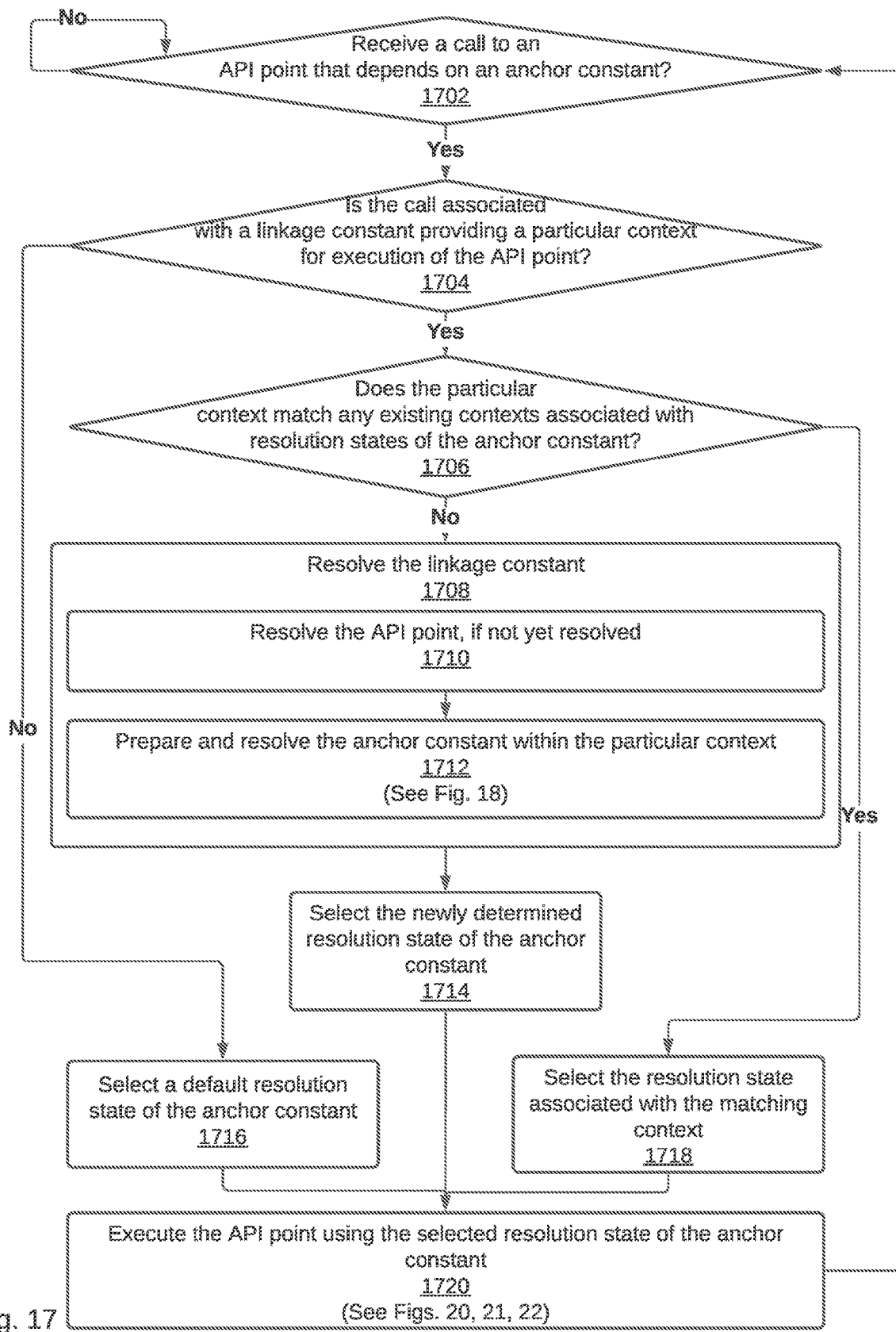
FIG. 17 illustrates an example set of operations for executing a parametric API point within a particular context, including selecting a resolution state of a parametric constant associated with the particular context, according to an embodiment.

FIG. 17 illustrates an example set of operations for executing a parametric API point within a particular context, including selecting a resolution state of a parametric constant associated with the particular context, according to an embodiment.

One or more embodiments include receiving a call to an API point that depends on an anchor constant (Operation 1702). A callee receives a call to an API point that depends on an anchor constant. The API point is defined in the callee, or the API point is defined in a supertype of the callee and inherited by the callee. The anchor constant is defined in the callee, such as being defined within a constant pool table of the callee.

One or more embodiments include determining whether the call is associated with a linkage constant providing a particular context for execution of the API point (Operation 1704). The callee determines whether the call is associated with a linkage constant providing a particular context for execution of the API point. Where a call is associated with a linkage constant, the linkage constant is passed from a call stack associated with the caller to a call stack associated with the callee. Therefore, the call is associated with a linkage constant if the linkage constant is accessible within the call stack associated with the callee.

If the call is not associated with a linkage constant, one or more embodiments include selecting a default resolution state of the anchor constant (Operation 1716). The callee selects a default resolution state of the anchor constant. The default resolution state may be determined during a linking stage of a type defining the anchor constant, as described above with reference to FIG. 16.

If the call is associated with a linkage constant, one or more embodiments include determining whether the particular context matches any existing contexts associated with resolution states of the anchor constant (Operation 1718). Different resolution states of the anchor constant are associated with different contexts. The callee determines whether the particular context provided by the call matches any existing contexts associated with resolution states of the anchor constant.

If the particular context is provided as an unresolved linkage constant, and the unresolved linkage constant is not associated with a selector value that equals any anchor value previously resolved for the anchor constant, then the callee determines that particular context does not match any existing contexts associated with resolution states of the anchor constant.

If the particular context is provided as an unresolved linkage constant, and the unresolved linkage constant is associated with a selector value that equals a particular anchor value previously resolved for the anchor constant, then the callee determines that particular context matches a context associated with the particular anchor value.

If the particular context is provided as a resolved linkage constant, and the resolved linkage constant is associated with a particular anchor value previously resolved for the anchor constant, then the callee determines that particular context matches a context associated with the particular anchor value.

If the particular context matches an existing context associated with a particular resolution state of the anchor constant, one or more embodiments include selecting the resolution state associated with the matching context (Operation 1718). The callee selects the resolution state, for the anchor constant, associated with the matching context. A resolved value for the resolution state associated with the matching context thereby provides a specialization for the API point.

Hence, if (a) the particular context is provided as an unresolved linkage constant, and the unresolved linkage constant is associated with a selector value that equals a particular anchor value previously resolved for the anchor constant, or (b) the particular context is provided as a resolved linkage constant, and the resolved linkage constant is associated with a particular anchor value previously resolved for the anchor constant, then the callee selects the resolution state associated with the particular anchor value.

If the particular context does not match any existing context associated with resolution states of the anchor constant, one or more embodiments include resolving the linkage constant (Operation 1708).

In one or more embodiments, resolving the linkage constant includes resolving the API point, if not yet resolved (Operation 1710). An unresolved linkage constant initially includes a symbolic reference to an API point to be called. The symbolic reference is resolved to a direct reference to the API point.

In one or more embodiments, resolving the linkage constant includes preparing and resolving the anchor constant within the particular context (Operation 1712). Further examples relating to preparing and resolving an anchor constant within a particular context are described below with reference to FIG. 18.

One or more embodiments include selecting the newly determined resolution state of the anchor constant (Operation 1714). The callee selects the newly determined resolution state of the anchor constant. A resolved value for the newly determined resolution state thereby provides a specialization for the API point.

One or more embodiments include executing the API point using the selected resolution state of the anchor constant (Operation 1720). The callee executes the API point using the selected resolution state of the anchor constant. Further examples relating to executing an API point using a particular resolution state of an anchor constant are described below with reference to FIGS. 20-22.

One or more embodiments include executing the operations of FIG. 17 with respect to each call to an API point that depends on the same anchor constant. Different calls to the same API point that depends on the anchor constant trigger execution of the operations of FIG. 17, wherein different resolution states of the same anchor constant may be selected based on Operations 1714-1718. Additionally or alternatively, different calls to different API points that depend on the same anchor constant trigger execution of the operations of FIG. 17, wherein different resolution states of the same anchor constant may be selected based on Operations 1714-1718.

Figure 18:
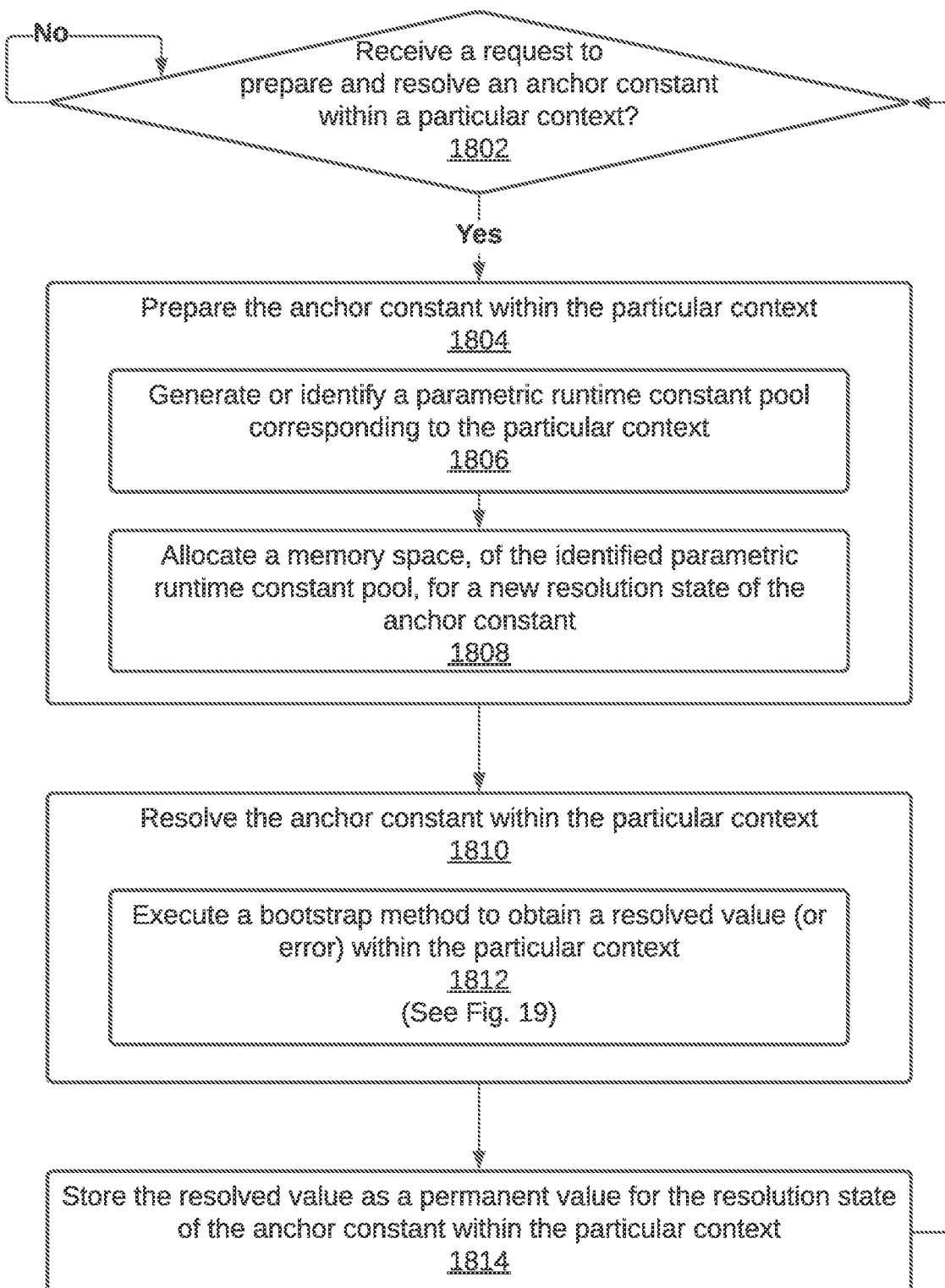
FIG. 18 illustrates an example set of operations for preparing and resolving a parametric constant within particular contexts provided by calls to parametric API points dependent on the parametric constant according to an embodiment.

FIG. 18 illustrates an example set of operations for preparing and resolving a parametric constant within particular contexts provided by calls to parametric API points dependent on the parametric constant according to an embodiment.

One or more embodiments include receiving a request to prepare and resolve an anchor constant within a particular context (Operation 1802). A caller makes a call to an API point that depends on an anchor constant. The call is made within a particular context. As an example, a call to an API point is made using an instruction and an operand. The operand is a linkage constant. The linkage constant is unresolved. An information structure for the linkage constant indicates a selector value. The selector value thereby provides a particular context for the call to the API point.

Responsive to the call to the API point, a stack frame associated with the callee is pushed onto a call stack. The stack frame associated with the callee corresponds to execution of the API point responsive to the call made by the caller. Information representing the API point, such as direct reference to the API point, is passed from the stack frame associated with the caller to the stack frame associated with the callee. Further information representing the particular context, such as a selector value and/or an anchor value, is passed from the stack frame associated with the caller to the stack frame associated with the callee. The callee determines whether the API point is associated with a parametric attribute. The callee identifies an anchor constant referenced by the parametric attribute of the API point. The callee thereby receives a request to prepare and resolve the anchor constant within the particular context.

One or more embodiments include preparing the anchor constant within the particular context (Operation 1804). Preparing the anchor constant within the particular context includes generating or identifying a parametric runtime constant pool corresponding to the particular context (Operation 1806). The callee identifies a set of zero or more parametric runtime constant pools associated with a type defining (or inheriting) the API point being called. The callee determines whether the particular context matches any context associated with the existing set of parametric runtime constant pools. The callee identifies the parametric runtime constant pool associated with the matching context. Otherwise, the callee generates a new parametric runtime constant pool associated with the particular context.

Preparing the anchor constant within the particular context includes allocating a memory space, of the identified parametric runtime constant pool, for a new resolution state of the anchor constant (Operation 1808). The callee allocates a memory space for a new resolution state of the anchor constant. The identified memory space is within the parametric runtime constant pool generated or identified at Operation 1806. Examples of operations relating to allocating memory space for a resolution state of an anchor constant are further described above with reference to Operation 1610 of FIG. 16.

One or more embodiments include resolving the anchor constant within the particular context (Operation 1810). Resolving the anchor constant within the particular context includes executing a bootstrap method associated with the anchor constant to obtain a resolved value (or error) within the particular context (Operation 1812). The callee identifies an information structure for the anchor constant. The information structure for the anchor constant references a bootstrap method corresponding to the anchor constant. The callee inputs information indicating the particular context into the bootstrap method.

If the anchor constant is successfully resolved within the particular context, then a resolved value within the particular context is determined. The resolved value is an anchor value for the anchor constant within the particular context. The anchor value records a set of specialization decisions for the API point within the particular context. If the anchor constant is not successfully resolved within the particular context, then an error within the particular context is determined. Further examples relating to obtaining a resolved value (or error) within a particular context are described below with reference to FIG. 19.

In an embodiment, resolution of the anchor constant within a particular context provided by a caller may be performed via executing a bootstrap method corresponding to the anchor constant. Different calls to one or more API points dependent on the same anchor constant may be made within different contexts. Each call within a different context triggers execution of the same bootstrap method corresponding to the anchor constant. However, each execution of the bootstrap method involves the input of different contexts, such as via different selector values.

One or more embodiments include storing the resolved value as a permanent value for the resolution state of the anchor constant within the particular context (Operation 1814). If the anchor constant is successfully resolved within the particular context, then the resolved value is stored as a permanent value for the resolution state of the anchor constant within the particular context. If the anchor constant is not successfully resolved within the particular context, then the error within the particular context is stored as a permanent value for the resolution state of the anchor constant within the particular context.

Figure 19:
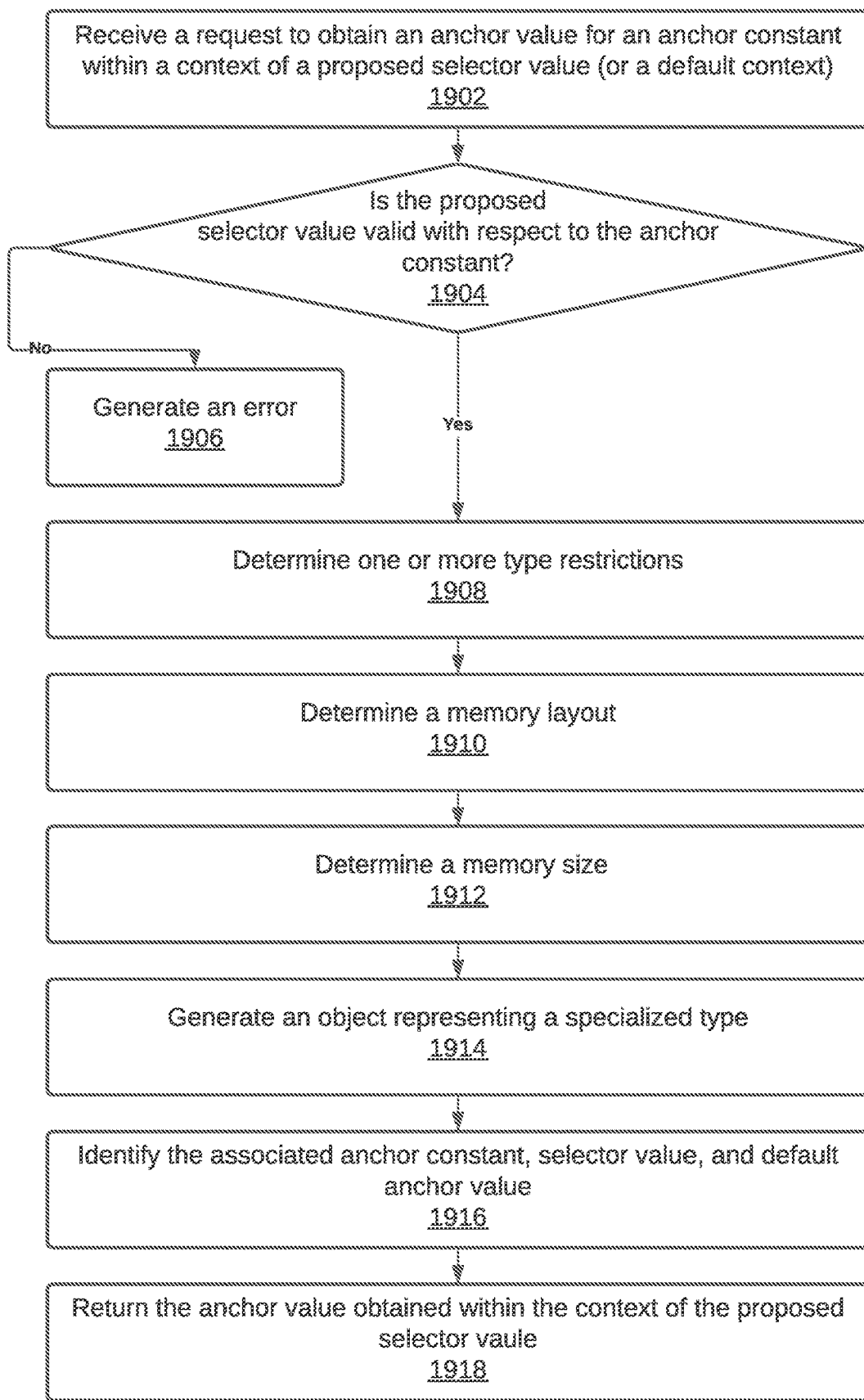
FIG. 19 illustrates an example set of operations for determining an anchor value for a resolution state of an anchor constant according to an embodiment.

FIG. 19 illustrates an example set of operations for determining an anchor value for a resolution state of an anchor constant according to an embodiment.

One or more embodiments include receiving a request to obtain an anchor value for an anchor constant within a context of a proposed selector value (or a default context) (Operation 1902). A callee receives a request to obtain an anchor value for an anchor constant within a context of a proposed selector value. The proposed selector value indicates a caller's proposed specializations for an API point dependent on the anchor constant. If no explicit context is supplied by a caller, then a default context serves as the context in which the anchor value is to be obtained.

One or more embodiments include determining whether the proposed selector value valid with respect to the anchor constant (Operation 1904). The callee executes a bootstrap method corresponding to the anchor constant. The bootstrap method includes operations configured to determine whether the proposed selector value is valid. The proposed selector value is not valid if the proposed selector value cannot be used to generate an anchor value for the anchor constant.

If the proposed selector value is not valid, one or more embodiments include generating an error (Operation 1906). The callee generates an error. The error is recorded as a permanent value for a resolution state of the anchor constant within the context of the proposed selector value.

One or more embodiments include determining one or more type restrictions (Operation 1908). The callee determines one or more type restrictions associated with the API point. The callee stores information indicating the type restrictions within the anchor value.

As an example, a Box class may declare a field named point and parameterized over a parameter type T. During compilation, the parameter type T is erased to an unspecialized type Object. Hence, a class file for Box indicates that the field point is of an unspecialized type Object. The class file for Box further indicates that the field point is dependent on an anchor constant. A caller to the field point may propose to specialize the type of point to int. The Box class may execute a bootstrap method corresponding to the anchor constant. Execution of operations of the bootstrap method may determine that a type restriction is to be applied on the field point within the context provided by the caller's specialization proposal. The type restriction may restrict the value of the field point to values conforming to the int type.

One or more embodiments include determining a memory layout (Operation 1910). The callee determines a memory layout associated with a specialized type of the API point. The memory layout may be determined based on (a) the fields in the unspecialized type, and (b) one or more type restrictions, determined at Operation 1908, on the fields in the unspecialized type. A type restriction may be used to optimize the memory layout for the specialized type, as compared with the unspecialized type. The memory layout for the specialized type includes an entry for each field that is in the unspecialized type (via direct definition by the unspecialized type or inheritance by the unspecialized type)—even though the specialized type itself does not define the fields. The callee stores information indicating the memory layout within the anchor value.

Continuing the above example, an int value may be associated with a size of 4 bytes; a reference value may be associated with a size of 8 bytes. The unspecialized type of Object associated with the field point provides that a value for the field stores a reference to an object. The reference is 8 bytes. The specialized type, which is the Object type restricted to values of int, associated with the field point provides that a value for the field stores an int value. The int value requires 4 bytes. Therefore, the callee may reduce a memory size allocated for the field point from 8 bytes to 4 bytes. The callee may further determine to inline the int value within an instance of the specialized type. The memory layout is therefore optimized based on the type restriction restricting to values of int.

One or more embodiments include determining a memory size (Operation 1912). The callee determines a memory size associated with a specialized type of the API point. The memory size may be determined based on a memory layout determined at Operation 1910. The callee stores information indicating the memory size within the anchor value.

Continuing the above example, a memory size for the field point has been reduced from 8 bytes to 4 bytes. Accordingly, the callee determines that an overall memory size associated with the specialized type Box<Int> is 4 bytes less than an overall memory size associated with the unspecialized type Box.

One or more embodiments include generating an object representing a specialized type (Operation 1914). The callee generates an object (such as a class minor) representing the specialized type resulting from the unspecialized type of the API point specialized within the context of the proposed selector value. The callee stores a reference to the object representing the specialized type within the anchor value.

One or more embodiments include identifying the associated anchor constant, selector value, and default anchor value (Operation 1916). The callee identifies an anchor constant associated with the anchor value—that is, the anchor constant on which the API point being called depends. The callee identifies the selector value associated with the anchor value— that is, the selector value serving as an input to a bootstrap method of the anchor constant that obtains the anchor value. The callee identifies the default anchor value associated with the anchor value—that is, the anchor value determined in the default context for the same anchor constant. The callee stores references to the associated anchor constant, selector value, and default anchor value within the anchor value.

One or more embodiments include returning the anchor value obtained within the context of the proposed selector value (Operation 1918). The callee returns the anchor value obtained within the context of the proposed selector value.

6. EXECUTING PARAMETRIC API POINTS WITHIN PARTICULAR CONTEXTS

Figure 20:
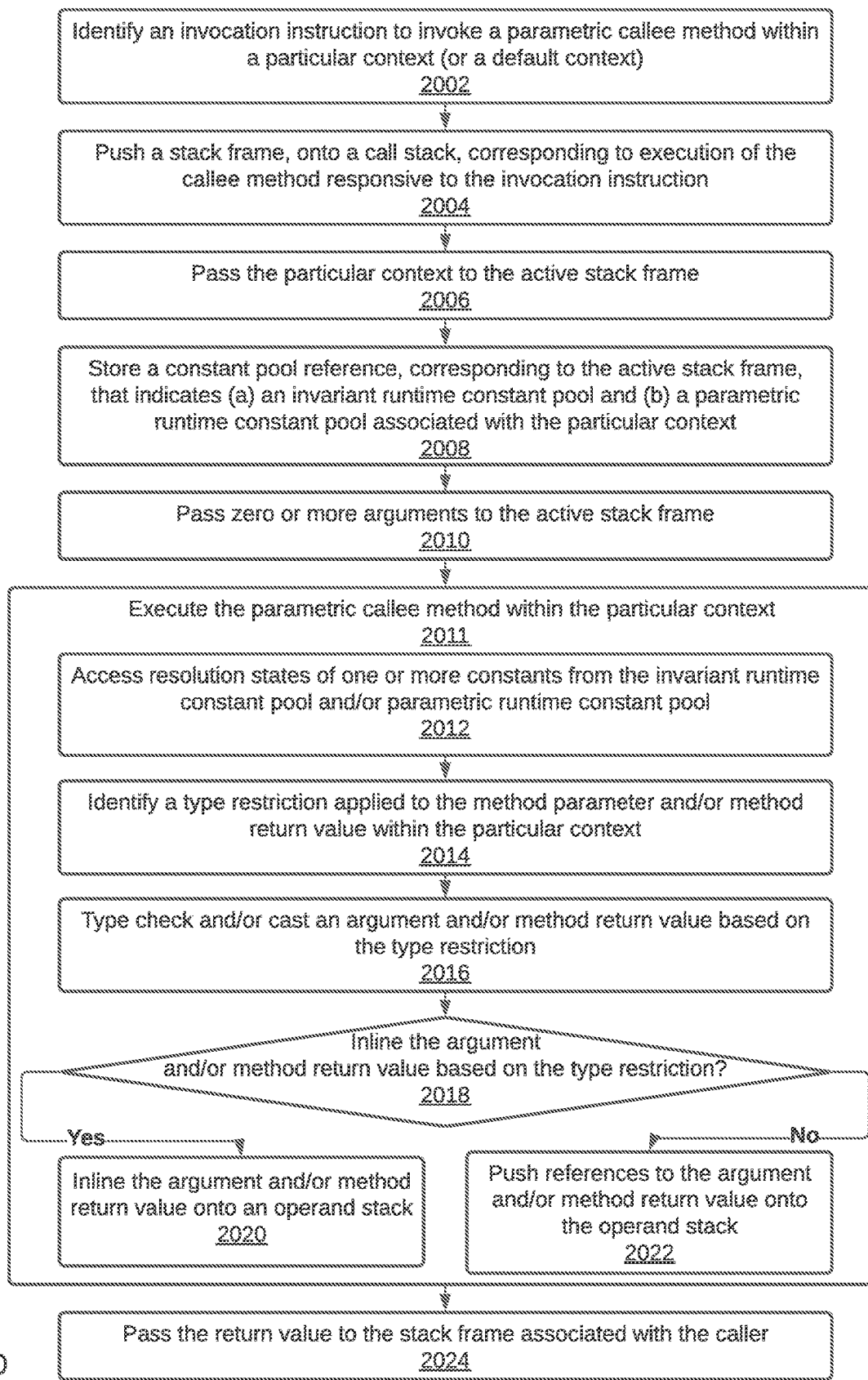
FIG. 20 illustrates an example set of operations for executing an invocation instruction to invoke a parametric method according to an embodiment.
Figure 21:
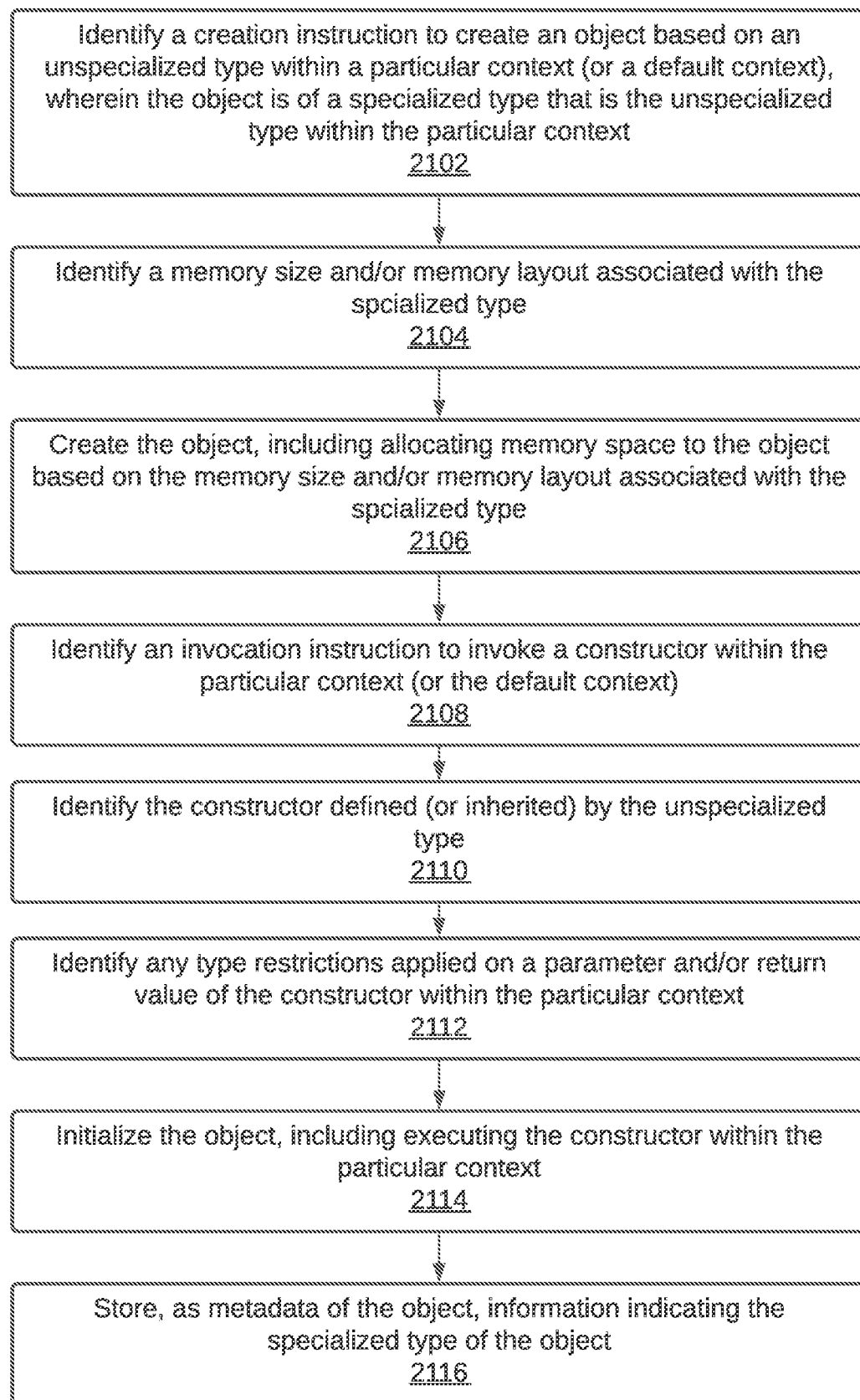
FIG. 21 illustrates an example set of operations for executing a creation instruction to create an instance of a parametric type according to an embodiment.
Figure 22:
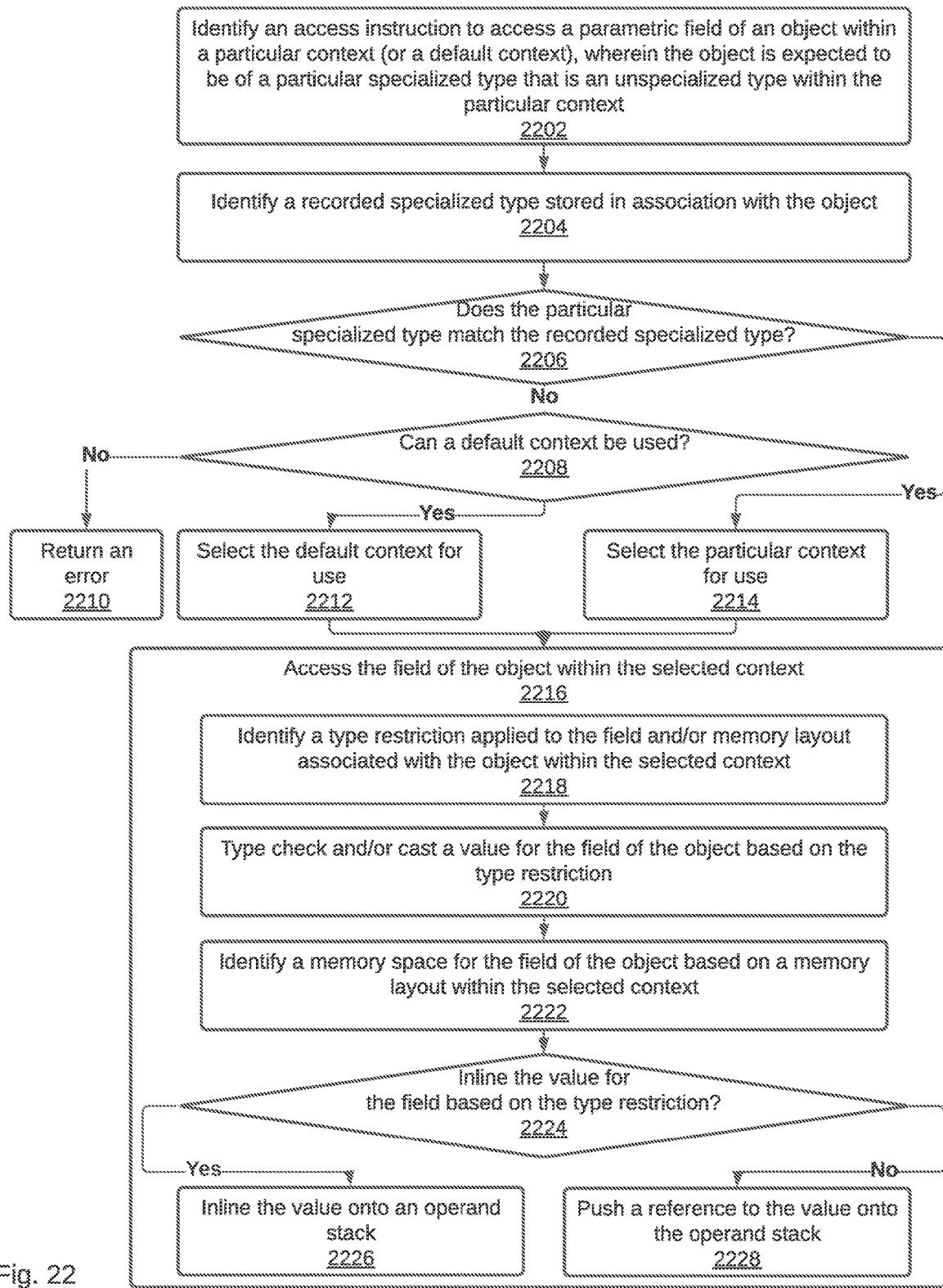
FIG. 22 illustrates an example set of operations for executing an access instruction to access a parametric field according to an embodiment.

One or more operations illustrated in FIGS. 20-22 may be modified, rearranged, or omitted all together. Accordingly, the particular sequence of operations illustrated in FIGS. 20-22 should not be construed as limiting the scope of one or more embodiments.

FIG. 20 illustrates an example set of operations for executing an invocation instruction to invoke a parametric method according to an embodiment.

One or more embodiments include identifying an invocation instruction to invoke a parametric callee method within a particular context (or a default context) (Operation 2002). A caller provides an invocation instruction and one or more operands. The one or more operands indicate (a) a callee method to be invoked and (b) a particular context within which to invoke the callee method. In the embodiment, an operand associated with the invocation instruction is a linkage constant. A resolved value for the linkage constant includes a reference to the callee method, and a reference to an anchor value associated with the particular context.

In an embodiment, operands of the invocation instruction do not explicitly provide any context. If no context is explicitly provided, then a default context applies.

One or more embodiments include pushing a stack frame, onto a call stack, corresponding to execution of the callee method responsive to the invocation instruction (Operation 2004). A stack frame corresponding to execution of the callee method responsive to the invocation instruction is pushed onto the call stack. The stack frame corresponding to execution of the callee method is now the active frame.

One or more embodiments include passing the particular context to the active stack frame (Operation 2006). Information indicating the particular context within which the callee method is to be invoked is passed from the stack frame associated with the caller to the stack frame associated with the callee. The information indicating the particular context may be, for example, an anchor value.

One or more embodiments include storing a constant pool reference, corresponding to the active stack frame, that indicates an invariant runtime constant pool and a parametric runtime constant pool associated with the particular context (Operation 2008). A virtual machine determines that the particular context for invoking the callee method has been provided to the active frame. The virtual machine determines whether the callee method is associated with an anchor constant. The virtual machine determines, for example, whether the callee method is associated with a parametric attribute that references an anchor constant. If the callee method is associated with an anchor constant, then the callee method is a "parametric callee method." The virtual machine identifies a set of one or more parametric runtime constant pools that (a) are associated with a type that defines (or inherits) the callee method and (b) store resolution states of the anchor constant. The virtual machine identifies a respective context associated with each of the set of parametric runtime constant pools. The virtual machine compares the particular context provided by the caller and the contexts associated with the set of parametric runtime constant pools to find a match. The virtual machine identifies one of the set of parametric runtime constant pools associated with a context matching the particular context. The virtual machine also identifies an invariant runtime constant pool associated with the type that defines (or inherits) the callee method.

The virtual machine stores as a constant pool reference, corresponding to the active stack frame, information indicating the identified invariant runtime constant pool and the identified parametric runtime constant pool associated with the particular context.

One or more embodiments include passing zero or more arguments to the active stack frame (Operation 2010). If the callee method is not associated with any method parameters, no arguments are passed to the active stack. Otherwise, one or more arguments are passed from the stack frame associated with the caller to the stack frame associated with the callee.

In an embodiment, passing the argument includes determining whether the argument is to be inlined or referenced in the callee stack frame, and determining a memory size to be allocated for the inlined value or the reference in the callee stack frame. The virtual machine determines whether the particular context for invoking the callee method is associated with a specialized type for any method parameter. As an example, an anchor value may specify a type restriction on a method parameter. The type restriction may limit a memory size needed for the method parameter. Additionally or alternatively, the anchor value may specify whether the method parameter is to be inlined or referenced, and/or a memory size of the method parameter. Based on the specialized type of a method parameter within the particular context, the virtual machine determines whether the argument is to be inlined or referenced in the callee stack frame, and determines a memory size to be allocated for the inlined value or the reference in the callee stack frame. Based on the memory size to be allocated, the virtual machine allocates memory space for the argument as a local variable in the callee stack frame. Also based on the memory size to be allocated, the virtual machine allocates memory space for the argument on an operand stack of the callee frame.

One or more embodiments include executing the parametric callee method within the particular context (Operation 2011). The virtual machine executes the parametric callee method within the particular context.

One or more embodiments include accessing resolution states of one or more constants from the invariant runtime constant pool and/or parametric runtime constant pool (Operation 2012). Executing the parametric callee method may include accessing resolution states of one or more constants defined by the type defining (or inheriting) the parametric callee method. The constants are accessed based on the constant pool reference of the active frame. Since the constant pool reference points to (a) the invariant runtime constant pool associated with the type and (b) the parametric runtime constant pool associated with the type and associated with the particular context, resolution states of invariant constants are accessed from the invariant runtime constant pool associated with the type, and resolution states of parametric constants (for example, the anchor constant and constants dependent on the anchor constant) are accessed from the parametric runtime constant pool associated with the type and associated with the particular context.

One or more embodiments include identifying a type restriction applied to the method parameter and/or method return value within the particular context (Operation 2014). The virtual machine identifies a type restriction applied to the method parameter and/or method return value within the particular context. The virtual machine identifies the anchor value associated with the particular context. The anchor value specifies any type restrictions applied to any method parameters and/or method return value of the callee method.

One or more embodiments include type checking and/or casting an argument and/or method return value based on the type restriction (Operation 2016). The virtual machine type checks an argument and/or method return value based on the type restriction. The virtual machine determines whether the argument for the callee method conforms to a type restriction. Additionally or alternatively, the virtual machine determines whether the method return value for the callee method conforms to a type restriction. As an example, an unspecialized type of a method parameter of a callee method is Object, and a type restriction restricts the method parameter to values of int. An argument to the callee method may be a String such as "hello." The virtual machine type checks the argument based on the unspecialized type of the method parameter. The virtual machine determines that the "hello" String conforms to the Object type. Additionally the virtual machine type checks the argument based on the type restriction. The virtual machine determines that the "hello" String does not conform the int type. The virtual machine may determine that the argument does not pass type checking.

If an argument and/or method return value does not pass type checking, the virtual machine may either generate an error, or cast the argument and/or method return value to conform to the type restriction. As an example, an unspecialized type of a method parameter of a callee method is Vehicle, and a type restriction restricts the method parameter to values of Bicycle. Bicycle is a sub-class of Vehicle, and adds a field gears. An argument to the callee method may be a Vehicle object. The virtual machine casts the Vehicle object to conform to the Bicycle type. In particular, the virtual machine may add the field gears and initialize the field to a default value. As used herein, the term "cast" may also include "convert." As another example, an unspecialized type of a method parameter of a callee method is Vehicle, and a type restriction restricts the method parameter to values of int. int is not a sub-class of Vehicle. An argument to the callee method may be a Vehicle object. The virtual machine converts the Vehicle object to conform to the int type. In particular, the virtual machine may apply a conversion rule to the Vehicle object to convert the Vehicle object into an int value.

Since different type restrictions may be applicable within different contexts, the same callee method executed within different contexts may involve type checking, converting, and/or casting based on different type restrictions. Whereas a certain argument to a callee method may conform with a type restriction within a particular context, the same argument to the same callee method may not conform with another type restriction within another context.

One or more embodiments include determining whether to inline the argument and/or method return value based on the type restriction (Operation 2018). The virtual machine determines whether to inline the argument and/or method return value based on the type restriction. If the type restriction restricts the method parameter and/or method return value to a primitive type, then the virtual machine may determine to line the argument and/or method return value.

Since different type restrictions may be applicable within different contexts, a callee method executed within a particular context may involve inlining, while the same callee method executed within another context may involve using a reference.

One or more embodiments include inlining the argument and/or method return value onto an operand stack corresponding to the active stack frame (Operation 2020). The virtual machine inlines the argument and/or method return value onto an operand stack corresponding to the active stack frame. The virtual machine stores the data value of the argument and/or method return value directly onto the operand stack, rather than storing a reference to the argument and/or method return value.

One or more embodiments include pushing a reference to the argument and/or method return value onto the operand stack (Operation 2022). The virtual machine stores references to the argument and/or method return value onto the operand stack corresponding to the active stack frame.

One or more embodiments include passing the method return value to the stack frame associated with the caller (Operation 2024). The virtual machine passes the method return value to the caller stack frame. If the method return value is inlined, the virtual machine determines a memory size associated with the inlined data value. If the method return value is referenced, the virtual machine determines a memory size associated with the reference. The virtual machine allocates a memory space, based on the determined memory size, on an operand stack of the caller stack frame for the method return value. The virtual machine stores the method return value into the allocated memory space.

FIG. 21 illustrates an example set of operations for executing a creation instruction to create an instance of a parametric type according to an embodiment.

One or more embodiments include identifying a creation instruction to create an object based on an unspecialized type within a particular context (or a default context), wherein the object is of a specialized type that is the unspecialized type within the particular context (Operation 2102). A caller provides a creation instruction and one or more operands. The one or more operands indicate (a) an unspecialized type and (b) a particular context applicable to the unspecialized type. The object to be created would be of a specialized type, which is the unspecialized type within the particular context. In an embodiment, an operand associated with the creation instruction is a linkage constant. A resolved value for the linkage constant includes a reference to the unspecialized type, and a reference to an anchor value associated with the particular context. The specialized type of the object to be created is the unspecialized type adorned with the anchor value. In an embodiment, the anchor value includes a reference to an object (such as a class minor) representing the specialized type.

In an embodiment, operands of the invocation instruction do not explicitly provide any context. If no context is explicitly provided, then a default context applies. The object to be created would be of a specialized type that is the unspecialized type within the default context. The specialized type of the object to be created is the unspecialized type adorned with a default anchor value.

One or more embodiments include identifying a memory size and/or memory layout associated with the specialized type (Operation 2104). The virtual machine identifies a memory size and/or memory layout associated with the specialized type. The anchor value specifies the memory size and/or memory layout associated with the specialized type.

One or more embodiments include creating the object, including allocating memory space to the object based on the memory size and/or memory layout associated with the specialized type (Operation 2106). The virtual machine allocates memory space to the object based on the memory size and/or memory layout associated with the specialized type.

Since different memory sizes and/or memory layouts are associated with different contexts, an object created based on an unspecialized type within different contexts involves allocating memory space of different memory sizes and/or memory layouts. As an example, one object created based on an unspecialized type within a particular context may have an inlined value for a particular field, while another object created based on the same unspecialized type but within another context may have a referenced value for the particular field.

One or more embodiments include identifying an invocation instruction to invoke a constructor within the particular context (or in the default context) (Operation 2108). The caller provides an invocation instruction and one or more operands. The one or more operands indicate (a) a constructor to be invoked, and (b) optionally the particular context within which to invoke the constructor. The constructor is defined by the unspecialized type (or by a supertype of the unspecialized type). The constructor may but does not necessarily depend on an anchor constant. The constructor may but does not necessarily depend on the same anchor constant on which the unspecialized type depends. If the constructor depends on an anchor constant, then the invocation instruction may supply the particular context for invoking the constructor. If the constructor depends on an anchor constant and the invocation instruction does not supply any context, then the default context is assumed.

One or more embodiments include identifying the constructor defined (or inherited) by the unspecialized type (Operation 2110). The virtual machines identified the constructor that is either defined by the unspecialized type, or defined by a supertype of the unspecialized type and inherited by the unspecialized type. A class file of the unspecialized type (or the supertype) includes an information structure for the constructor, specifying a descriptor for the constructor.

One or more embodiments include identifying any type restrictions applied on a parameter and/or return value of the constructor within the particular context (Operation 2112). The virtual machine executes the constructor. If the constructor depends on an anchor constant, the virtual machine executes the constructor within the particular context provided with the invocation instruction (or the default context, if none is provided). The virtual machine identifies any type restrictions applied on a parameter and/or return value of the constructor within the particular context. Examples of operations for identifying a type restriction on a parameter and/or return value are described above with reference to Operation 2014 of FIG. 20.

One or more embodiments include initializing the object, including executing the constructor within the particular context (Operation 2114). Executing the constructor within the particular context includes type checking, casting, and/or inlining parameters and/or a return value based on type restrictions applicable within the particular context. Examples of operations relating to type checking, casting, and inlining are described above with reference to Operations 2016-2022 of FIG. 20.

One or more embodiments include storing, as metadata of the object, information indicating the specialized type of the object (Operation 2116). The virtual machine stores, as metadata of the newly created object, information indicating the specialized type of the object. As an example, a header of an object includes a class reference indicating the object's class. The class reference of an object of a specialized type points to an object (such as a class minor) representing the specialized type. A reference to the object representing the specialized type may be identified from the anchor value associated with the particular context.

FIG. 22 illustrates an example set of operations for executing an access instruction to access a parametric field according to an embodiment.

One or more embodiments include identifying an access instruction to access a parametric field of an object within a particular context (or a default context), wherein the object is expected to be of a particular specialized type that is an unspecialized type within the particular context (Operation 2202). A caller provides an access instruction and one or more operands. The one or more operands indicate (a) a field of an object and (b) a particular context within which to access the field. The particular context indicated by the operands, applied to some unspecialized type, results in a particular specialized type that is expected of the object. Accessing the field may include retrieving a data value from the field and/or storing a data value to the field. In an embodiment, an operand associated with the access instruction is a linkage constant. A resolved value for the linkage constant includes a reference to the field, and a reference to an anchor value associated with the particular context. The anchor value specifies a class reference to an object (such as a class mirror) representing the particular specialized type that is expected of the object.

In an embodiment, operands of the access instruction do not explicitly provide any context. If no context is explicitly provided, then a default context applies.

One or more embodiments include identifying a recorded specialized type stored in association with the object (Operation 22). The virtual machine identifies metadata of the object, such as a header of the object. The virtual machine identifies, within the metadata, a class reference. The class reference points to a specialized type of the object, which is referred to herein as a "recorded specialized type" of the object. Additionally or alternatively, the virtual machine identifies, within the metadata, a reference to an anchor value bound to the object. The anchor value includes a class reference that points to the recorded specialized type of the object.

One or more embodiments include determining whether the particular specialized type matches the recorded specialized type (Operation 2206). The virtual machine determines whether there is a match between (a) the particular specialized type associated with the particular context provided at Operation 2202 and (b) the recorded specialized type determined at Operation 2204.

If the particular specialized type matches the recorded specialized type, one or more embodiments include selecting the particular context for use (Operation 2214). The virtual machine selects the particular context provided at Operation 2202 for use.

If the particular specialized type does not match the recorded specialized type, one or more embodiments include determining whether a default context can be used (Operation 2208). The virtual machine determines whether a default context can be used. The default context can be used if the field of the object can be accessed based on a memory layout for the unspecialized type.

If the default context cannot be used, one or more embodiments include returning an error (Operation 2210). The virtual machine returns an error.

If the default context can be used, one or more embodiments include selecting the default context for use (Operation 2212). The virtual machine selects the default context for use.

One or more embodiments include accessing the field of the object within the selected context (Operation 2214). The virtual machine accesses the field of the object within the selected context.

One or more embodiments include identifying a type restriction applied to the field and/or memory layout associated with the object within the selected context (Operation 2218). The virtual machine identifying a type restriction applied to the field and/or memory layout within the selected context. The virtual machine identifies an anchor value associated with the particular context, which may be (a) the anchor value provided with the access instruction at Operation 2202, and/or (b) the anchor value recorded in association with the object and identified at Operation 2204. The anchor value specifies any type restrictions applied to the field. The anchor value specifies a memory layout for the particular specialized type of the object.

One or more embodiments include type checking and/or casting a value for the field of the object based on the type restriction applied to the field within the selected context (Operation 2220). Examples of operations relating to type checking and/or casting a value are described above with reference to Operation 2016 of FIG. 20.

One or more embodiments include identifying a memory space for the field of the object based on the memory layout within the selected context (Operation 2222). The virtual machine identifies a memory space for the field of the object based on the memory layout within the selected context. As an example, a memory layout may indicate a sequence of fields of a specialized type, such as name, age, address. The memory layout may indicate a type and/or size of each field. The name field may take 8 bytes; the age field may take 4 bytes; the address field may take 8 bytes. Hence, the name field may correspond to an index of 0; the age field may correspond to an index of 8 (index of 0 plus 8 bytes of the name field); the address field may correspond to an index of 12 (index of 8 plus 4 bytes of the age field). A virtual machine may access a field by calculating the index corresponding to the field based on the memory layout.

One or more embodiments include determining whether to inline the value for the field based on the type restriction (Operation 2224). The virtual machine determines whether to inline the value for the field based on the type restriction. If the type restriction restricts the value to conform to a primitive type, then the virtual machine may determine to line the value.

Where the access instruction is to get a field value, one or more embodiments include inlining the value onto an operand stack (Operation 2226). The virtual machine inlines the value for the field onto the operand stack, rather than a reference to the value for the field. The virtual machine then processes the inlined value from the operand stack. Alternatively, where the access instruction is to put a field value, one or more embodiments include popping an inlined value from the operand stack (operation not illustrated). The virtual machine pops the inlined value for the field from the operand stack, rather than a reference to the value for the field. The virtual machine then stores the inlined value into the memory space for the object within the heap.

Where the access instruction is to get a field value, one or more embodiments include pushing a reference to the value onto the operand stack (Operation 22). The virtual machine pushes a reference to the value for the field onto the operand stack. The virtual machine then accesses the value for the field based on the reference. Alternatively, where the access instruction is to put a field value, one or more embodiments include popping a reference to the value from the operand stack (operation not illustrated). The virtual machine pops a reference to the value for the field from the operand stack. The virtual machine then stores the referenced value into the memory space for the object within the heap.

7. EXAMPLE EMBODIMENTS

7.1. Executing a Parametric Method Dependent on an Anchor Constant

A first embodiment includes:
while within a first stack frame, on a call stack, corresponding to a first execution of a first caller method: identifying a first invocation instruction to invoke a callee method within a first context; wherein a first type restriction is applied on one or more of a method parameter and a method return value of the callee method within the first context, and the first type restriction prohibits a first value for one or more of the method parameter and the method return value. Responsive to identifying the first invocation instruction: pushing a second stack frame, onto the call stack, corresponding to a second execution of the callee method responsive to the first invocation instruction; passing information representing the first context from the first stack frame to the second stack frame;
while within the second stack frame, on the call stack, corresponding to the second execution of the callee method: processing one or more of the method parameter and the method return value based on the first type restriction that is applied within the first context;
while within a third stack frame, on the call stack, corresponding to a third execution of a second caller method: identifying a second invocation instruction to invoke the callee method within a second context; wherein a second type restriction is applied on one or more of the method parameter and the method return value within the second context, the second type restriction prohibits a second value for one or more of the method parameter and the method return value, and the first type restriction and the second type restriction are different;
responsive to identifying the second invocation instruction: pushing a fourth stack frame, onto the call stack, corresponding to a fourth execution of the callee method responsive to the second invocation instruction; passing information representing the second context from the third stack frame to the fourth stack frame;
while within the fourth stack frame, on the call stack, corresponding to the fourth execution of the callee method: processing one or more of the method parameter and the method return value based on the second type restriction that is applied within the second context.

A second embodiment includes:
identifying a plurality of runtime constant pools that are (a) associated with a type and (b) respectively correspond to a plurality of contexts, wherein one or more of the type and a supertype of the type defines a callee method;
while within a first stack frame, on a call stack, corresponding to a first execution of a first caller method: identifying a first invocation instruction to invoke the callee method within a first context of the plurality of contexts;
responsive to the first invocation instruction: pushing a second stack frame, onto the call stack, corresponding to a second execution of the callee method responsive to the first invocation instruction; determining that a first runtime constant pool, of the plurality of runtime constant pools, corresponds to the first context of the plurality of contexts; storing, into the second stack frame, a first constant pool reference that indicates the first runtime constant pool.

7.2. Creating an Instance of a Parametric Class Dependent on an Anchor Constant A third embodiment includes:
identifying a first creation instruction to create a first object based on a first unspecialized type within a first context, wherein the first object would be of a first specialized type that is the first unspecialized type specialized within the first context;
creating the first object, wherein creating the first object comprises: allocating a first memory space to the first object based on one or more of a first memory size and a first memory layout associated with the first specialized type;
wherein the first unspecialized type is associated with one or more of a second memory size, different than the first memory size, and a first memory layout, different than the second memory layout;
initializing the first object, wherein initializing the first object comprises: executing a constructor defined by one or more of the first unspecialized type and a supertype of the first unspecialized type.

7.3. Accessing a Parametric Field Dependent on an Anchor Constant

A fourth embodiment includes:

identifying a first access instruction to access a first field of a first object within a first context, wherein the first object is expected to be of a first specialized type, and the first specialized type is a first unspecialized type specialized within the first context;

identifying a second specialized type stored in association with the first object;

determining whether the first specialized type matches the second specialized type;

responsive to determining that the first specialized type matches the second specialized type: identifying a first memory layout associated with one or more of the first specialized type and the second specialized type; wherein an unspecialized memory layout is associated with the first unspecialized type, and the first memory layout and the unspecialized memory layout are different; accessing the first field of the first object based on the first memory layout.

A fifth embodiment includes:

identifying a first access instruction of a first instruction type to access a first field of a first object within a first context; wherein the first context is associated with a first type restriction on the first field that prohibits a first value for the first field;

executing the first access instruction to access the first field of the first object;

identifying a second access instruction of a second instruction type to access the first field of a second object within a second context; wherein the second context is associated with a second type restriction on the first field that does not prohibit the first value for the first field; wherein the first instruction type and the second instruction type are different;

executing the second access instruction to access the first field of the second object.

8. MISCELLANEOUS; EXTENSIONS

Embodiments are directed to a system with one or more devices that include a hardware processor and that are configured to perform any of the operations described herein and/or recited in any of the claims below.

In an embodiment, a non-transitory computer readable storage medium comprises instructions which, when executed by one or more hardware processors, causes performance of any of the operations described herein and/or recited in any of the claims.

Any combination of the features and functionalities described herein may be used in accordance with one or more embodiments. In the foregoing specification, embodiments have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

9. HARDWARE OVERVIEW

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 23:
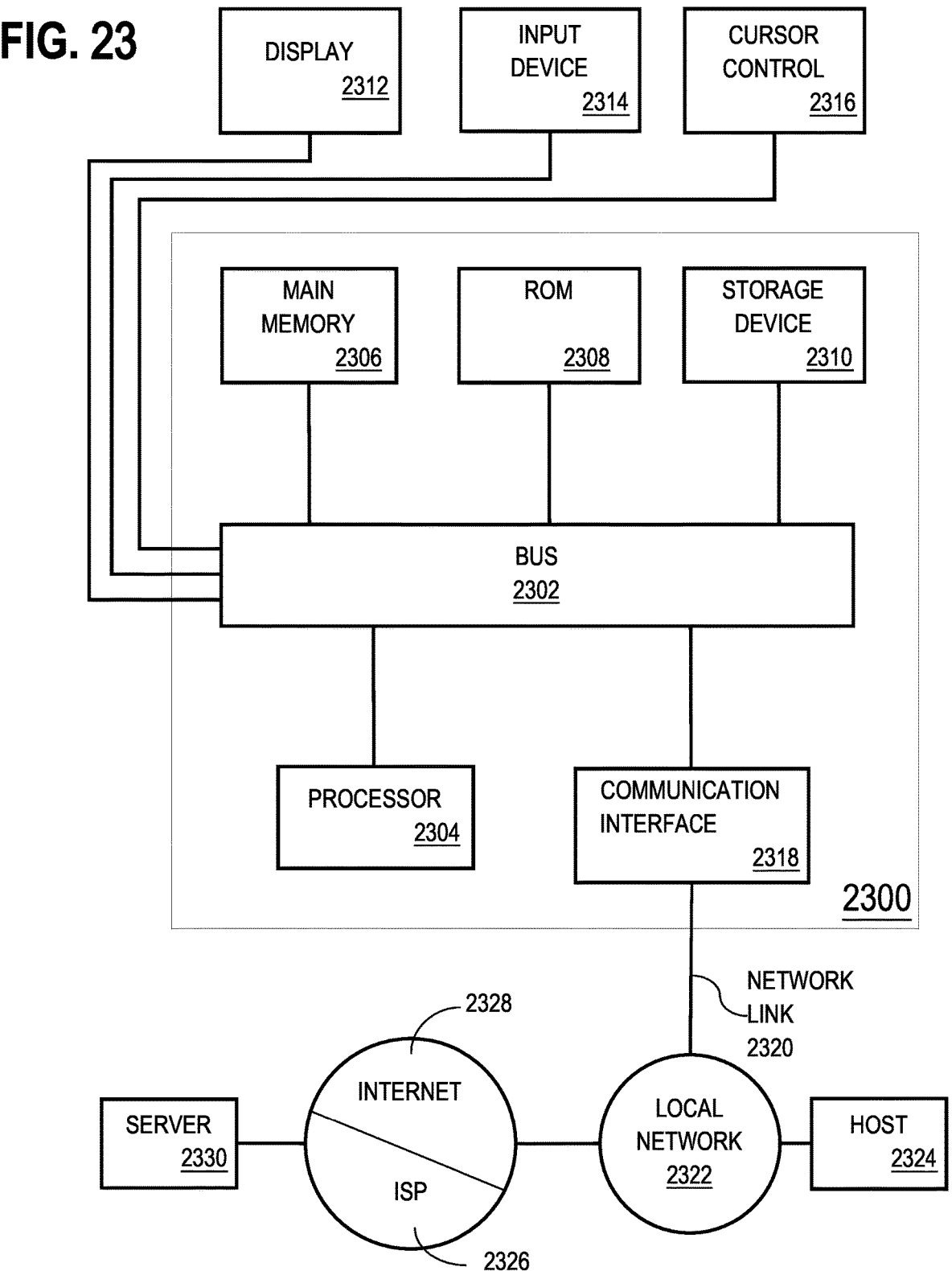
FIG. 23 illustrates a system in accordance with one or more embodiments.

For example, FIG. 23 is a block diagram that illustrates a computer system 2300 upon which an embodiment of the invention may be implemented. Computer system 2300 includes a bus 2302 or other communication mechanism for communicating information, and a hardware processor 2304 coupled with bus 2302 for processing information. Hardware processor 2304 may be, for example, a general purpose microprocessor.

Computer system 2300 also includes a main memory 2306, such as a random access memory (RAM) or other dynamic storage device, coupled to bus 2302 for storing information and instructions to be executed by processor 2304. Main memory 2306 also may be used for storing temporary variables or other intermediate information during execution of instructions to be executed by processor 2304. Such instructions, when stored in non-transitory storage media accessible to processor 2304, render computer system 2300 into a special-purpose machine that is customized to perform the operations specified in the instructions.

Computer system 2300 further includes a read only memory (ROM) 2308 or other static storage device coupled to bus 2302 for storing static information and instructions for processor 2304. A storage device 2310, such as a magnetic disk or optical disk, is provided and coupled to bus 2302 for storing information and instructions.

Computer system 2300 may be coupled via bus 2302 to a display 2312, such as a cathode ray tube (CRT), for displaying information to a computer user. An input device 2314, including alphanumeric and other keys, is coupled to bus 2302 for communicating information and command selections to processor 2304. Another type of user input device is cursor control 2316, such as a mouse, a trackball, or cursor direction keys for communicating direction information and command selections to processor 2304 and for controlling cursor movement on display 2312. This input device typically has two degrees of freedom in two axes, a first axis (e.g., x) and a second axis (e.g., y), that allows the device to specify positions in a plane.

Computer system 2300 may implement the techniques described herein using customized hard-wired logic, one or more ASICs or FPGAs, firmware and/or program logic which in combination with the computer system causes or programs computer system 2300 to be a special-purpose machine. According to one embodiment, the techniques herein are performed by computer system 2300 in response to processor 2304 executing one or more sequences of one or more instructions contained in main memory 2306. Such instructions may be read into main memory 2306 from another storage medium, such as storage device 2310. Execution of the sequences of instructions contained in main memory 2306 causes processor 2304 to perform the process steps described herein. In alternative embodiments, hardwired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical or magnetic disks, such as storage device 2310. Volatile media includes dynamic memory, such as main memory 2306. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 2302. Transmission media can also take the form of acoustic or light waves, such as those generated during radio-wave and infra-red data communications.

Various forms of media may be involved in carrying one or more sequences of one or more instructions to processor 2304 for execution. For example, the instructions may initially be carried on a magnetic disk or solid state drive of a remote computer. The remote computer can load the instructions into its dynamic memory and send the instructions over a telephone line using a modem. A modem local to computer system 2300 can receive the data on the telephone line and use an infra-red transmitter to convert the data to an infra-red signal. An infra-red detector can receive the data carried in the infra-red signal and appropriate circuitry can place the data on bus 2302. Bus 2302 carries the data to main memory 2306, from which processor 2304 retrieves and executes the instructions. The instructions received by main memory 2306 may optionally be stored on storage device 2310 either before or after execution by processor 2304.

Computer system 2300 also includes a communication interface 2318 coupled to bus 2302. Communication interface 2318 provides a two-way data communication coupling to a network link 2320 that is connected to a local network 2322. For example, communication interface 2318 may be an integrated services digital network (ISDN) card, cable modem, satellite modem, or a modem to provide a data communication connection to a corresponding type of telephone line. As another example, communication interface 2318 may be a local area network (LAN) card to provide a data communication connection to a compatible LAN. Wireless links may also be implemented. In any such implementation, communication interface 2318 sends and receives electrical, electromagnetic or optical signals that carry digital data streams representing various types of information.

Network link 2320 typically provides data communication through one or more networks to other data devices. For example, network link 2320 may provide a connection through local network 2322 to a host computer 2324 or to data equipment operated by an Internet Service Provider (ISP) 2326. ISP 2326 in turn provides data communication services through the world wide packet data communication network now commonly referred to as the "Internet" 2328. Local network 2322 and Internet 2328 both use electrical, electromagnetic or optical signals that carry digital data streams. The signals through the various networks and the signals on network link 2320 and through communication interface 2318, which carry the digital data to and from computer system 2300, are example forms of transmission media.

Computer system 2300 can send messages and receive data, including program code, through the network(s), network link 2320 and communication interface 2318. In the Internet example, a server 2330 might transmit a requested code for an application program through Internet 2328, ISP 2326, local network 2322 and communication interface 2318.

The received code may be executed by processor 2304 as it is received, and/or stored in storage device 2310, or other non-volatile storage for later execution.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. One or more non-transitory computer readable media storing instructions which, when executed by one or more hardware processors, cause:
    identifying a first application programming interface (API) point defined in one or more of a type and a supertype of the type, wherein the first API point depends on a constant;
    determining a first resolution state of the constant;
    determining a second resolution state of the constant;
    performing a first plurality of executions of the first API point responsive to a first plurality of calls to the first API point that are made in association within a first context, wherein each of the first plurality of executions comprises: accessing the first resolution state of the constant, without accessing any other resolution state of the constant;
    performing a second plurality of executions of the first API point responsive to a second plurality of calls to the first API point that are made in association within a second context, wherein each of the second plurality of executions comprises: accessing the second resolution state of the constant, without accessing any other resolution state of the constant;
    wherein the first context and the second context are different.

2. The media of claim 1, wherein:
    each of the first plurality of executions of the first API point further comprises: accessing a same first resolved value for the first resolution state of the constant;
    each of the second plurality of executions of the first API point further comprises: accessing a same second resolved value for the second resolution state of the constant;
    the first resolved value and the second resolved value are different.

3. The media of claim 1, further storing instructions which cause:
    determining that a second API point depends on the constant;

performing a third plurality of executions of the second API point responsive to a third plurality of calls to the second API point that are made within the first context, wherein each of the third plurality of executions of the second API point comprises: accessing the first resolution state of the constant and the same first resolved value for the first resolution state of the constant.

4. The media of claim 3, further storing instructions which cause:
performing a fourth plurality of executions of the second API point responsive a fourth plurality of calls to the second API point that are made within the second context, wherein each of the fourth plurality of executions of the second API point comprises: accessing the second resolution state of the constant and the same second resolved value for the second resolution state of the constant.

5. The media of claim 1, further storing instructions which cause:
responsive to a first call, of the first plurality of calls, to the first API point:
pushing, onto a call stack, a first stack frame corresponding to a first execution, of the first plurality of executions, of the first API point;
wherein each stack frame on the call stack is associated with a respective constant pool reference;
storing, into the first stack frame, a first constant pool reference that points to a first runtime constant pool;
identifying the first runtime constant pool based on the first constant pool reference associated with the first stack frame;
accessing the first resolved value for the first resolution state of the constant from the first runtime constant pool;
responsive to a second call, of the second plurality of calls, to the first API point:
pushing, onto the call stack, a second stack frame corresponding to a second execution, of the second plurality of executions, of the first API point;
storing, into the second stack frame, a second constant pool reference that points to a second runtime constant pool;
identifying the second runtime constant pool based on the second constant pool reference associated with the second stack frame;
accessing the second resolved value for the second resolution state of the constant from the second runtime constant pool;
wherein each of the first second runtime constant pool and the second runtime constant pool is associated with a same type.

6. The media of claim 1, wherein the first resolved value for the first resolution state of the constant is returned from a first execution of a bootstrap method associated with the constant, and the second resolved value for the second resolution state of the constant is returned from a second execution of the bootstrap method associated with the constant.

7. The media of claim 1, wherein:
the first context is provided by the first resolved state;
the second context is provided by the second resolved state.

8. The media of claim 1, further storing instructions comprising:
identifying a plurality of runtime constant pools, wherein each of the plurality of runtime constant pools is associated with (a) the same type, and (b) a respective resolved value of a plurality of resolved values for resolution states of the constant;
determining that a first runtime constant pool, of the plurality of runtime constant pools, is associated with a first resolved value, of the plurality of resolved values;
responsive at least to determining that the first resolved value matches the first context: accessing the first runtime constant pool, without accessing any other runtime constant pool of the plurality of runtime constant pools;
determining that a second runtime constant pool, of the plurality of runtime constant pools, is associated with a second resolved value, of the plurality of resolved values;
responsive at least to determining that the second resolved value matches the second context: accessing the second runtime constant pool, without accessing any other runtime constant pool of the plurality of runtime constant pools.

9. The media of claim 1, wherein the constant is an anchor constant associated with the first API point, and the first resolved value indicates one or more of: a type restriction associated with the first API point, a memory layout associated with the first API point, a memory size associated with the first API point, and a specialized type associated with the first API point.

* * * * *

UNITED STATES PATENT AND TRADEMARK OFFICE
CERTIFICATE OF CORRECTION

| | |
|---|---|
| PATENT NO. | : 12,141,629 B2 |
| APPLICATION NO. | : 18/497634 |
| DATED | : November 12, 2024 |
| INVENTOR(S) | : Rose et al. |

Page 1 of 1

It is certified that error appears in the above-identified patent and that said Letters Patent is hereby corrected as shown below:

In the Specification

In Column 4, Lines 5-6, delete "constant— the" and insert -- constant—the --, therefor.

In Column 9, Line 45, delete "C #," and insert -- C#, --, therefor.

In Column 13, Line 51, delete "1"." and insert -- I". --, therefor.

In Column 21, Line 1, delete "Bi cycle." and insert -- Bicycle. --, therefor.

In Column 24, Line 33, delete "s" and insert -- is --, therefor.

In Column 28, Line 8, delete "minor)" and insert -- mirror) --, therefor.

In Column 29, Line 11, delete "a a" and insert -- a --, therefor.

In Column 29, Line 37, delete "minor)" and insert -- mirror) --, therefor.

In Column 38, Line 15, delete "minor)" and insert -- mirror) --, therefor.

In Column 38, Line 26, delete "value— that" and insert -- value—that --, therefor.

In Column 42, Line 13, delete "minor)" and insert -- mirror) --, therefor.

In Column 43, Line 33, delete "minor)" and insert -- mirror) --, therefor.

Signed and Sealed this
Fourth Day of February, 2025

Coke Morgan Stewart
*Acting Director of the United States Patent and Trademark Office*